US007922084B2

(12) United States Patent
Ishibashi et al.

(10) Patent No.: US 7,922,084 B2
(45) Date of Patent: Apr. 12, 2011

(54) SYSTEM, APPARATUS, METHOD AND COMPUTER PROGRAM FOR PROCESSING INFORMATION

(75) Inventors: Yoshihito Ishibashi, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 1017 days.

(21) Appl. No.: 11/607,986

(22) Filed: Dec. 4, 2006

(65) Prior Publication Data

US 2007/0145127 A1 Jun. 28, 2007

(30) Foreign Application Priority Data

Dec. 20, 2005 (JP) ................................. 2005-365910

(51) Int. Cl.
*G06K 5/00* (2006.01)

(52) U.S. Cl. ......................... 235/382; 235/375; 235/384

(58) Field of Classification Search .................. 235/375, 235/380, 382, 384, 44, 45
See application file for complete search history.

(56) References Cited

U.S. PATENT DOCUMENTS

| | | | | |
|---|---|---|---|---|
| 5,914,701 | A * | 6/1999 | Gersheneld et al. | 345/156 |
| 6,223,018 | B1 * | 4/2001 | Fukumoto et al. | 455/41.1 |
| 6,441,721 | B1 * | 8/2002 | Tajima et al. | 340/286.01 |
| 6,771,161 | B1 * | 8/2004 | Doi et al. | 340/5.64 |
| 6,809,631 | B2 * | 10/2004 | Doi et al. | 340/5.86 |
| 7,202,773 | B1 * | 4/2007 | Oba et al. | 340/5.8 |
| 7,240,846 | B2 * | 7/2007 | Arisawa et al. | 235/492 |
| 7,443,290 | B2 * | 10/2008 | Takiguchi | 340/539.1 |
| 2002/0010603 | A1 * | 1/2002 | Doi et al. | 705/5 |
| 2002/0023121 | A1 * | 2/2002 | Sugiyama et al. | 709/201 |
| 2002/0030585 | A1 * | 3/2002 | Doi et al. | 340/5.64 |
| 2002/0174336 | A1 * | 11/2002 | Sakakibara et al. | 713/172 |
| 2004/0035930 | A1 * | 2/2004 | Arisawa et al. | 235/451 |
| 2005/0097038 | A1 * | 5/2005 | Yu et al. | 705/40 |
| 2006/0077616 | A1 | 4/2006 | Takiguchi | |
| 2006/0178109 | A1 | 8/2006 | Takiguchi | |

FOREIGN PATENT DOCUMENTS

| | | |
|---|---|---|
| EP | 1 598 964 | 11/2005 |
| EP | 1 598 965 | 11/2005 |
| JP | 10-229357 | 8/1998 |
| JP | 11-016013 | 1/1999 |
| JP | 11-509380 | 8/1999 |
| JP | 2004-282733 | 7/2004 |

* cited by examiner

*Primary Examiner* — Daniel A Hess
*Assistant Examiner* — Paultep Savusdiphol
(74) *Attorney, Agent, or Firm* — Finnegan, Henderson, Farabow, Garrett & Dunner, L.L.P.

(57) ABSTRACT

An information processing apparatus installed at a ticket gate for performing a ticket inspection process, includes an authentication unit for authenticating a communication terminal mounted on a passenger passing through the ticket gate by communicating the communication terminal, the communication terminal communicating using as a communication medium a dielectric material including the human body of the passenger, a ticket inspection unit for performing the ticket inspection process on the communication terminal, a registration unit for registering an identification of the communication terminal, an identification determination unit for determining whether the identification of the communication terminal acquired in communication with the communication terminal is registered by the registration unit, an information acquisition unit for acquiring subscription information of a content stored on the communication terminal, and a delivery unit for delivering the content to the communication terminal in accordance with the subscription information acquired by the information acquisition unit.

9 Claims, 51 Drawing Sheets

FIG. 3

250

| FREQUENCY f [Hz] | RECEIVING LOAD Rr [Ω] | CAPACITANCE [F] | ROOT-MEAN-SQUARE VOLTAGE [V] |
|---|---|---|---|
| 1. 0E+06 | 1. 0E+04 | 1. 0E−13 | 0. 013 |
| 1. 0E+06 | 1. 0E+04 | 1. 0E−12 | 0. 125 |
| 1. 0E+06 | 1. 0E+04 | 1. 0E−11 | 1. 064 |
| 1. 0E+06 | 1. 0E+05 | 1. 0E−13 | 0. 125 |
| 1. 0E+06 | 1. 0E+05 | 1. 0E−12 | 1. 064 |
| 1. 0E+06 | 1. 0E+05 | 1. 0E−11 | 1. 975 |
| 1. 0E+06 | 1. 0E+06 | 1. 0E−13 | 1. 064 |
| 1. 0E+06 | 1. 0E+06 | 1. 0E−12 | 1. 975 |
| 1. 0E+06 | 1. 0E+06 | 1. 0E−11 | 2. 000 |
| 1. 0E+07 | 1. 0E+04 | 1. 0E−13 | 0. 125 |
| 1. 0E+07 | 1. 0E+04 | 1. 0E−12 | 1. 064 |
| 1. 0E+07 | 1. 0E+04 | 1. 0E−11 | 1. 975 |
| 1. 0E+07 | 1. 0E+05 | 1. 0E−13 | 1. 064 |
| 1. 0E+07 | 1. 0E+05 | 1. 0E−12 | 1. 975 |
| 1. 0E+07 | 1. 0E+05 | 1. 0E−11 | 2. 000 |
| 1. 0E+07 | 1. 0E+06 | 1. 0E−13 | 1. 975 |
| 1. 0E+07 | 1. 0E+06 | 1. 0E−12 | 2. 000 |
| 1. 0E+07 | 1. 0E+06 | 1. 0E−11 | 2. 000 |
| 1. 0E+08 | 1. 0E+04 | 1. 0E−13 | 1. 064 |
| 1. 0E+08 | 1. 0E+04 | 1. 0E−12 | 1. 975 |
| 1. 0E+08 | 1. 0E+04 | 1. 0E−11 | 2. 000 |
| 1. 0E+08 | 1. 0E+05 | 1. 0E−13 | 1. 975 |
| 1. 0E+08 | 1. 0E+05 | 1. 0E−12 | 2. 000 |
| 1. 0E+08 | 1. 0E+05 | 1. 0E−11 | 2. 000 |
| 1. 0E+08 | 1. 0E+06 | 1. 0E−13 | 2. 000 |
| 1. 0E+08 | 1. 0E+06 | 1. 0E−12 | 2. 000 |
| 1. 0E+08 | 1. 0E+06 | 1. 0E−11 | 2. 000 |

SYSTEM, APPARATUS, METHOD AND COMPUTER PROGRAM FOR PROCESSING INFORMATION

CROSS REFERENCES TO RELATED APPLICATIONS

The present invention contains subject matter related to Japanese Patent Application JP 2005-365910 filed in the Japanese Patent Office on Dec. 20, 2005, the entire contents of which are incorporated herein by reference.

BACKGROUND OF THE INVENTION

1. Field of the Invention

The present invention relates to a system, apparatus, method, and computer program for processing information and, in particular, to a system, apparatus, method, and computer program for providing a content subsequent to ticket-inspection at a ticket gate in a station.

2. Description of the Related Art

In a communication system including a transmitter, a receiver, and a communication medium, different physical communication paths are used for a physical communication signal transmission path for transmitting a communication signal, and a reference point path for sharing, between the transmitter and the receiver, a reference point that is used to determine a level difference of the communication signal.

For example, Japanese Unexamined Patent Application Publication Nos. 10-229357 and 11-509380 disclose communication techniques using a human body as a communication medium. In each of the techniques, the human body is used as a first communication path, and a direct capacitive coupling between electrodes in space and the ground are used as a second communication path. The entire communication path composed of the first communication path and the second communication path thus forms a closed circuit.

In such a communication system, two communication paths, namely, a communication signal transmission path and a reference point path (including the first communication path and the second communication path) need to be arranged as a closed circuit between a transmitter and a receiver. Since the two communication paths are different paths, the requirement that the two paths be reliably maintained can serve as limitation to the application environments of communications.

For example, the strength of coupling between the transmitter and the receiver in the reference point path depends on the distance between the transmitter and the receiver. The reliability of the path changes depending on the distance. More specifically, the reliability of communications can depend on the distance between the transmitter and the receiver. The reliability of communications also depends on the presence of any shield between the transmitter and the receiver.

Reliable communications are thus difficult because application environments greatly affect the reliability of communications in the communication method that uses the two paths, namely, the communication signal transmission path and the reference point path, as a closed circuit.

SUMMARY OF THE INVENTION

Although a communication technique using a human body and a communication medium are not well materialized, applications of this technique to a variety of fields are contemplated.

It is thus desirable to apply a communication technique using a human body as a communication medium, expected to be materialized soon, to a ticket inspection system for performing a ticket inspection at stations and quickly delivering a content.

In accordance with one embodiment of the present invention, an information processing system includes a first information processing apparatus, installed at a ticket gate, for performing a ticket inspection process, and a second information processing apparatus for performing a content delivery process subsequent to the ticket inspection process. The first information processing apparatus includes an authentication unit for authenticating a communication terminal mounted on a passenger passing through the ticket gate by communicating the communication terminal, the communication terminal communicating using as a communication medium a dielectric material including the human body of the passenger, a ticket inspection unit for performing the ticket inspection process on the communication terminal authenticated by the authentication unit, and a registration unit-for registering an identification of the communication terminal that has undergone the ticket inspection process. The second information processing apparatus includes an identification determination unit for determining whether the identification of the communication terminal acquired in communication with the communication terminal is registered by the first information processing apparatus, an information acquisition unit for acquiring subscription information of a content stored on the communication terminal if the identification determination unit determines that the identification of the communication terminal is registered by the first information processing apparatus, and a delivery unit for delivering the content to the communication terminal in accordance with the subscription information acquired by the information acquisition unit.

The registration unit may register a session key, shared by the communication terminal as a result of the authentication, together with the identification of the communication terminal, and the delivery unit may encrypt the content with the session key and deliver the encrypted content to the communication terminal, the session key being read if the identification determination unit determines that the identification of the communication terminal is registered by the first information processing apparatus.

Another embodiment of the present invention is related to an information processing method of an information processing system including a first information processing apparatus, installed at a ticket gate, for performing a ticket inspection process, and a second information processing apparatus for performing a content delivery process subsequent to the ticket inspection process. The information processing method includes steps of, through the first information processing apparatus, authenticating a communication terminal mounted on a passenger passing through the ticket gate by communicating the communication terminal, the communication terminal communicating using as a communication medium a dielectric material including the human body of the passenger, performing the ticket inspection process on the authenticated communication terminal, and registering an identification of the communication terminal that has undergone the ticket inspection process, and through the second information processing apparatus, determining whether the identification of the communication terminal acquired in communication with the communication terminal is registered by the first information processing apparatus, acquiring subscription information of a content stored on the communication terminal if the identification of the communication terminal is determined to be registered by the first information processing apparatus, and delivering the content to the communication terminal in accordance with the acquired subscription information.

In accordance with one embodiment of the present invention, an information processing apparatus installed at a ticket gate for performing a ticket inspection process, includes an authentication unit for authenticating a communication terminal mounted on a passenger passing through the ticket gate by communicating the communication terminal, the communication terminal communicating using as a communication medium a dielectric material including the human body of the passenger, a ticket inspection unit for performing the ticket inspection process on the communication terminal authenticated by the authentication unit, a registration unit for registering an identification of the communication terminal that has undergone the ticket inspection process, an identification determination unit for determining whether the identification of the communication terminal acquired in communication with the communication terminal is registered by the registration unit, an information acquisition unit for acquiring subscription information of a content stored on the communication terminal if the identification determination unit determines that the identification of the communication terminal is registered, and a delivery unit for delivering the content to the communication terminal in accordance with the subscription information acquired by the information acquisition unit.

The registration unit may register a session key, shared by the communication terminal as a result of the authentication, together with the identification of the communication terminal, and the delivery unit may encrypt the content with the session key and deliver the encrypted content to the communication terminal, the session key being read if the identification determination unit determines that the identification of the communication terminal is registered by the registration unit.

Another embodiment of the present invention is related to an information processing method of an information processing apparatus installed at a ticket gate for performing a ticket inspection process, and includes steps of authenticating a communication terminal mounted on a passenger passing through the ticket gate by communicating the communication terminal, the communication terminal communicating using as a communication medium a dielectric material including the human body of the passenger, performing the ticket inspection process on the authenticated communication terminal, registering an identification of the communication terminal that has undergone the ticket inspection process, determining whether the identification of the communication terminal acquired in communication with the communication terminal is registered, acquiring subscription information of a content stored on the communication terminal if the identification of the communication terminal is determined to be registered, and delivering the content to the communication terminal in accordance with the acquired subscription information.

In accordance with one embodiment of the present invention, a computer program for causing an information processing apparatus installed at a ticket gate to perform a ticket inspection process, includes steps of authenticating a communication terminal mounted on a passenger passing through the ticket gate by communicating the communication terminal, the communication terminal communicating using as a communication medium a dielectric material including the human body of the passenger, performing the ticket inspection process on the authenticated communication terminal, registering an identification of the communication terminal that has undergone the ticket inspection process, determining whether the identification of the communication terminal acquired in communication with the communication terminal is registered, acquiring subscription information of a content stored on the communication terminal if the identification of the communication terminal is determined to be registered, and delivering the content to the communication terminal in accordance with the acquired subscription information.

In accordance with embodiments of the present invention, the first information processing apparatus communicates with the communication terminal mounted on the passenger passing through the ticket gate and communicating using as the communication medium the dielectric material including the human body of the passenger, authenticates the communication terminal, performs the ticket inspection process on the authenticated communication terminal, and registers the identification (ID) of the ticketed inspected communication terminal. The second information processing apparatus determines whether the first information processing apparatus has registered the ID of the communication terminal acquired in communication with the communication terminal, acquires the subscription information of the content stored on the communication terminal if the first information processing apparatus has registered the ID of the communication terminal, and delivers the content to the communication terminal in accordance with the acquired subscription information.

In accordance with embodiments of the present invention, the information processing apparatus communicates with the communication terminal mounted on the passenger passing through the ticket gate and communicating using as the communication medium the dielectric material including the human body of the passenger, authenticates the communication terminal, performs the ticket inspection process on the authenticated communication terminal, and registers the ID of the ticket inspected communication terminal. The information processing apparatus determines whether the ID of the communication terminal acquired in communication with the communication terminal is registered, acquires the subscription information of the content stored on the communication terminal if the ID of the communication terminal is determined to be registered, and delivers the content to the communication terminal in accordance with the acquired subscription information.

The word network refers to a mechanism including at least two apparatuses that are connected to each other to transfer information from one to another apparatus. An apparatus communicating via the network may be individual apparatus or may be each block constituting the apparatus.

The word communication herein may refer to wireless communication, wired communication, or a combination of the wireless communication and the wired communication. In the case of the combination of wireless communication and wired communication, wireless communication may be performed in one area and wired communication may be performed in the other area. Furthermore, wired communication may be performed from a first apparatus to a second apparatus, and then wireless communication may be performed from the second apparatus to a third apparatus.

In accordance with embodiments of the present invention, the communication technique of using the human body as the communication medium is applied to the ticket inspection system to quickly provide the content after the ticket inspection.

BRIEF DESCRIPTION OF THE DRAWINGS

FIG. 3 is a table listing calculation results of a root-mean-square value of a voltage appearing across a receiver load resistor in the communication system of FIG. 1;

DESCRIPTION OF THE PREFERRED EMBODIMENTS

Figure 1:
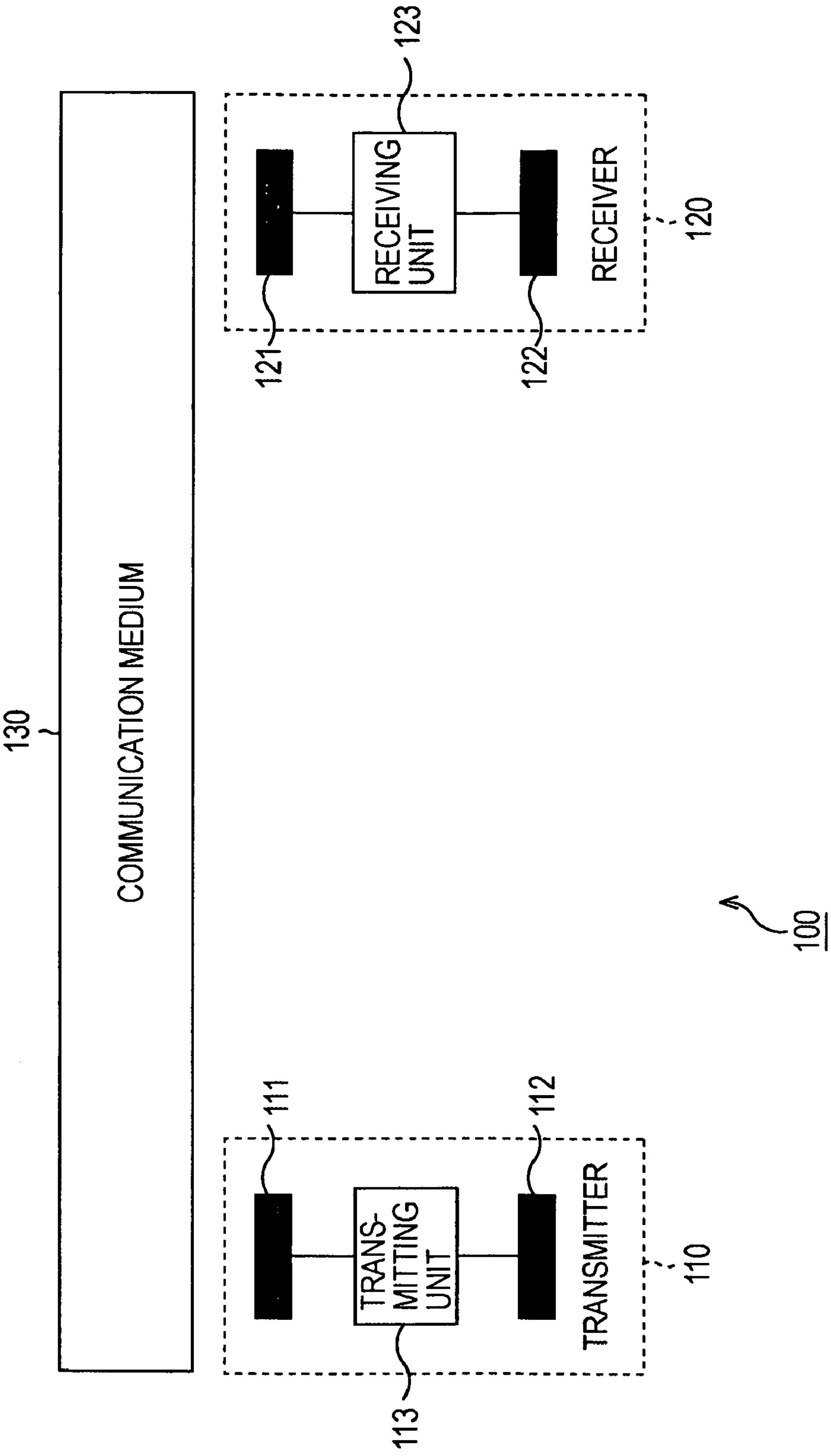
FIG. 1 is an underlying concept of a communication system in accordance with one embodiment of the present invention.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

In accordance with one embodiment of the present invention, an information processing system (for example, ticket inspection system 1500 of FIG. 48) includes a first information processing apparatus (for example, signal processor 1501 of FIG. 48), installed at a ticket gate, for performing a ticket inspection process, and a second information processing apparatus (for example, signal processor 1502 of FIG. 48) for performing a content delivery process subsequent to the ticket inspection process. The first information processing apparatus includes an authentication unit (for example, authentication processing unit 1071 of FIG. 49) for authenticating a communication terminal (for example, user device 1100 of FIG. 34) mounted on a passenger passing through the ticket gate by communicating with the communication terminal, the communication terminal communicating using as a communication medium a dielectric material including the human body of the passenger, a ticket inspection unit (for example, entry information setter 1074 of FIG. 49) for performing the ticket inspection process on the communication terminal authenticated by the authentication unit, and a registration unit (for example, device ID register 1525 of FIG. 49) for registering an identification of the communication terminal that has undergone the ticket inspection process. The second information processing apparatus includes an identification determination unit (for example, device ID searcher 1543 of FIG. 50) for determining whether the identification of the communication terminal acquired in communication with the communication terminal is registered by the first information processing apparatus, an information acquisition unit (for example, subscription determiner 1081 of FIG. 50) for acquiring subscription information of a content stored on the communication terminal if the identification determination unit determines that the identification of the communication terminal is registered by the first information processing apparatus, and a delivery unit (for example, content delivering unit 1083 of FIG. 50) for delivering the content to the communication terminal in accordance with the subscription information acquired by the information acquisition unit.

Another embodiment of the present invention is related to an information processing method of an information processing system including a first information processing apparatus, installed at a ticket gate, for performing a ticket inspection process, and a second information processing apparatus for performing a content delivery process subsequent to the ticket inspection process. The information processing method includes steps of, through the first information processing apparatus, authenticating a communication terminal mounted on a passenger passing through the ticket gate by communicating the communication terminal, the communication terminal communicating using as a communication medium a dielectric material including the human body of the passenger (for example, in step S21 of FIG. 40), performing the ticket inspection process on the authenticated communication terminal (for example, in step S27 of FIG. 40), and registering an identification of the communication terminal that has undergone the ticket inspection process (for example, in step S214 of FIG. 51), and through the second information processing apparatus, determining whether the identification of the communication terminal acquired in communication with the communication terminal is registered by the first information processing apparatus (for example, in step S233 of FIG. 52), acquiring subscription information of a content stored on the communication terminal if the identification of the communication terminal is determined to be registered by the first information processing apparatus (for example, in step S41 of FIG. 41), and delivering the content to the communication terminal in accordance with the acquired subscription information (for example, in step S46 of FIG. 41).

In accordance with one embodiment of the present invention, an information processing apparatus (for example, signal processor 1011 of FIG. 35) installed at a ticket gate for performing a ticket inspection process, includes an authentication unit (for example, authentication processing unit 1071 of FIG. 37) for authenticating a communication terminal (for example, user device 1100 of FIG. 34) mounted on a passenger passing through the ticket gate by communicating with the communication terminal, the communication terminal communicating using as a communication medium a dielectric material including the human body of the passenger, a ticket inspection unit (for example, entry information setter 1074 of FIG. 37) for performing the ticket inspection process on the communication terminal authenticated by the authentication unit, a registration unit (for example, device ID register 1056 of FIG. 37) for registering an identification of the communication terminal that has undergone the ticket inspection process, an identification determination unit (for example, device ID searcher 1054 of FIG. 37) for determining whether the identification of the communication terminal acquired in communication with the communication terminal is registered by the registration unit, an information acquisition unit (for example, subscription determiner 1081 of FIG. 37) for acquiring subscription information of a content stored on the communication terminal if the identification determination unit determines that the identification of the communication terminal is registered, and a delivery unit (for example, content delivering unit 1083 of FIG. 37) for delivering the content to the communication terminal in accordance with the subscription information acquired by the information acquisition unit.

Figure 40:
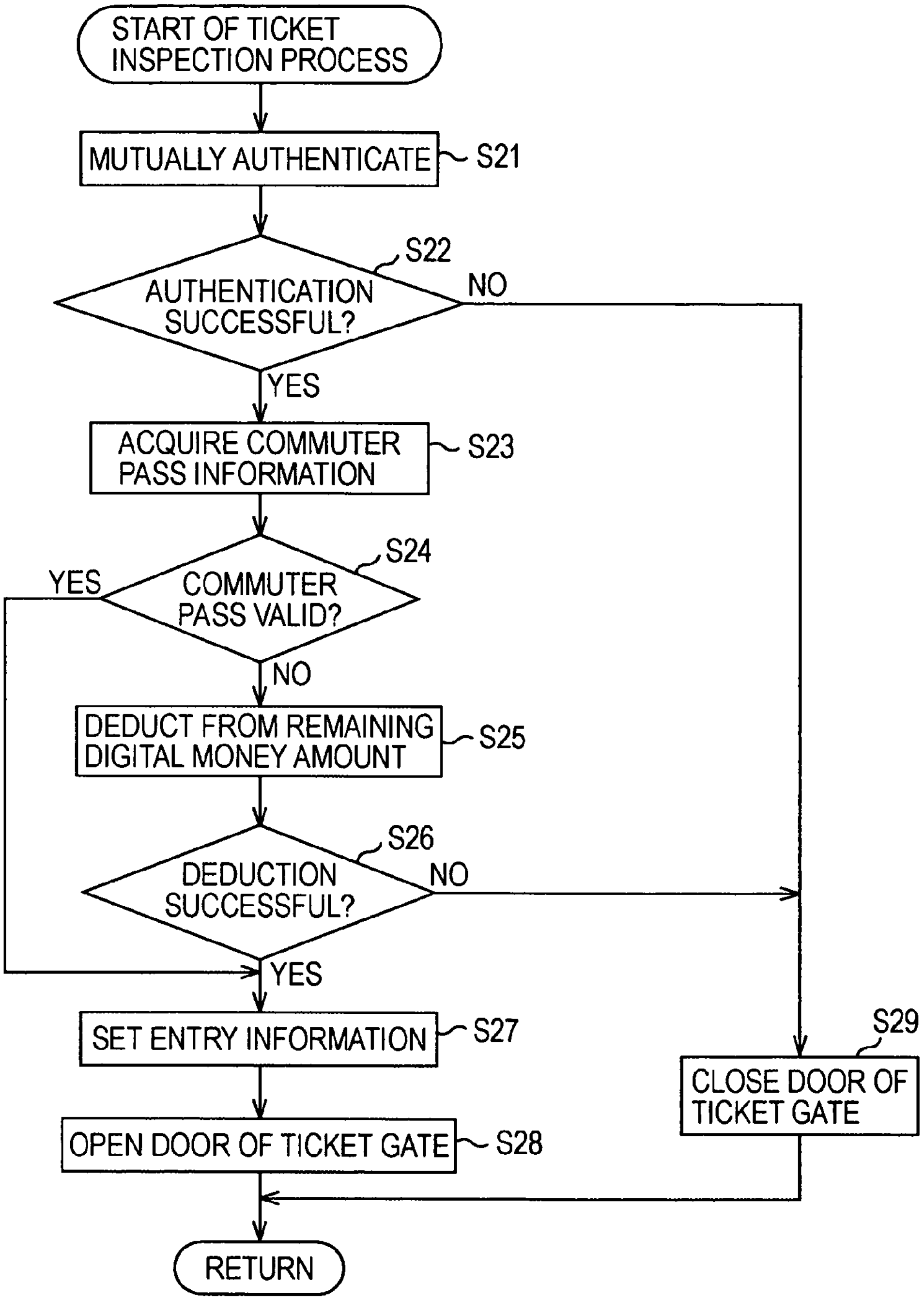
FIG. 40 is a flowchart illustrating a ticket inspection process in step S14 of FIG. 39.
Figure 41:
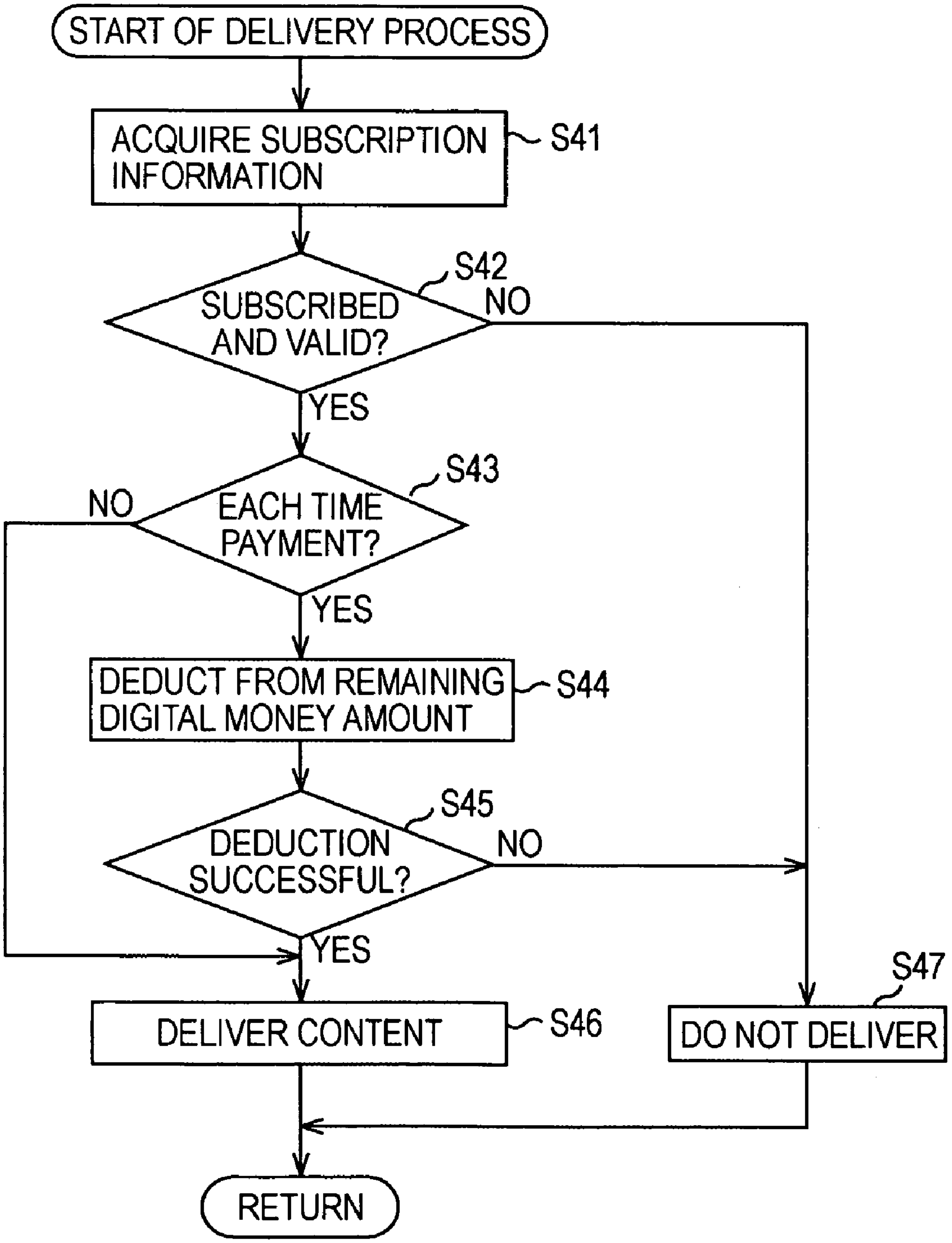
FIG. 41 is a flowchart illustrating a content delivery process performed in step S16 of FIG. 39.

Another embodiment of the present invention is related to one of an information processing method and a computer program of an information processing apparatus installed at a ticket gate for performing a ticket inspection process, and includes steps of authenticating a communication terminal mounted on a passenger passing through the ticket gate by communicating the communication terminal, the communication terminal communicating using as a communication medium a dielectric material including the human body of the passenger (for example, in step S21 of FIG. 40), performing the ticket inspection process on the authenticated communication terminal (for example, in step S27 of FIG. 40), registering an identification of the communication terminal that has undergone the ticket inspection process (for example, in step S15 of FIG. 39), determining whether the identification of the communication terminal acquired in communication with the communication terminal is registered (for example, in step S13 of FIG. 39), acquiring subscription information of a content stored on the communication terminal if the identification of the communication terminal is determined to be registered (for example, in step S41 of FIG. 41), and delivering the content to the communication terminal in accordance with the acquired subscription information (for example, in step S46 of FIG. 41).

The embodiments of the present invention are described below with reference to the drawings.

FIG. 1 illustrates an underlying communication system 100 of one embodiment of the present invention.

As shown in FIG. 1, the communication system 100 includes a transmitter 110, a receiver 120 and a communication medium 130. The communication system 100 is a system in which the transmitter 110 transmits a signal and the receiver 120 receives the signal via the communication medium 130. More specifically, in the communication system 100, a signal transmitted from the transmitter 110 is transferred via the communication medium 130 and then received by the receiver 120.

The transmitter 110 includes a transmission signal electrode 111, a transmission reference electrode 112 and a transmitting unit 113. The transmission signal electrode 111 is used to transmit a signal via the communication medium 130 and has a stronger capacitive coupling with the communication medium 130 than the transmission reference electrode 112. The transmission reference electrode 112 is used to obtain a reference point according to which a signal level difference is determined. The transmitting unit 113 is arranged between the transmission signal electrode 111 and the transmission reference electrode 112 and provides between the two electrodes an electrical signal (voltage change) to be transmitted to the receiver 120.

The receiver 120 includes a reception signal electrode 121, a reception reference electrode 122, and a receiving unit 123. The reception signal electrode 121 is used to receive a signal transferred via the communication medium 130 and has a stronger capacitive coupling with the communication medium 130 than the reception reference electrode 122. The reception reference electrode 122 serves as an electrode to obtain a reference point according to which a signal level difference is determined. The receiving unit 123 is arranged between the reception signal electrode 121 and the reception reference electrode 122 and converts an electrical signal (voltage change) occurring between the two electrodes into a desired electrical signal, thereby restoring the electrical signal generated by the transmitting unit 113 in the transmitter 110.

The communication medium 130 is made of a material having a physical property capable of conducting an electrical signal, for example, an electrically conductive material or a dielectric material. More specifically, the communication medium 130 may be made of a conductor such as a metal (for example, copper, iron, or aluminum). Alternatively, the communication medium 130 may be made of deionzed water, rubber, glass, an electrolytic solution such as a salt solution, or a dielectric material such as a human body which is a compound of these materials. The communication medium 130 may have any shape, such as wire, plate, sphere, cylindrical column.

The electrodes, the communication medium, and space surrounding the apparatuses of the communication system 100 are described first. For the simplicity of explanation, the communication medium 130 is a perfect conductor. Space is present between the transmission signal electrode 111 and the communication medium 130 and between the reception signal electrode 121 and the communication medium 130, but no electrical coupling is present between the transmission signal electrode 111 and the communication medium 130 and between the reception signal electrode 121 and the communication medium 130. More specifically, a capacitance is created between each of the transmission signal electrode 111 and the reception signal electrode 121 and the communication medium 130.

The transmission reference electrode 112 is arranged to look toward the outside space surrounding the transmitter 110, and the reception reference electrode 122 is arranged to look toward the outside space surrounding the receiver 120. Generally if a conductor is present in space, a capacitance is created in the space close to the surface of the conductor. For example, if the conductor has a sphere having a radius of r m, a capacitance C thereof is determined from the following equation (1):

$$C=4\pi\in r[F] \quad (1)$$

where π represents the circular constant, and ∈ represents a dielectric constant of the space surrounding the conductor and is represented by the following equation (2):

$$\in=\in_r\times\in_0 \quad (2)$$

where $\in_0$ is the dielectric constant of vacuum, namely, 8.854×$10^{-12}$ F/m, and $\in_r$ is a specific dielectric constant representing the ratio of the dielectric constant to the dielectric constant of vacuum.

As represented by equation (1), the larger the diameter r, the larger the capacitance C. Although the capacitance C of an object having a complex shape, other than the sphere, cannot be expressed in a form as simple as equation (1), it is obvious that the capacitance C changes depending on the size of the surface area of the object.

The transmission reference electrode 112 creates a capacitance in the space surrounding the transmitter 110 and the reception reference electrode 122 creates a capacitance in the space surrounding the receiver 120. When viewed from an imaginary point at infinity, the potential of the transmission reference electrode 112 and the reception reference electrode 122 is fixed and unlikely to vary.

The mechanism of communication of the communication system 100 is described below. For the simplicity of explanation, the word capacitor is used to refer to a capacitance depending on context, and the two words have the same meaning.

The transmitter 110 and the receiver 120 of FIG. 1 are sufficiently spaced to the distance under which mutual effect therebetween is negligible. In the transmitter 110, the transmission signal electrode 111 is capacitively coupled to only the communication medium 130. The transmission reference electrode 112 is sufficiently spaced from the transmission signal electrode 111 so that mutual effect therebetween is negligible (with no capacitive coupling). Similarly, in the receiver 120, the reception signal electrode 121 is capacitively coupled to only the communication medium 130, and the reception reference electrode 122 is sufficiently spaced from the reception signal electrode 121 (with no capacitive coupling). Since the transmission signal electrode 111, the reception signal electrode 121, and the communication medium 130 are installed in space in practice, each has a capacitance in the space. For simplicity of explanation, these capacitance is neglected.

Figure 2:
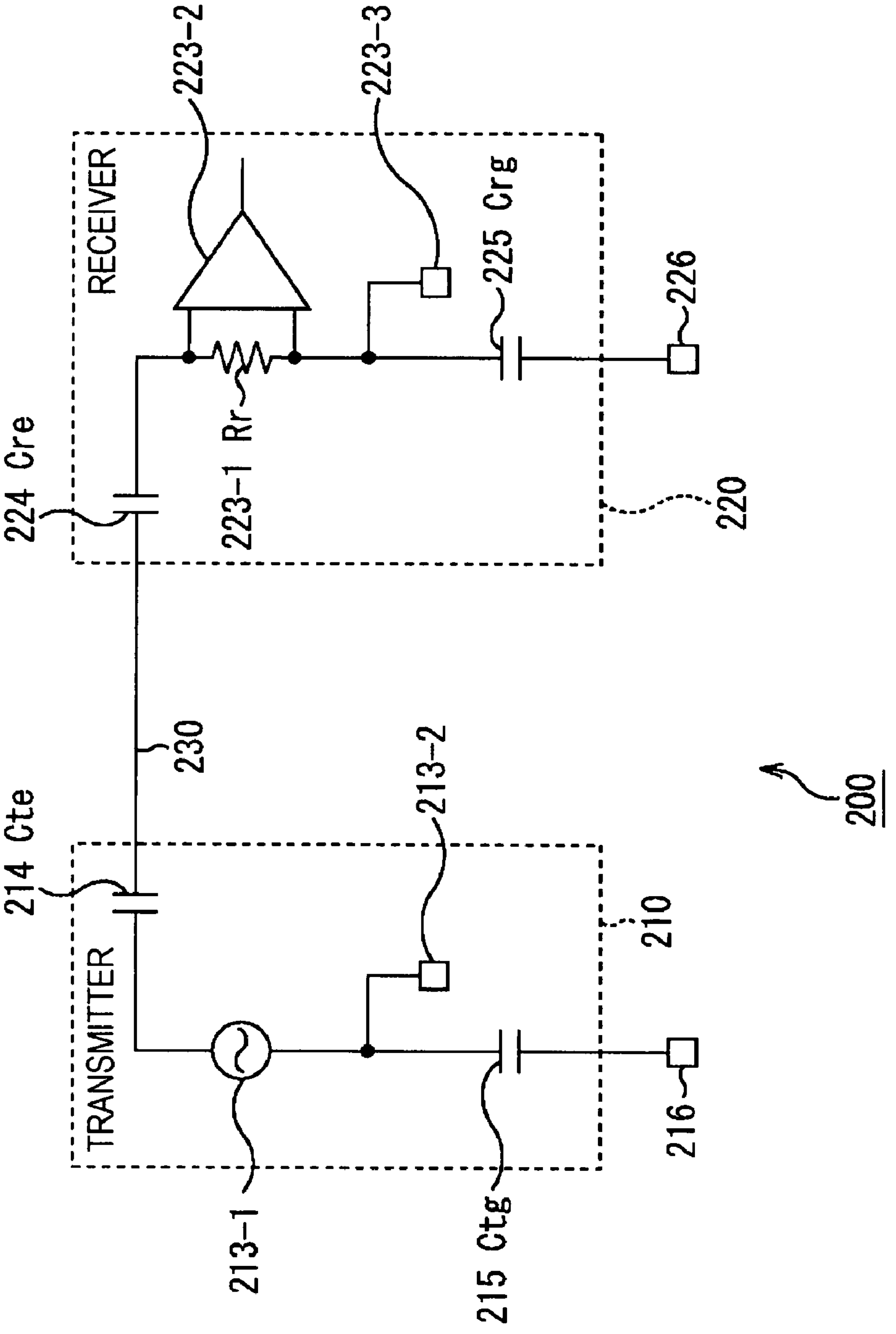
FIG. 2 illustrates an equivalent circuit of the communication system of FIG. 1 in the ideal state thereof.

FIG. 2 illustrates an equivalent circuit 200 of the communication system 100 of FIG. 1. The equivalent circuit 200 is substantially equivalent to the communication system 100.

The equivalent circuit 200 includes a transmitter 210, a receiver 220, and a connection line 230. The transmitter 210 corresponds to the transmitter 110 in the communication system 100 of FIG. 1, the receiver 220 corresponds to the receiver 120 in the communication system 100 of FIG. 1, and the connection line 230 corresponds to the communication medium 130 in the communication system 100 of FIG. 1.

In the transmitter 210 of FIG. 2, a signal source 213-1 and an in-transmitter reference point 213-2 correspond to the transmitting unit 113 of FIG. 1. The signal source 213-1 generates a sinusoidal wave having a particular period ω×t rad as a signal to be transmitted. Here, t s represents time, and ω rad/s is an angular frequency and expressed by the equation (3):

$$\omega=2\pi f[\text{rad}/s] \quad (3)$$

where π represents the circular constant, and f Hz represents a frequency of the signal generated by the signal source 213-1. The in-transmitter reference point 213-2 refers to a point that is connected to ground of a circuit in the transmitter 210. More specifically, one terminal of the signal source 213-1 is set to a predetermined reference potential of the circuit in the transmitter 210.

Cte 214 is a capacitor having a capacitance between the transmission signal electrode 111 and the communication medium 130 of FIG. 1. The Cte 214 is arranged between the other terminal of the signal source 213-1 opposite from the in-transmitter reference point 213-2 and the connection line 230. Ctg 215 is a capacitor representing a capacitance of the transmission reference electrode 112 of FIG. 1 with respect to space. The Ctg 215 is arranged between the terminal of the signal source 213-1 on the side of the in-transmitter reference point 213-2 and a reference point 216 representing the point at infinity (imaginary point) with respect to the transmitter 110 in space.

Rr 223-1, a detector 223-2 and a in-receiver reference point 223-3 in the receiver 220 of FIG. 2 correspond to the receiving unit 123 of FIG. 1. The Rr 223-1 is a load resistor (receiver load) to pick up a reception signal, and the detector 223-2 including an amplifier detects and amplifies a voltage difference across the Rr 223-1. The in-receiver reference point 223-3 is connected to ground of a circuit in the receiver 220. One terminal of the Rr 223-1 (one input terminal of the detector 223-2) is set to a predetermined potential level in the circuit in the receiver 220.

The detector 223-2 may have another function to demodulate a detected modulated signal, or to decode encoded information contained in the detected signal.

Cre 224 is a capacitor representing a capacitance between the reception signal electrode 121 and the communication medium 130 of FIG. 1. The Cre 224 is arranged between one terminal of the Rr 223-1 opposite from the in-receiver reference point 223-3 and the connection line 230. Crg 225 is a capacitor representing a capacitance of the reception reference electrode 122 of FIG. 1 with respect to space. The Crg 225 is arranged between the other terminal of the Rr 223-1 on the side of the in-receiver reference point 223-3 and a reference point 226 representing the point at infinity (imaginary point) with respect to the receiver 120 in space.

The connection line 230 represents the communication medium 130 as a perfect conductor. In the equivalent circuit 200 of FIG. 2, the Ctg 215 and the Crg 225 are electrically connected to the reference point 216 and the reference point 226, respectively. In practice, it is not necessary that the Ctg 215 and the Crg 225 be electrically connected to the reference point 216 and the reference point 226, respectively. It is sufficient if one of the transmitter 210 and the receiver 220 creates a capacitance with respect to respective surrounding space. More specifically, it is not necessary that the reference point 216 and the reference point 226 be electrically connected to each other, and the reference point 216 and the reference point 226 may be independent of each other.

A conductor must create a capacitance proportional to the surface area thereof with respect to surrounding space. The transmitter 210 and the receiver 220 may be mutually spaced from each other by any large distance. For example, if the communication medium 130 of FIG. 1 is a perfect conductor, the electric conductivity of the connection line 230 is considered to be infinity, and the length of the connection line 230 does not affect communications. If the communication medium 130 is a conductor having a sufficiently large electric conductivity, the distance between the transmitter 210 and the receiver 220 does not affect the reliability of communications in practice.

The equivalent circuit 200 includes a circuit composed of the signal source 213-1, the Rr 223-1, the Cte 214, the Ctg 215, the Cre 224, and the Crg 225. A combined resistance Cx of the four capacitors (Cte 214, Ctg 215, Cre 224, and Crg 225) is expressed by the following equation (4):

$$C_x = \frac{1}{\frac{1}{Cte} + \frac{1}{Ctg} + \frac{1}{Cre} + \frac{1}{Crg}} \; [F] \tag{4}$$

A sinusoidal wave vt(t) generated by the signal source 213-1 is expressed by the following equation (5):

$$Vt(t) = Vm \times \sin(\omega t + \theta) [V] \tag{5}$$

where Vm V represents a maximum amplitude voltage of a signal source voltage, and θ rad represents an initial phase angle. A root-mean-square value Vtrms V of the voltage generated by the signal source 213-1 is determined from the following equation (6):

$$Vtrms = Vm/\sqrt{2} [V] \tag{6}$$

The combined impedance of the entire circuit is calculated from the following equation (7):

$$Z = \sqrt{Rr^2 + \frac{1}{(\omega C_x)^2}} = \sqrt{Rr^2 + \frac{1}{(2\pi f C_x)^2}} \; [\Omega] \tag{7}$$

The root-mean-square value Vrrms of the voltage appearing across the Rr 223-1 is determined from the following equation (8):

$$V_{rrms} = \frac{Rr}{Z} \times V_{trms} = \frac{Rr}{\sqrt{Rr^2 + \frac{1}{(2\pi f C_x)^2}}} \times V_{trms} \; [V] \tag{8}$$

As represented in equation (8), the larger the resistance of Rr 223-1, the larger the capacitance Cx. The higher the frequency f Hz of the signal source 213-1, the smaller the term 1/((2πfC)2) becomes, and the larger signal occurs across the Rr 223-1.

For example, FIG. 3 is a table 250 listing the calculation results of the root-mean-square value Vrrms of the voltage generated across the Rr 223-1 in response to the root-mean-square value Vtrms of the fixed voltage of the signal source 213-1 in the transmitter 210. The results are obtained under the conditions that the frequency f of the signal generated by the signal source 213-1 is 1 MHz, 10 MHz or 100 MHz, the resistance of the Rr 223-1 is 10 KΩ, 100 kΩ, or 1 M, and the capacitance Cx of the entire circuit is 0.1 pF, 1 pF, or 10 pF.

With reference to the table 250, given the other conditions unchanged, the calculation results of the root-mean-square value Vrrms become larger with a frequency f of 10 MHz than with a frequency f of 1 MHz, with a receiving load resistance of Rr 223-1 of 1 MΩ than with a receiving load resistance of Rr 223-1 of 10 KΩ, and with a capacitance Cx of 10 pF than with a capacitance Cx of 0.1 pF. More specifically, the higher the frequency f, the larger the resistance of Rr 223-1, and the larger the capacitance Cx, the larger root-mean-square value Vrrms results.

The table 250 shows that an electrical signal is generated even with a capacitance equal to or less than 1 pF. Even if the signal level of the transmitted signal is extremely low, communications are still possible if a signal detected by the detector 223-2 in the receiver 220 is amplified.

Figure 4:
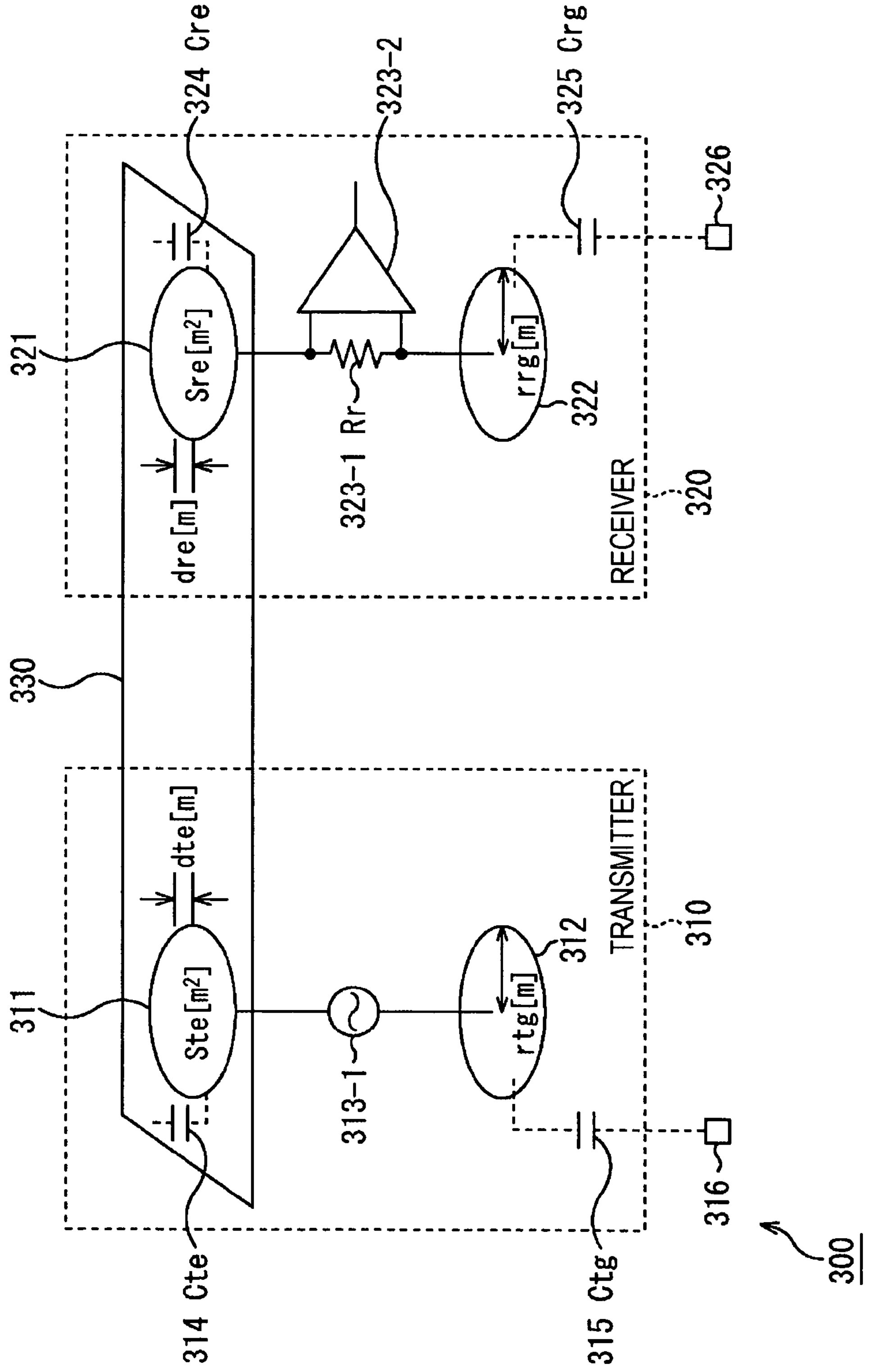
FIG. 4 illustrates a physical model of the communication system of FIG. 1.

Calculation examples of parameters of the equivalent circuit 200 are specifically described below with reference to FIG. 4. FIG. 4 illustrates the calculation example accounting for the physical structure of the communication system 100.

A communication system 300 of FIG. 4 corresponds to the communication system 100 of FIG. 1. In other words, the communication system 300 is the equivalent circuit 200 of FIG. 2 with the physical information of the communication system 100 attached thereto. The communication system 300 includes a transmitter 310, a receiver 320, and a communication medium 330. If described in comparison with the communication system 100 of FIG. 1, the transmitter 310 corresponds to the transmitter 110, the receiver 320 corresponds to the receiver 120, and the communication medium 330 corresponds to the communication medium 130.

The transmitter 310 includes a transmission signal electrode 311 corresponding to the transmission signal electrode 111, a transmission reference electrode 312 corresponding to the transmission reference electrode 112, and a signal source 313-1 corresponding to the transmitting unit 113. One terminal of the signal source 313-1 connects to the transmission signal electrode 311 and the other terminal of the signal source 313-1 connects to the transmission reference electrode 312. The transmission signal electrode 311 is arranged to be close to the communication medium 330. The transmission reference electrode 312 is spaced apart from the communication medium 330 so that the transmission reference electrode 312 is not affected by the communication medium 330, and has a capacitance with respect to external space surrounding the transmitter 310. As shown in FIG. 2, the transmission signal electrode 311 corresponds to the signal source 213-1 and the in-transmitter reference point 213-2, but in FIG. 4, the in-transmitter reference point is omitted for convenience of explanation.

As the transmitter 310, the receiver 320 includes a reception signal electrode 321 corresponding to the reception signal electrode 121, a reception reference electrode 322 corresponding to the reception reference electrode 122, and an Rr 323-1 and a detector 323-2 corresponding to the receiving unit 123. The reception signal electrode 321 connects to one terminal of the Rr 323-1 and the reception reference electrode 322 connects to the other terminal of the Rr 323-1. The reception signal electrode 321 is arranged to be close to the communication medium 330. The reception reference electrode 322 is spaced part from the communication medium 330 so that the reception reference electrode 322 is not affected by the communication medium 330. The reception reference electrode 322 has a capacitance with respect to external space surrounding the receiver 320. As shown in FIG. 2, the receiving unit 123 corresponds to the Rr 223-1, the detector 223-2, and the in-receiver reference point 223-3. As shown in FIG. 4, the corresponding in-receiver reference point is omitted.

The communication medium 330 is a perfect conductor in the same manner as in FIGS. 1 and 2. The transmitter 310 and the receiver 320 are sufficiently spaced apart from each other in a manner such that mutual effect is negligible. The transmission signal electrode 311 is capacitively coupled to only the communication medium 330. The transmission reference electrode 312 is sufficiently spaced from the transmission signal electrode 311 in a manner such that mutual effect is negligible. Similarly, the reception signal electrode 321 is capacitively coupled to only the communication medium 330. The reception reference electrode 322 is sufficiently spaced apart from the reception signal electrode 321 in a manner such that mutual effect is negligible. Strictly speaking, the transmission signal electrode 311, the reception signal electrode 321, and the communication medium 330 have capacitances thereof with respect to spacing, but for convenience of explanation, the capacitances are neglected.

As shown in FIG. 4, the transmitter 310 is arranged on one end of the communication medium 330 and the receiver 320 is arranged on the other end of the communication medium 330 in the communication system 300.

A distance of dte m is permitted between the transmission signal electrode 311 and the communication medium 330. If the transmission signal electrode 311 is a conductive disk having a surface area of Ste $m^2$ on one side, a capacitance Cte 314 created with the communication medium 330 is determined from the following equation (9):

$$Cte = \varepsilon \times \frac{Ste}{dte} \quad [F] \tag{9}$$

Equation (9) is known as an equation for determining a capacitance of parallel plates. Equation (9) holds true when the parallel plates have the same area. However, even if the parallel plates are different in area, the use of equation (9) does not make much difference in the result. Equation (9) is thus used herein. In equation (9), ∈ represents a dielectric constant. If the communication system 300 is placed in the air, a specific dielectric constant ∈r is approximately 1. The dielectric constant ∈ is considered to be equal to the dielectric constant ∈0 of the vacuum. The capacitance Cte 314 is expressed by the following equation (10) if the surface area Ste of the transmission signal electrode 311 is $2\times10^{-3}$ $m^2$ (having a diameter of about 5 cm) and the spacing dte is $5\times10^{-3}$ m (5 mm):

$$Cte=(8.854\times10^{-12})\times2\times10^{-3}/5\times10^{-3}\approx3.5[pF] \tag{10}$$

Equation (9) holds in the strict sense in the actual physical phenomenon when the relationship of Ste>>dtet is satisfied. Equation (9) approximately holds herein.

Capacitance Ctg 315, constructed of the transmission reference electrode 312 and space, is described below. If a disk having a radius of r m is placed in space, a capacitance C F formed between the disk and the space is determined from equation (11):

$$C=8\in r[F] \tag{11}$$

The communication system 300 may be placed in the air and the dielectric constant of the air may be approximated by the dielectric constant of vacuum ∈0. If the transmission reference electrode 312 is a conductive disk having a radius of rgt=$2.5\times10^{-2}$ m (2.5 cm), the capacitance Ctg 315 formed of the transmission reference electrode 312 and the space is determined using the following equation (12) in view of equation (11):

$$\begin{aligned} Ctg &= 8\times8.854\times10^{-12}\times2.5\times10^{-2} \\ &\approx 1.8 \quad [\text{pF}] \end{aligned} \tag{12}$$

If the reception signal electrode 321 and the transmission signal electrode 311 equal to each other in size and have the same distance to the communication medium 330, a capacitance Cre 324 constructed of the reception signal electrode 321 and the communication medium 330 equals the capacitance Cte 314 on the transmitter side, namely, is approximately 3.5 pF. If the reception reference electrode 322 and the transmission reference electrode 312 equal to each other in size, a capacitance Crg 325 constructed of the reception reference electrode 322 and space equals the capacitance Ctg 315, namely, is approximately 1.8 pF. A combined capacitance Cx of four capacitances, namely, Cte 314, Ctg 315, Cre 324, and Crg 325, is determined using the following equation (13) in view of equation (4).

$$C_x = \frac{1}{\frac{1}{Cte} + \frac{1}{Ctg} + \frac{1}{Cre} + \frac{1}{Crg}} = \frac{1}{\frac{1}{3.5\times10^{-12}} + \frac{1}{1.8\times10^{-12}} + \frac{1}{3.5\times10^{-12}} + \frac{1}{1.8\times10^{-12}}} \approx 0.6\ [\mathrm{pF}] \tag{13}$$

More strictly, Cx=0.525 pF.

The root-mean-square value Vrrms generated across the Rr 323-1 is determined using the following equation (14) if the frequency f of the signal source 313-1 is 1 MHz, the root-mean-square value of the voltage Vtrms is 2 V and the Rr 323-1 is 100 KΩ:

$$V_{rrms} = \frac{Rr}{\sqrt{Rr^2 + \frac{1}{(2\pi f C_x)^2}}} \times V_{trms} = \frac{1\times10^5}{\sqrt{(1\times10^5)^2 + \frac{1}{(2\times\pi\times(1\times10^6)\times(0.6\times10^{-12}))^2}}} \times 2 \approx 0.71\ [\mathrm{V}] \tag{14}$$

From the above results, a signal can be conducted from the transmitter to the receiver using the capacitance created with respect to the space.

The capacitance of the transmission reference electrode and the reception electrode with respect to the space can be created if space is available at the location of each electrode. The transmitter and the receiver can achieve communication reliability regardless of the distance therebetween if the transmitter and the receiver are coupled to each other via the communication medium.

Figure 5:
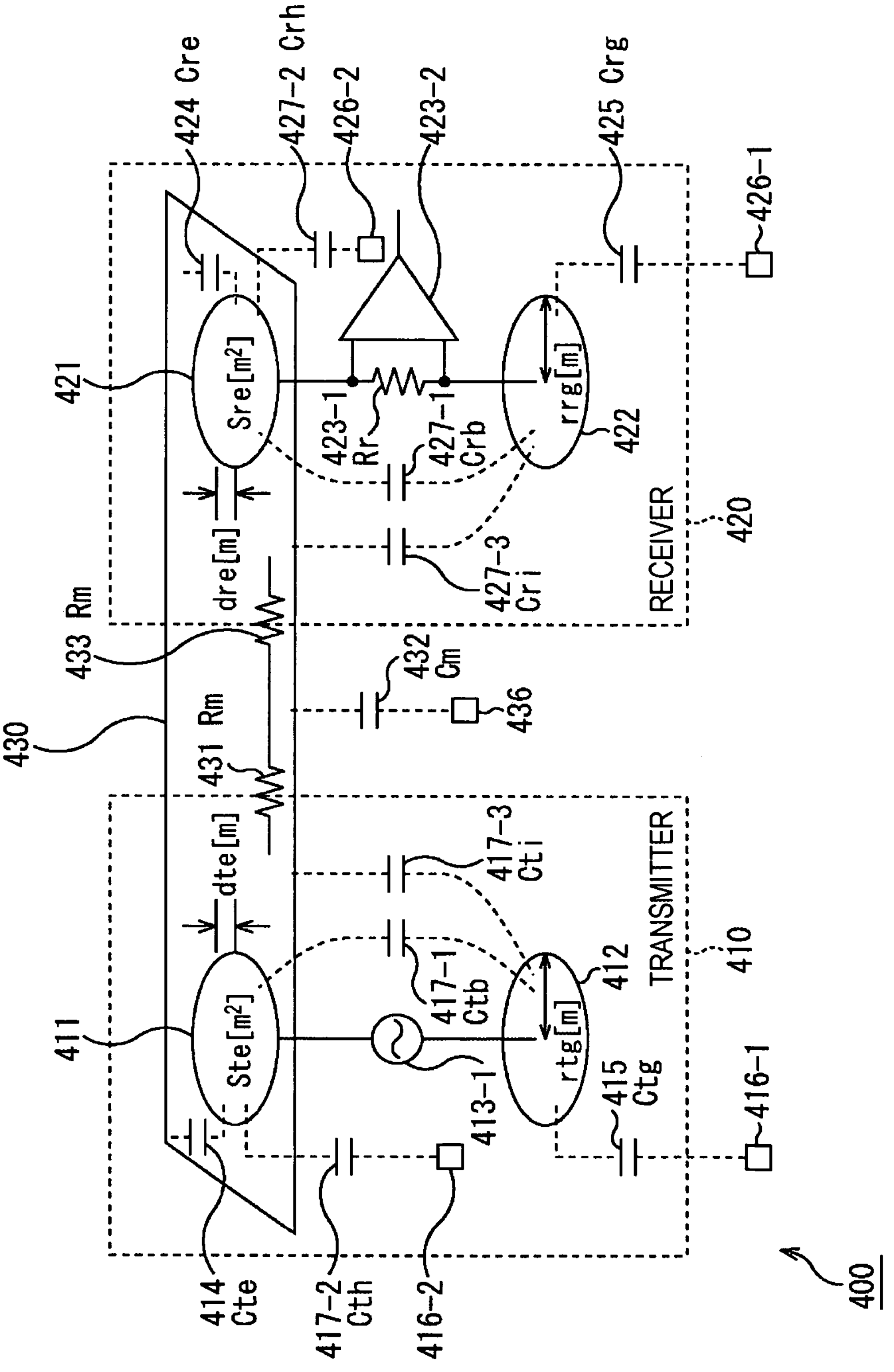
FIG. 5 illustrates parameters generated in the communication system of FIG. 4.

The communication system may be physically constructed. FIG. 5 illustrates a calculation model of parameters generated in the communication system when the above-described communication system is actually physically constructed.

A communication system 400 includes a transmitter 410, a receiver 420 and a communication medium 430. The communication system 400 corresponds to the communication system 100 (also the equivalent circuit 200 and the communication system 300), and is basically identical to each of the communication systems 100, 200, and 300 except parameters to be analyzed.

In comparison with the communication system 300, the transmitter 410 corresponds to the transmitter 310. In the transmitter 410, a transmission signal electrode 411 corresponds to the transmission signal electrode 311, a transmission reference electrode 412 corresponds to the transmission reference electrode 312, and a signal source 413-1 corresponds to the signal source 313-1. The receiver 420 corresponds to the receiver 320. In the receiver 420, a reception signal electrode 421 corresponds to the reception signal electrode 321, a reception reference electrode 422 corresponding to the reception reference electrode 322, Rr 423-1 corresponds to the Rr 323-1, and a detector 423-2 corresponds to the detector 323-2. The communication medium 430 corresponds to the communication medium 330.

The parameters are now described. A capacitance Cte 414 between the transmission signal electrode 411 and the communication medium 430 corresponds to the capacitance Cte 314 of the communication system 300. A capacitance Ctg 415 of the transmission reference electrode 412 with respect to space corresponds to the capacitance Ctg 315 of the communication system 300. A reference point 416-1 representing the point at infinity as an imaginary point viewed from the transmitter 410 corresponds to the reference point 316 of the communication system 300. The transmission signal electrode 411 is a circular disk electrode having an area Ste $m^2$, and arranged at a location spaced from the communication medium 430 by a small distance dte m. The transmission reference electrode 412 is also a circular disk having a radius of rtg m.

On the side of the receiver 420, a capacitance Cre 424 between the reception signal electrode 421 and the communication medium 430 corresponds to the capacitance Cre 324 of the communication system 300. A capacitance Crg 425 of the reception reference electrode 422 with respect to space corresponds to the capacitance Crg 325 of the communication system 300. A reference point 426-1 representing an imaginary point at infinity from the receiver 420 in space corresponds to the reference point 362 of the communication system 300. The reception signal electrode 421 is a circular disk having an area of Sre $m^2$, and arranged to be spaced from the communication medium 430 by a small distance dre m. The reception reference electrode 422 is also a circular disk having a radius of rrg m.

The communication system 400 includes new parameters in addition to the above-described parameters.

For example, the transmitter 410 includes as new parameters a capacitance Ctb 417-1 created between the transmission signal electrode 411 and the transmission reference electrode 412, a capacitance Cth 417-2 created between the transmission signal electrode 411 and space, and a capacitance Cti 417-3 created between the transmission reference electrode 412 and the communication medium 430.

The receiver 420 includes as new parameters a capacitance Crb 427-1 created between the reception signal electrode 421 and the reception reference electrode 422, a capacitance Crh 427-2 created between the reception signal electrode 421 and space, and a capacitance Cri 427-3 created between the reception reference electrode 422 and the communication medium 430.

The communication medium 430 includes as a new parameter a capacitance Cm 432 created between the communication medium 430 and space. The communication medium 430 has an electrical resistance depending on size and material, thereby including as new parameters a resistance Rm 431 and resistance Rm 433.

If the communication medium 430 contains not only conductivity but also a dielectric constant in the communication system 400 of FIG. 5, a capacitance responsive to the dielectric constant (not shown) is also created. If the communication medium 430 has only dielectric constant with no conductivity, a capacitance determined by a dielectric constant, distance, length, size and location of a dielectric material is created between the transmission signal electrode 411 and the reception signal electrode 421.

It is premised that the transmitter 410 and the receiver 420 are spaced apart by a distance far enough to neglect mutual capacitive coupling therebetween. If the distance is near, capacitances of electrodes may need to be considered depending on the positional relationship of the electrodes in the transmitter 410 and the electrodes in the receiver 420, in accordance with the concept previously discussed.

Figure 6:
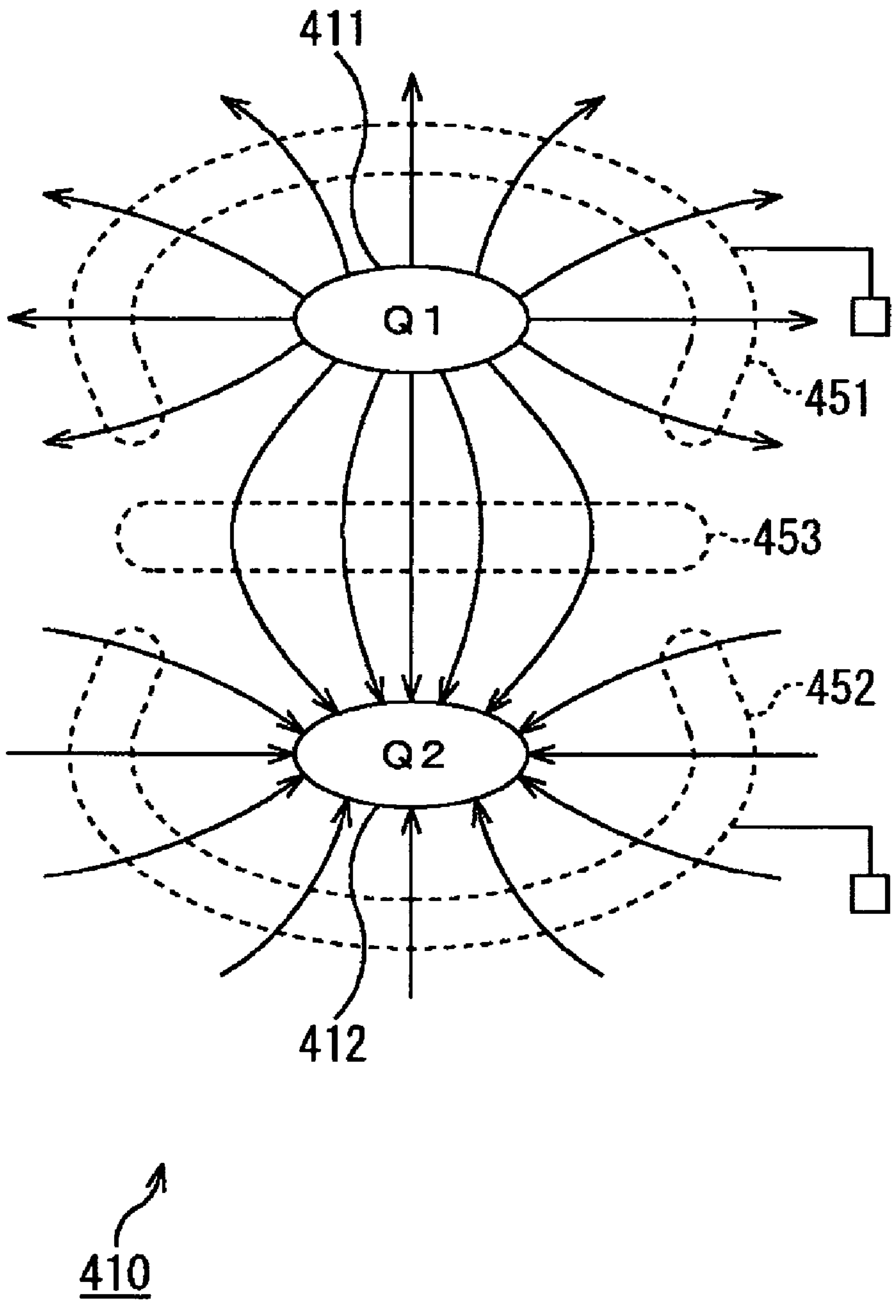
FIG. 6 illustrates a distribution of electric lines of force generated with respect to electrodes.
Figure 7:
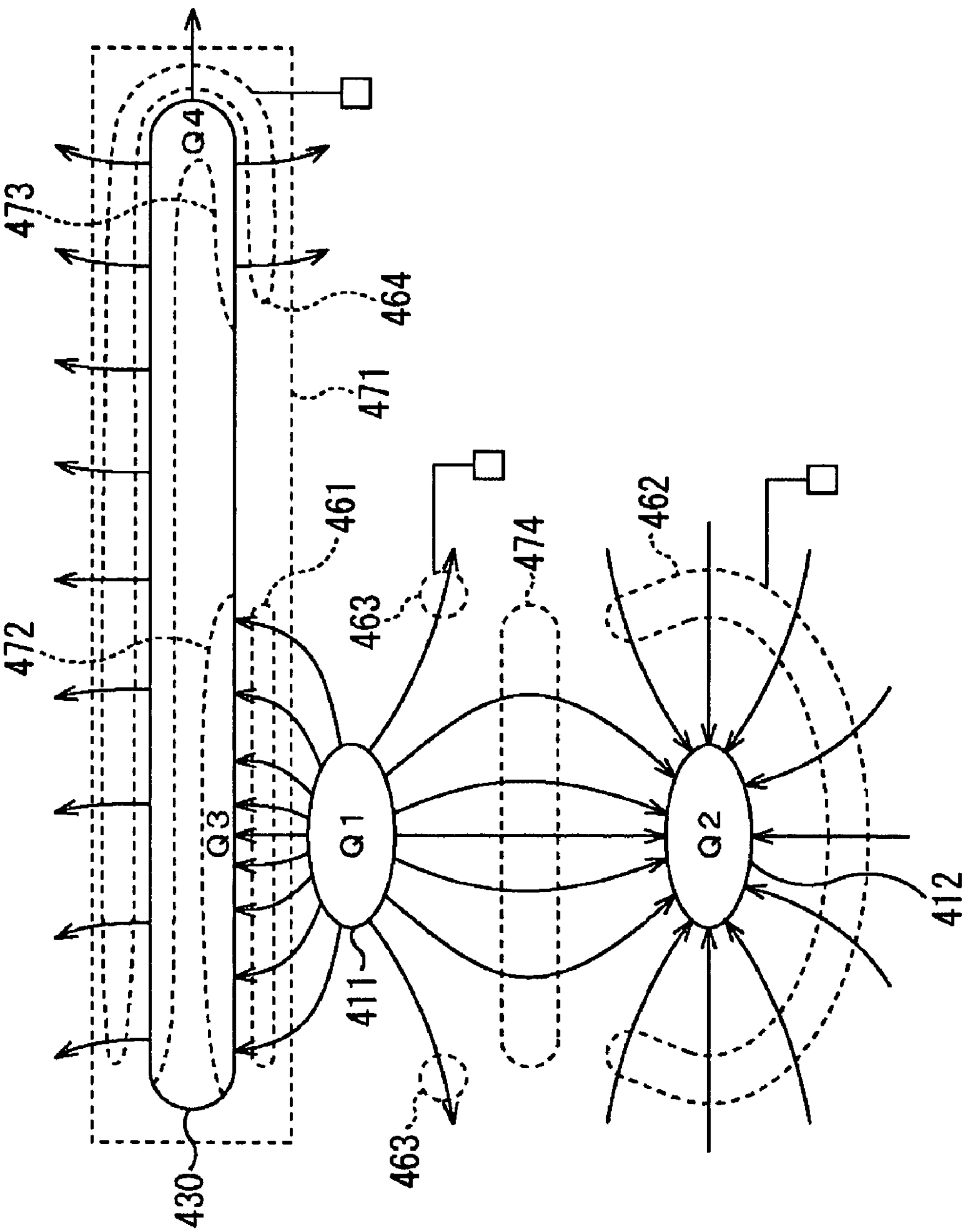
FIG. 7 illustrates another distribution of electric lines of forces generated with respect to electrodes.

Operation of the communication system 400 of FIG. 5 is described below using electric lines of force. FIGS. 6 and 7 illustrate the relationship between electrodes and between electrodes and the communication medium 430 in the transmitter 410 in the communication system 400 using the electric lines of force.

FIG. 6 diagrammatically illustrates a distribution of electric lines of force with no communication medium 430 employed. The transmission signal electrode 411 has a positive charge (is positively charged) while the transmission reference electrode 412 has a negative charge (is negatively charged). Arrow-headed lines represent electric lines of force, and the direction thereof looks toward the negative charge from the positive charge. Each electric line of force does not suddenly disappear in the way thereof, and reaches an object having an opposite charge or an imaginary point at infinity.

Electric lines of force 451 represent ones that terminate on the point at infinity from among the electric lines of force directed from the transmission signal electrode 411. Electric lines of force 452 represent ones that originate on the point at infinity and terminate on the transmission reference electrode 412. Electric lines of force 453 represent ones that are directed between the transmission signal electrode 411 and the transmission reference electrode 412. As shown in FIG. 6, lines of forces originate or terminate on each of the electrodes in the transmitter 410 that is positively or negatively charged. The distribution of electric lines of force is determined by the size of each electrode, and the positional relationship of the electrodes.

FIG. 7 diagrammatically illustrates the distribution of electric lines of force when the communication medium 430 is placed closer to the transmitter 410. Since the communication medium 430 is close to the transmission signal electrode 411, coupling therebetween is intensified. Most of the electric lines of force 451 having terminated on the infinity point now become electric lines of force 461 terminating on the communication medium 430. The number of electric lines of force 463 terminating on the infinity point (electric lines of force 451 in FIG. 6) is now reduced. A capacitance (Cth 417-2 of FIG. 5) with respect to the infinity point viewed from the transmission signal electrode 411 decreases, and a capacitance (Cte 414 of FIG. 5) with respect to the communication medium 430 increases. In practice, a capacitance (Cti 417-3 of FIG. 5) is also present between the transmission reference electrode 412 and the communication medium 430, but neglected herein.

According to the Gauss law, the number N of electric lines of force originating on any closed surface S equals all charges contained in the closed surface S divided by ∈, and is not affected by charges external to the closed surface S. If n charges are present within the closed surface S, the following equation (15) holds:

$$N = \frac{1}{\varepsilon}\sum_{i=1}^{n} q_i \quad \text{[Lines]} \tag{15}$$

where i is an integer and a variable qi represents an amount of charge accumulated in each electrode. Equation (15) shows that electric lines of force originating from the closed surface S of the transmission signal electrode 411 are determined by the charges present in the closed surface S and that all electric lines of force entering one location from outside the transmission reference electrode 412 also exit from another location.

The communication medium 430 may not be grounded as shown in FIG. 7. According to the Gauss law, charges Q3 are induced on an area 472 of the communication medium 430 near the electric lines of force 461 through electrostatic induction, because there is no source for charge in a closed surface 471 near the communication medium 430. A total amount of charge of the communication medium 430 remains unchanged because the communication medium 430 is not grounded. Charges Q4 equal to but opposite from the charges Q3 are induced on an area 473 outside the area 472 bearing the charges Q3. Electric lines of force 464 caused by the charges Q4 originate from the closed surface 471. The larger the communication medium 430, the more the charges Q4 are spread, and the smaller the charge density becomes. The number of electric lines of force per unit area is also reduced.

The communication medium 430, if a perfect conductor, becomes equipotential on the entire body thereof because of the property of the perfect conductor, and has a substantially uniform charge density on the entire body. If the communication medium 430 is a dielectric material having a resistance, the number of electric lines of force is reduced depending on distance. If the communication medium 430 is a dielectric material having no conductivity, the electric lines of force are dispersed and directed through polarization. If n conductors are present in space, a charge Qi in each conductor is determined using the following equation (16):

$$Q_i = \sum_{j=1}^{n} (C_{ij} \times V_j) \quad \text{[C]} \tag{16}$$

where i and j are integers, and Cji represents a capacity coefficient of a conductor i and a conductor j, and may be considered as having the same property as a capacitance. The capacity coefficient is determined by only shapes and positional relationship of the conductors. The capacity coefficient Cii is a capacitance of the conductor i itself with respect to space. Further, Cij=Cji. In equation (16), a system composed of a plurality of conductors is known to work on the superposition principle. The charge of any conductor of interest is determined by a total sum of products of capacitance between conductors and a voltage in each conductor.

Parameters related to FIG. 7 and equation (16) are defined as below. For example, Q1 represents a charge induced on the transmission signal electrode 411, Q2 represents a charge induced on the transmission reference electrode 412, Q3 represents a charge induced on the communication medium 430 by the transmission signal electrode 411, and Q4 represents a charge, equal to and opposite from the charge Q3, on the communication medium 430.

V1 represents a voltage of the transmission signal electrode 411 with respect to the infinity point, V2 represents a voltage of the transmission reference electrode 412 with respect to the infinity point, and V3 represents a voltage of the communication medium 430 with respect to the infinity point. C12 represents a capacity coefficient between the transmission signal electrode 411 and the transmission reference electrode 412, C13 represents a capacity coefficient between the transmission signal electrode 411 and the communication medium 430, C15 represents a capacity coefficient between the transmission signal electrode 411 and space, C25 represents a capacity coefficient between the transmission reference electrode 412 and space, and C35 represents a capacity coefficient between the communication medium 430 and space.

The charge Q3 is determined from the following equation (17):

$$Q3=C13\times V1[C] \tag{17}$$

More strictly, equation (17) should be equation (17'). Since a second term and a third term on the right side of equation (17'), namely, C23×V2+V53×V5 are small in equation (17'), equation (17) is employed here.

$$Q3=C13\times V1+C23\times V2+C53\times V5 \tag{17'}$$

To apply a large amount of electric field to the communication medium 430, the charge Q3 needs to be increased. To this end, the capacity coefficient C13 between the transmission signal electrode 411 and the communication medium 430 is increased to provide a sufficiently high voltage V1. The capacity coefficient C13 is determined by only shape and positional relationship of related electrodes. The smaller the mutual distance between the electrodes, and the larger the facing areas of the electrodes, the higher the capacitance becomes. The voltage V1 needs to be sufficiently high when viewed from the infinity point. A voltage is provided between the transmission signal electrode 411 and the transmission reference electrode 412 by the signal source on the transmitter 410. For a sufficiently high voltage to appear when viewed from the infinity point, the behavior of the transmission reference electrode 412 becomes important.

If the transmission reference electrode 412 is infinitesimal in size, and the transmission signal electrode 411 is sufficiently large, the capacity coefficient C12 and the capacity coefficient C25 become small. On the other hand, capacity coefficients C13, C15, and C45 have large values and are electrically less variable. Most of voltage difference caused in the signal source appears as the voltage V2 of the transmission reference electrode 412, and the voltage V1 of the transmission signal electrode 411 becomes smaller.

Figure 8:
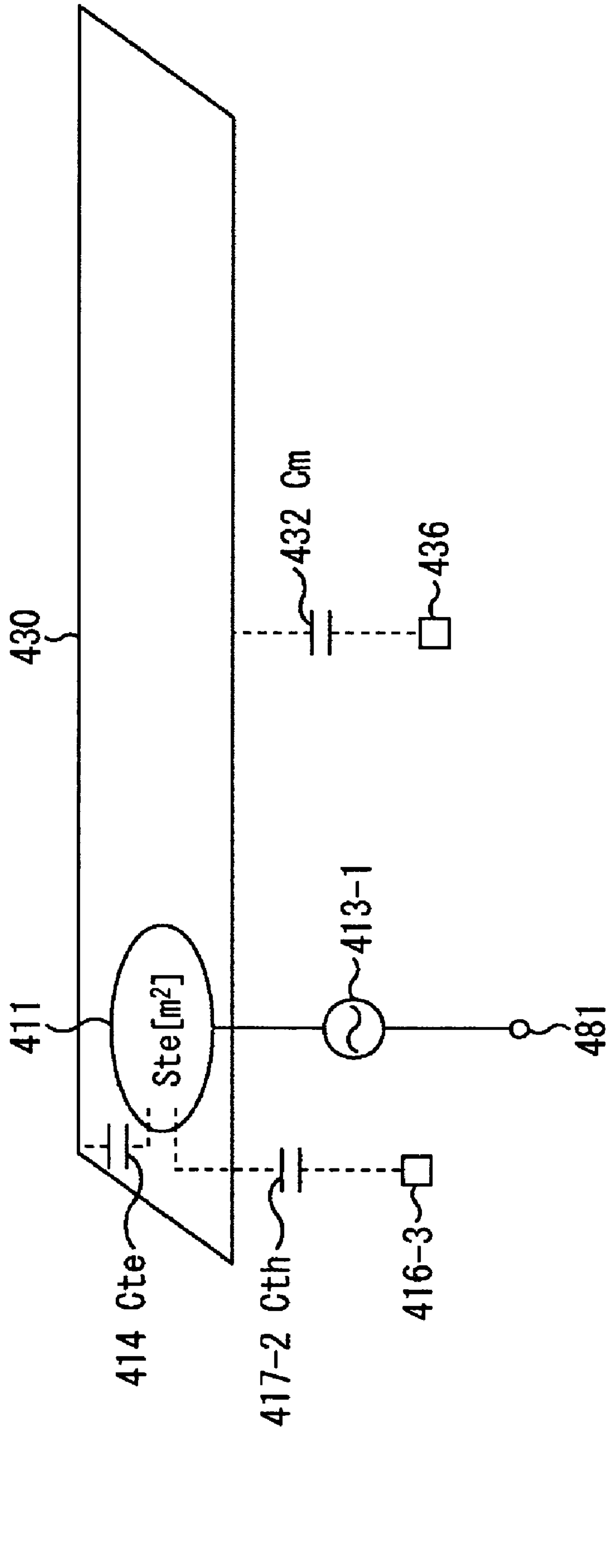
FIG. 8 illustrates one model of electrode in a transmitter.

This process is shown in FIG. 8. A transmission reference electrode 481 is coupled to neither conductor nor the infinity point because of the small size thereof. The transmission signal electrode 411 creates a capacitance Cte with the communication medium 430 while also forming a capacitance Cth 417-2 with respect to space. The communication medium 430 creates the capacitance Cm 432 with respect to space. Since the capacitance Cte 414, the capacitance Cth 417-2 and the capacitance Cm 432, each related to the transmission signal electrode 411 are predominantly large. Even if a voltage occurs between the transmission signal electrode 411 and the transmission reference electrode 412, a large amount of energy is required to vary the voltage of the capacitances related to the transmission signal electrode 411. Since the capacitance of the transmission reference electrode 481 facing a signal source 413-1 is small, the voltage of the transmission signal electrode 411 varies little, and a voltage change of the signal source 413-1 appears on the side of the transmission reference electrode 481.

Conversely, the transmission signal electrode 411 may be infinitesimal in size and the transmission reference electrode 481 may be sufficiently large. The transmission reference electrode 481 increases the capacitance thereof with respect to space, thereby becoming electrically less variable. Although a sufficiently high voltage V1 is generated on the transmission signal electrode 411, capacitive coupling with the communication medium 430 becomes weak, and no sufficient electric field cannot be applied.

In a balanced operation, the transmission reference electrode preferably provides a sufficiently high voltage while applying an electric field required for communications from the transmission signal electrode to the communication medium. The transmitter side only has been considered, and the same is true of the relationship between the electrodes of the receiver 420 and the communication medium 430 in FIG. 5.

The infinity point not necessarily means a physically long distance point. In practice, the infinity point may be placed in the space surrounding the apparatus. Ideally, the infinity point is reliably stable in voltage in the entire system. In actual application environments, noise entering through power source lines or generated in electric appliances such as illumination apparatuses is present. It is sufficient if the noise falls outside a frequency band the signal source uses or if the noise is at a negligible level.

Figure 9:
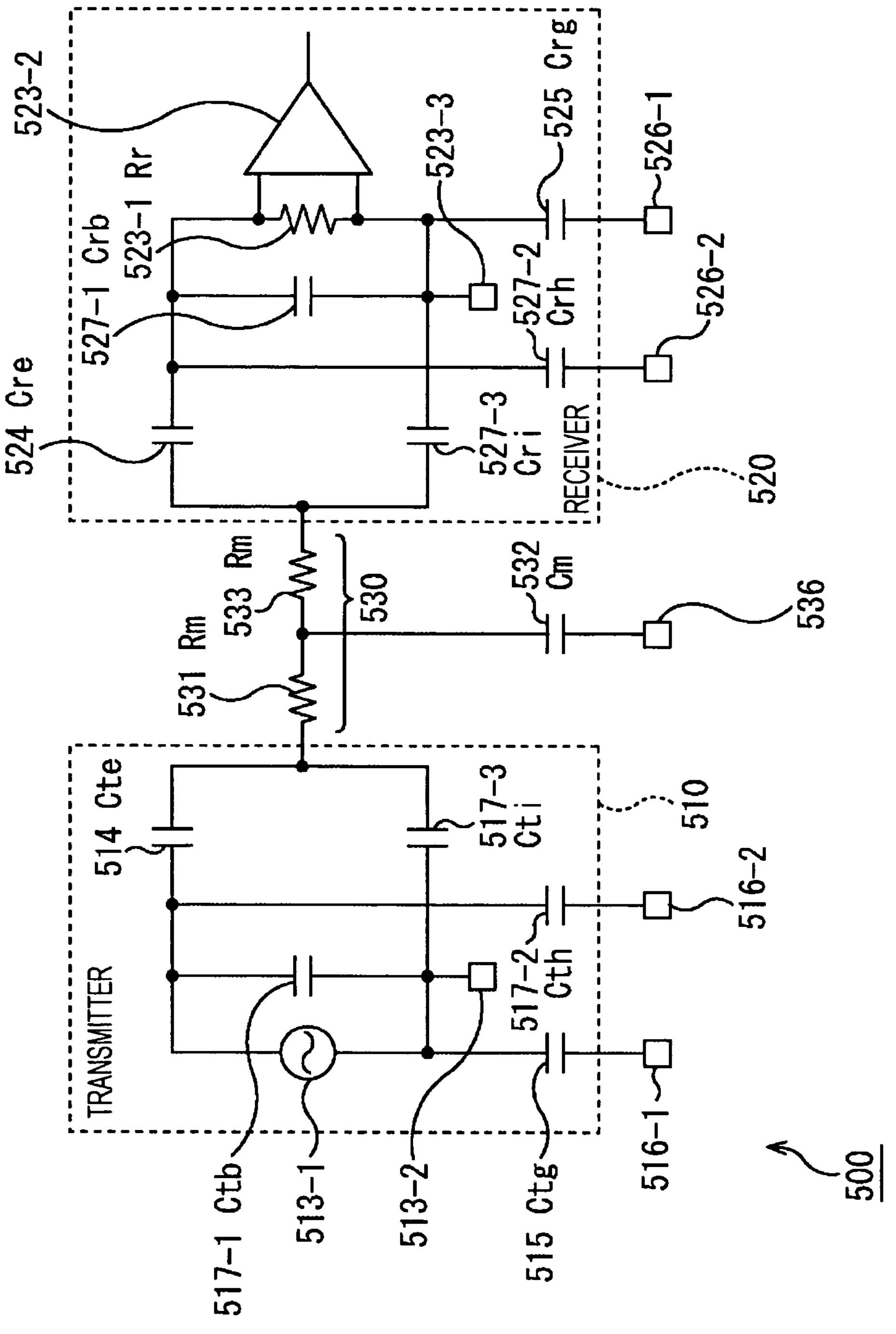
FIG. 9 illustrates an equivalent circuit of the communication system of FIG. 5.

FIG. 9 illustrates an equivalent circuit of the communication system 400 of FIG. 5. Like the relationship between FIG. 2 and FIG. 4, a communication system 500 of FIG. 9 corresponds to the communication system 400 of FIG. 5, a transmitter 510 in the communication system 500 corresponds to the transmitter 410 in the communication system 400, a receiver 520 in the communication system 500 corresponds to the receiver 420 in the communication system 400, and a connection line 530 in the communication system 500 corresponds to the communication medium 430 in the communication system 400.

Similarly, a signal source 513-1 in the transmitter 510 of FIG. 9 corresponds to the signal source 413-1. The transmitter 510 of FIG. 9 includes an in-transmitter reference point 513-2 representing ground of the circuit of the transmitting unit 113 of FIG. 1, corresponding to an in-transmitter reference point 213-2 of FIG. 2 (not shown in FIG. 5).

Capacitance Cte 514 of FIG. 9 corresponds to the capacitance Cte 414 of FIG. 5. Capacitance Ctg 515 corresponds to the capacitance Ctg 415 of FIG. 5. Reference points 516-1 and 516-2 correspond to the reference points 416-1 and 416-2, respectively. Capacitance Ctb 517-1 corresponds to the capacitance Ctb 417-1, capacitance Cth 517-2 corresponds to the capacitance Cth 417-2, capacitance Cti 517-3 corresponds to the capacitance Cti 417-3.

Similarly in the receiver 520, a receiving resistance Rr 523-1 and a detector 523-2 correspond to the Rr 423-1 and the detector 423-2 of FIG. 5, respectively. The receiver 520 of FIG. 9 includes an in-receiver reference point 523-3 representing ground of the circuit of the receiving unit 123 of FIG. 1, corresponding to the in-receiver reference point 223-3 of FIG. 2 (not shown in FIG. 5).

Capacitance Cre 524 of FIG. 9 corresponds to the capacitance Cre 424 of FIG. 5. Capacitance Crg 525 corresponds to the capacitance Crg 425 of FIG. 5. Reference points 526-1 and 526-2 correspond to the reference points 426-1 and 426-2, respectively. Capacitance Crb 527-1 corresponds to the capacitance Crb 427-1, capacitance Crh 527-2 corresponds to the capacitance Crh 427-2, and capacitance Cri 527-3 corresponds to the capacitance Cri 427-3.

Similarly, resistance components Rm 531 and Rm 533 of the connection line 530 correspond to the resistances Rm 431 and Rm 433, capacitance Cm 532 corresponds to the capacitance Cm 432, and a reference point 536 corresponds to the reference point 436.

The feature of the communication system 500 is described below.

The higher the value of the capacitance Cte 514, the larger signal the transmitter 510 can apply to the connection line 530 corresponding to the communication medium 430. The higher the value of the capacitance Ctg 515, the larger signal the transmitter 510 can apply to the connection line 530. The lower the value of the capacitance Ctb 517-1, the larger signal the transmitter 510 can apply to the connection line 530. The lower the value of the capacitance Cth 517-2, the larger signal the transmitter 510 can apply to the connection line 530. The lower the value of the capacitance Cti 517-3, the larger signal the transmitter 510 can apply to the connection line 530.

The higher the capacitance Cre 524, the larger signal the receiver 520 can pick up from the connection line 530 corresponding to the communication medium 430. The higher the capacitance Crg 525, the larger signal the receiver 520 can pick up from the connection line 530. The lower the capacitance Crb 527-1, the large signal the receiver 520 can pick up from the connection line 530. The lower the capacitance Crh 527-2, the larger signal the receiver 520 can pick up from the connection line 530. The lower the capacitance Cri 527-3, the larger signal the receiver 520 can pick up from the connection line 530. The higher the receiving resistance Rr 523-1, the larger signal the receiver 520 can pick up from the connection line 530.

The lower each of the resistance Rm 531 and the resistance Rm 533 of the connection line 530, the larger signal the transmitter 510 can apply to the connection line 530. The lower the capacitance Cm 532 of the connection line 530 with respect to space, the larger signal the transmitter 510 can apply to the connection line 530.

The value of each capacitance approximately depends on the surface area of the electrode thereof. Generally, the large the size of each electrode, the better. However, if the electrode is merely scaled up in size, a capacitance between electrodes may also increase. Efficiency may drop if the ratio of electrode sizes becomes extreme. The sizes and mounting positions of the electrodes are determined taking into the balance of elements.

In a high frequency region of the signal source 513-1, the parameters of the equivalent circuit of the communication system 500 are determined to achieve impedance matching to achieve efficient communication. The use of high frequency causes an even low capacitance to provide a reactance, thereby easily miniaturizing the apparatus.

The reactance of a capacitance rises as frequency lowers. Since the communication system 500 works on capacitive coupling, the lower limit of the frequency of the signal source 513-1 is determined by the capacitances. The resistance Rm 531, the capacitance Cm 532, and the resistance Rm 533 construct a low-pass filter because of the location thereof, and the characteristics of the low-pass filter determine the upper limit of the frequency.

Figure 10:
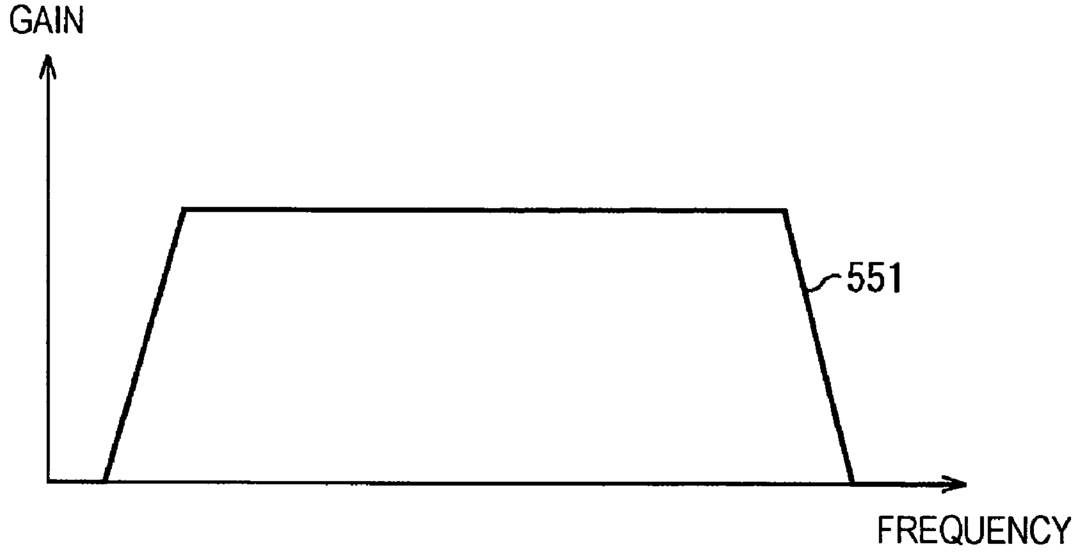
FIG. 10 illustrates frequency characteristics of the communication system of FIG. 9.

The frequency characteristics of the communication system 500 are represented by a line 551 of FIG. 10. In the graph of FIG. 10, the abscissa represents frequency while the ordinate represents gain of the entire system.

The specific values of the parameters in the communication system 400 of FIG. 5 and the communication system 500 of FIG. 9 are described below. For the convenience of explanation, the communication system 400 and the communication system 500 are placed in the air. Each of the transmission signal electrode 411, the transmission reference electrode 412, the reception signal electrode 421 and the reception reference electrode 422 in the communication system 400 is a circular conductor disk having a diameter of about 5 cm.

In the communication system 400 of FIG. 5, the capacitance Cte 414 constructed of the transmission signal electrode 411 and the communication medium 430 (corresponding to capacitance Cte 514 of FIG. 9) is determined using the following equation (18) in view of equation (9) with the space between the transmission signal electrode 411 and the communication medium 430 being 5 mm:

$$Cte = \frac{(8.854\times10^{-12})\times(2\times10^{-3})}{5\times10^{-3}} \approx 3.5\ \text{[pF]} \tag{18}$$

The capacitance Ctb 417-1 between electrodes (corresponding to the capacitance Ctb 517-1 of FIG. 9 satisfies equation (9). As previously described, equation (9) holds well when the area of the electrodes is sufficient large in comparison with the spacing between the electrodes. Equation (9) provide a good approximation to the correct value of the capacitance Ctb 417-1 between the transmission signal electrode 411 and the transmission reference electrode 412 and provides no inconvenience to the discussion of the principle of the present invention. Equation (9) is used to determine the capacitance Ctb 417-1. If the spacing between the electrodes is 5 cm, the capacitance Ctb 417-1 (capacitance Ctb 517-1 of FIG. 9) is calculated as represented by the following equation (19):

$$Ctb = \frac{(8.854\times10^{-12})\times(2\times10^{-3})}{5\times10^{-2}} \approx 0.35\ \text{[pF]} \tag{19}$$

If the spacing between the transmission signal electrode 411 and the communication medium 430 is sufficiently small, coupling with space becomes weak. The capacitance Cth 417-2 (capacitance Cth 517-2 of FIG. 9) is sufficiently smaller than the capacitance Cte 414 (capacitance Cte 514) and is thus set at one-tenth the capacitance Cte 414 (capacitance Cte 514) as shown in the following equation (20):

$$Cth = \frac{Cte}{10} = 0.35\ \text{[pF]} \tag{20}$$

The capacitance Ctg 415 (capacitance Ctg 515 of FIG. 9) created between the transmission reference electrode 412 and space is determined as shown in equation (21) in a similar manner as in FIG. 4 (using equation (12)):

$$Ctg = 8\times8.854\times10^{-12}\,2.5\times10^{-2} \approx 1.8[pF] \tag{21}$$

The capacitance Cti 417-3 (capacitance Cti 517-3 of FIG. 9) is considered to be equal to the capacitance Ctb 417-1 (capacitance Ctb 517-1 of FIG. 9) and thus Cti=Ctb=0.35 pF.

The parameters of the receiver 420 (receiver 520 of FIG. 9) are set in the same manner as in the transmitter 410 if the configuration of the electrodes (such as size and mounting position) is analyzed as in the case of the transmitter 410.

Cre=Cte=3.5 pF

Crb=Ctb=0.35 pF

Crh=Cth=0.35 pF

Crg=Ctg=1.8 pF

Cri=Cti=0.35 pF

For the convenience of explanation, the communication medium 430 (connection line 530 of FIG. 9) is an object having characteristics similar to a living body of a human body size. An electrical resistance of the communication medium 430 from the position of the transmission signal electrode 411 to the position of the reception signal electrode 421 (from the position of a transmission signal electrode 511 to the position of a reception signal electrode 521) is 1 MΩ, and each of the resistance Rm 431 and the resistance Rm 433 (each of the resistance Rm 531 and the resistance Rm 533 of FIG. 9) is 500 kΩ. The capacitance Cm 432 created between the communication medium 430 and space (capacitance Cm 532 of FIG. 9) is 100 pF.

The signal source 413-1 (signal source 513-1 of FIG. 9) outputs a sinusoidal wave signal having a maximum amplitude of 1 V and a frequency of 10 MHz.

Figure 11:
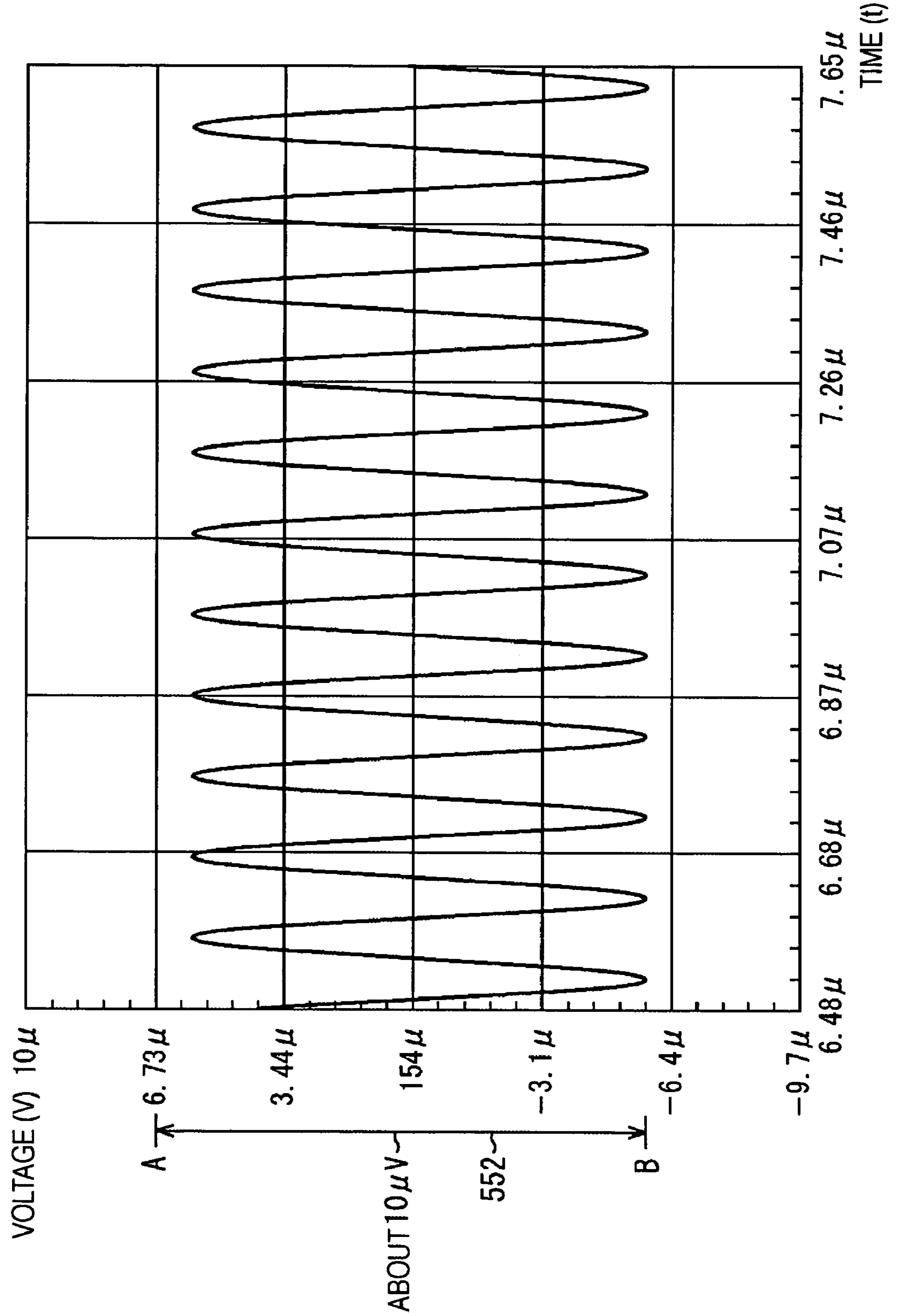
FIG. 11 illustrates a signal received by a receiver.

FIG. 11 illustrates a waveform of a received signal as a result of simulation performed on the parameters. In the graph of FIG. 11, the ordinate represents a voltage appearing across the Rr 423-1 (Rr 523-1) as a receiving load of the receiver 420 (receiver 520 of FIG. 9), and the abscissa represents time. As represented by both-side arrow-headed line 552 of FIG. 11, the waveform of the received signal has about 10 μV of difference between the maximum value A and the minimum value B (peak-to-peak value). By amplifying the received signal with an amplifier (detector 423-2) having a sufficient gain, a signal on the transmitter side (signal generated by the signal source 413-1) is restored on the receiver side.

The communication system described above requires no physical reference point path, and performs communications using a communication signal transmission path only. The communication system thus provides communication environments in a manner free from application environments.

The layout of the electrodes in each apparatus are described below. The electrodes have different functions thereof, and create capacitances with respect to the communication medium and space. More specifically, the electrodes are capacitively coupled with different elements, thereby operating by means of capacitive coupling thereof. The layout of the electrodes is an important factor for each electrode to be capacitively coupled to an intended element.

For example, to perform efficient communications between the transmitter 410 and the receiver 420 in the communication system 400 of FIG. 5, the electrodes are arranged to meet the following conditions. The capacitance between the transmission signal electrode 411 and the communication medium 430 and the capacitance between the reception signal electrode 421 and the communication medium 430 need to be sufficiently high. The capacitance between the transmission reference electrode 412 and space and the capacitance between the reception reference electrode 422 and space need to be sufficiently high. The capacitance between the transmission signal electrode 411 and the transmission reference electrode 412 and the capacitance between the reception signal electrode 421 and the reception reference electrode 422 need to be smaller. The capacitance between the transmission signal electrode 411 and space and the capacitance between the reception signal electrode 421 and space need to be smaller.

Figure 12:
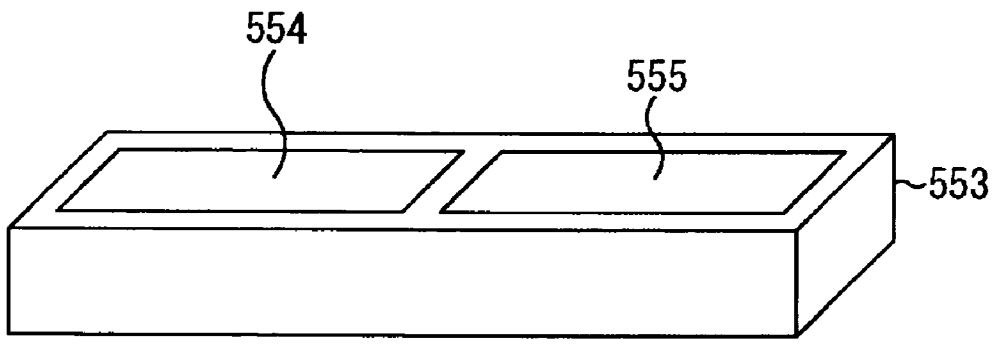
FIG. 12 illustrates a mounting position of electrodes.

FIG. 12 through FIGS. 18A and 18B illustrate the layout of electrodes. The layout of the electrodes in the transmitter is described below. As shown in FIG. 12, two electrodes, namely, a transmission signal electrode 544 and a transmission reference electrode 555 are mounted on the same surface. This arrangement provides an inter-electrode capacitance smaller than that in the layout in which two electrodes (the transmission signal electrode 554 and the transmission reference electrode 555) face each other. When the transmitter having this arrangement, only one of the two electrodes is set to be close to the communication medium. For example, a casing 553 is composed of two units and a hinge. The two units are connected by the hinge in a manner such that a relative angle between the two units is variable. The casing 553 may be a flip cellular phone that can be folded at the longitudinal center thereof at the hinge. By applying the electrode layout of FIG. 12 to the flip cellular phone, one electrode may be arranged on the back of the unit bearing operation buttons, and the other electrode may be arranged on the back of the unit bearing a display. With this arrangement, the electrode arranged on the unit bearing the operation buttons is covered with the hand of a user, and the electrode arranged on the back of the display is placed in space. The two electrodes are thus arranged in a manner that satisfies the above-described conditions.

Figure 13:
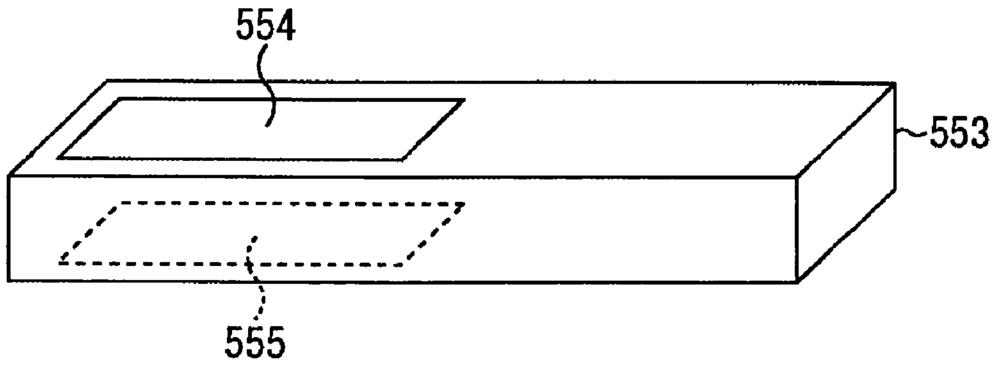
FIG. 13 illustrates another mounting position of the electrodes.

FIG. 13 illustrates the two electrodes (the transmission signal electrode 554 and the transmission reference electrode 555) mounted on the casing 553 in a manner such that the two electrodes face each other. Although the capacitive coupling between the two electrodes is intensified in comparison with FIG. 12, this arrangement is appropriate when the casing 553 is relatively small. In this arrangement, the two electrodes are preferably arranged to be spaced apart one from the other as far as possible in the casing 553.

Figure 14:
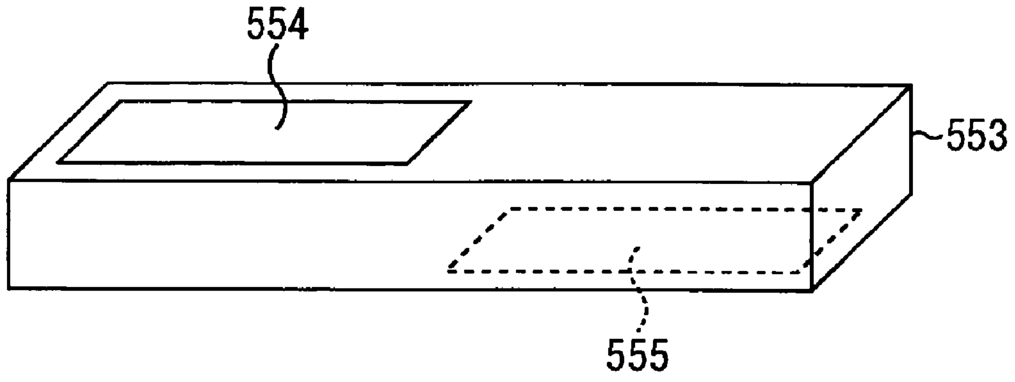
FIG. 14 illustrates yet another mounting position of the electrodes.

FIG. 14 illustrates the two electrodes (the transmission signal electrode 554 and the transmission reference electrode 555) which are arranged on the facing surfaces of the casing 553. The transmission signal electrode 554 and the transmission reference electrode 555 are arranged not to face each other. The capacitance between the two electrodes becomes smaller than that of FIG. 13.

Figure 15:
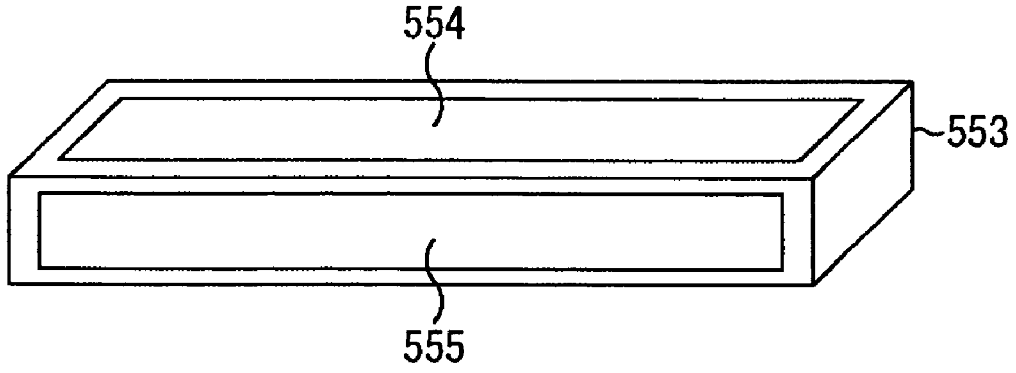
FIG. 15 illustrates a further mounting position of the electrodes.

FIG. 15 illustrates the two electrodes (the transmission signal electrode 554 and the transmission reference electrode 555) that are arranged in perpendicular to each other on the casing 553. In applications on which the surface of the transmission signal electrode 554 and the surface in perpendicular thereto approach the communication medium, communications are possible with the side face (bearing the transmission reference electrode 555) remaining capacitively coupled with space.

Figure 16B:
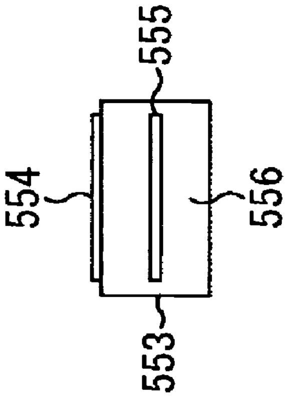
FIGS. 16A and 16B illustrate yet a further mounting position of the electrodes.
Figure 16A:
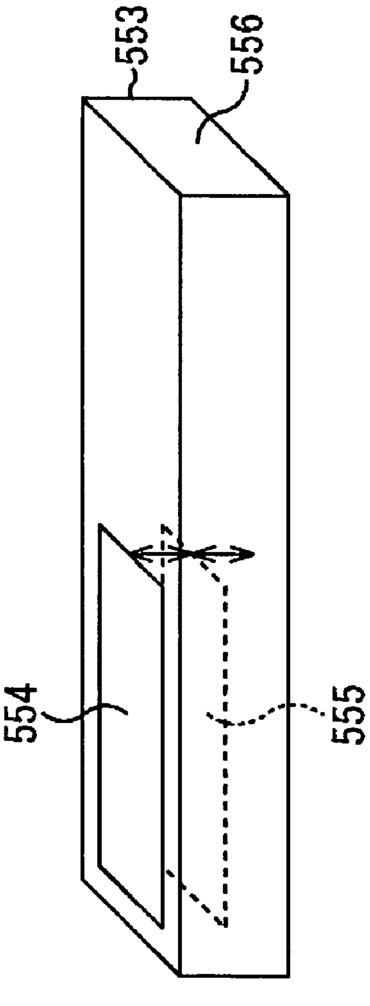

FIGS. 16A and 16B illustrate an arrangement similar to the one of FIG. 13, except that the transmission reference electrode 555 as one electrode is arranged in the casing 553. As shown in FIG. 16A, only the transmission reference electrode 555 is embedded in the casing 553. FIG. 16B illustrates the location of the transmission reference electrode 555 on a surface 555. As shown in FIG. 16B, the transmission signal electrode 554 is arranged on the surface of the casing 553 and only the transmission reference electrode 555 is arranged in the casing 553. Even if the casing 553 is widely covered with a communication medium, space surrounding the transmission reference electrode 555 within the casing 553 permits communications to be made.

Figure 17B:
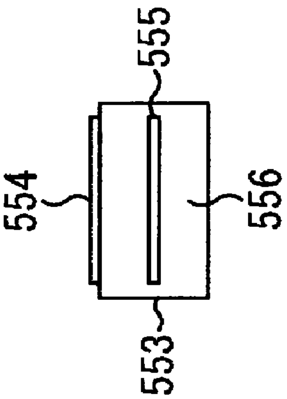
FIGS. 17A and 17B illustrate yet a further mounting position of the electrodes.
Figure 17A:
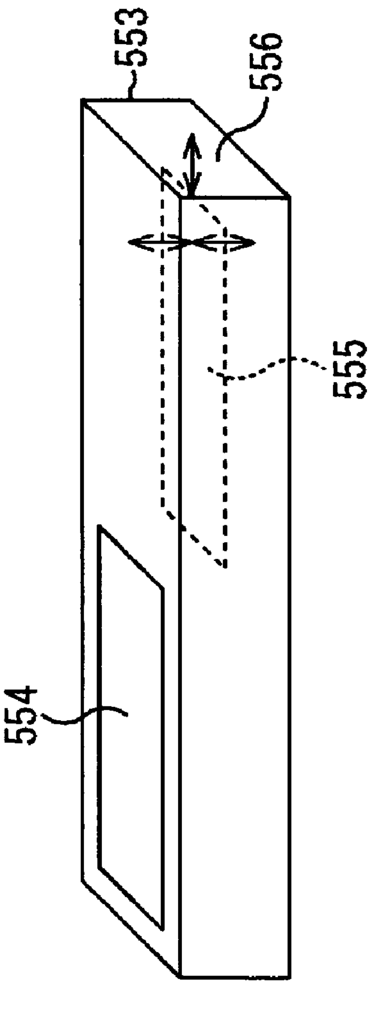

FIGS. 17A and 17B illustrate an arrangement similar to the one of FIG. 13 or FIG. 14 except that the transmission reference electrode 555 as one electrode is arranged in the casing 553. As shown in FIG. 17A, only the transmission reference electrode 555 is embedded in the casing 553. FIG. 17B illustrates the position of the transmission reference electrode 555 on a surface 556. As shown in FIG. 17B, the transmission signal electrode 554 is arranged on the surface of the casing 553 and only the transmission reference electrode 555 is arranged in the casing 553. Even if the casing 553 is widely covered with a communication medium, space surrounding the transmission reference electrode 555 within the casing 553 permits communications to be made.

Figure 18B:
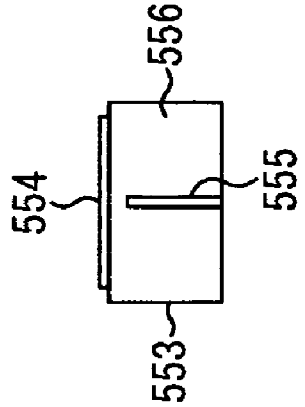
FIGS. 18A and 18B illustrate yet a further mounting position of the electrodes.
Figure 18A:
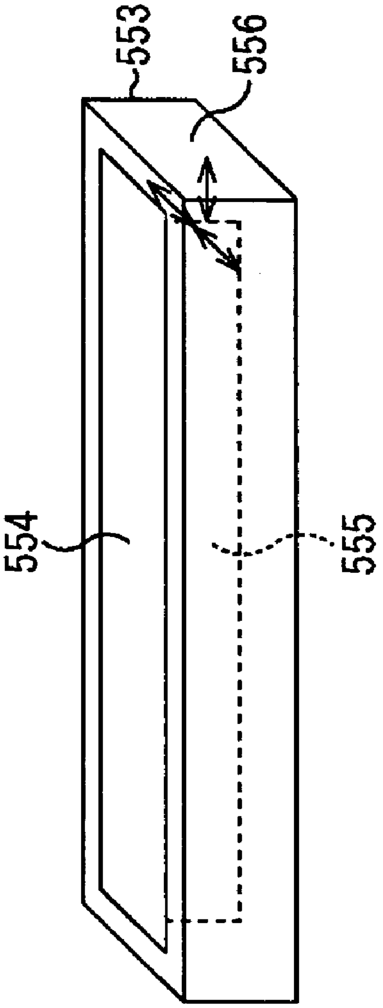

FIGS. 18A and 18B illustrate an arrangement similar to the one of FIG. 15 except that the transmission reference electrode 555 as one electrode is arranged in the casing 553. As shown in FIG. 18A, only the transmission reference electrode 555 is embedded in the casing 553. FIG. 18B illustrates the position of the transmission reference electrode 555 on a surface 556. As shown in FIG. 18B, the transmission signal electrode 554 is arranged on the surface of the casing 553 and only the transmission reference electrode 555 is arranged in the casing 553. Even if the casing 553 is widely covered with a communication medium, space surrounding the transmission reference electrode 555 within the casing 553 permits communications to be made.

In each of the above-described electrode layouts, one electrode is closer to the communication electrode than the other electrode, and the one is arranged to increase the capacitive coupling with space. In each of the above-described electrode layouts, the two electrodes are preferably arranged to result in weaker capacitive coupling therebetween.

Figure 19A:
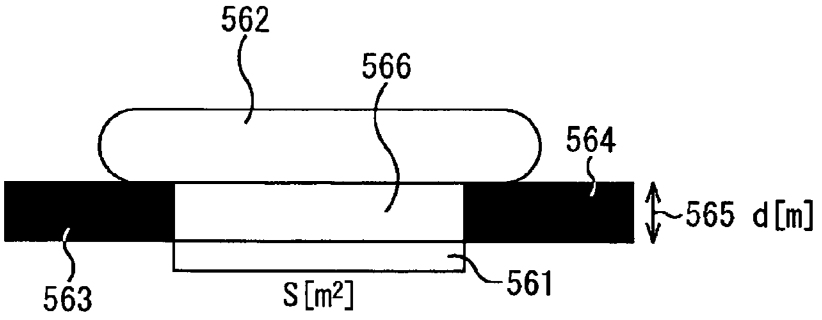
FIGS. 19A-19C illustrate the structure of an electrode.
Figure 19B:
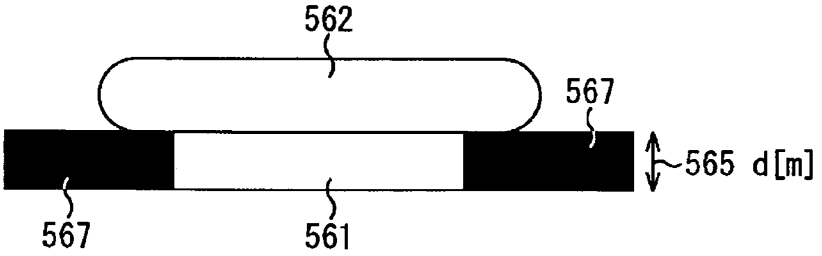
Figure 19C:
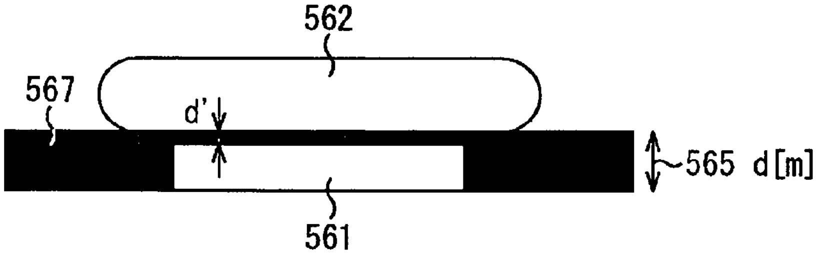

One of the transmitter and the receiver may be housed in any casing. In accordance with one embodiment of the present invention, the apparatus includes at least two electrodes, and the two electrodes are electrically insulated. The casing is thus made of an insulator having some thickness. FIGS. 19A-19C are cross-sectional view illustrating a portion surrounding the transmission signal electrode. Since each of the transmission reference electrode, the reception signal electrode and the reception signal reference electrode is identical in structure to the transmission signal electrode, the above discussion applies to each of these electrodes. The discussion thereof is thus omitted herein.

FIG. 19A illustrates an arrangement in which a transmission signal electrode 561 and a communication medium 562 are spaced apart from each other by some distance. A spacer 563 and a spacer 564 are arranged about the transmission signal electrode 561. As represented by arrow-headed line 565, a spacing of d m is thus maintained between the transmission signal electrode 561 and the communication medium 562 even if a force is applied to place the casing including the transmission signal electrode 561 into contact with the communication medium 562. A space 566 is thus formed between the transmission signal electrode 561 and the communication medium 562.

A capacitance C created between the transmission signal electrode 561 and the communication medium 562 is calculated as represented by equation (22) in view of equation (9). Although equation (9) holds when the parallel plates have the same surface area, no large difference takes place even if equation (9) applies to parallel plates having different surface areas. Equation (22) is thus calculated as follows:

$$C = (\varepsilon_r \times \varepsilon_0) \times \frac{S}{d} \ [\mathrm{F}] \tag{22}$$

where ∈0 is the dielectric constant of vacuum, namely, $8.854\times10^{-12}$ F/m, and ∈r is the specific dielectric constant at the corresponding location, and S is the surface area of the transmission signal electrode 561. The capacitance is increased to improve performance by arranging a dielectric body having a high specific dielectric constant in a space 566 above the transmission signal electrode 561.

Similarly, the capacitance is increased with respect to the surrounding space. The spacer 563 and the spacer 564 may be formed of the casing.

FIG. 19B illustrates an arrangement in which the transmission signal electrode 561 is embedded in a casing 567. With this arrangement, the communication medium 562 is placed in contact with each of the casing 567 and the transmission signal electrode 561. If an insulation layer is formed on the surface of the transmission signal electrode 561, the communication medium 562 is isolated from the transmission signal electrode 561.

With reference to FIG. 19C in contrast to FIG. 19B, the casing 567 is cut in a groove having an area identical to the area of the transmission signal electrode 561 with a thickness d' remaining, and the transmission signal electrode 561 is received in the groove. If the casing is made of a unitary body, manufacturing costs and component costs are reduced, and the capacitance is easily increased.

The size of each electrode is described below. At least both the transmission reference electrode and the reception reference electrode need to form a high capacitance with respect to space in order for the communication medium to provide a sufficient voltage. The transmission signal electrode and the reception signal electrode are properly sized taking into consideration the capacitive coupling with the communication medium and the property of the signal to be supplied to the communication medium. Typically, the transmission reference electrode is sized to be larger than the transmission signal electrode, and the reception reference electrode is sized to be larger than the reception signal electrode. Optionally, other relationship is perfectly acceptable if a signal sufficient for communications results.

If the transmission reference electrode is sized to be equal to the transmission signal electrode, and if the reception reference electrode is sized to be equal to the reception signal electrode, these electrodes appear to have the same characteristics if viewed from a reference point at infinity. If any electrode is used as a reference electrode (namely, the reference electrode and the signal electrode are interchanged), equivalent communication performance results.

In other words, if the reference electrode and the signal electrode are sized to be different, communications are permitted only when one electrode (electrode designed to be a signal electrode) is placed close to the communication medium.

Shielding of circuit is described below. The transmitter and the receiver except the electrodes thereof have been considered as transparent in the analysis of physical communication system. To embody the communication system, electronic components are used. The electronic components are made of a material having an electric property such as conductivity, dielectricity, etc. These components surrounding the electrode inevitably affect the operation of the electrodes. Capacitances in space affects in a variety of ways an electronic circuit mounted on a circuit board. To perform a stabilized operation, the entire device is preferably shielded.

A shielded conductor may be connected to a transmission reference electrode or a reception reference electrode serving a reference potential of a transmitter or receiver. If there is no particular problem in operation, the shielded conductor may be connected to a transmission signal electrode or a reception signal electrode. The shielded conductor also has a physical size. Mutual relationship of the shielded conductor with other electrodes, the communication medium, and space needs to be considered with reference to the same principle discussed heretofore.

Figure 20:
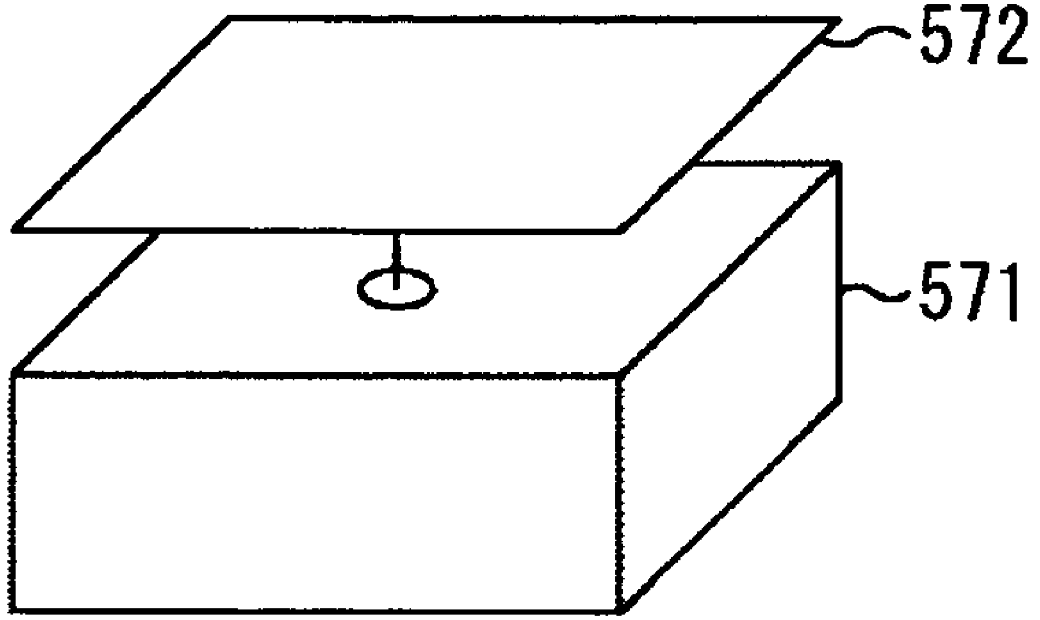
FIG. 20 illustrates the structure of another electrode.

FIG. 20 illustrates one embodiment of the present invention. In accordance with the one embodiment of the present invention, an apparatus operates from a battery. Electronic components including the battery are housed in a shield case 571. The shield case 571 serves as a reference electrode. An electrode 572 serves as a signal electrode.

A transfer medium is described below. A conductor has been discussed as an example of the communication medium. A dielectric body having no conductivity may also be used for communications. In the dielectric body, an electric field directed from the transmission signal electrode to the communication medium propagates through polarization of the dielectric body.

More specifically, a metal such as wire is considered as the conductor. Deionized water may serve as a dielectric body. Communications are still possible with a living body having both properties, a normal saline solution, or the like. Vacuum or air also serves as a communication medium because of dielectricity thereof.

Noise is described below. Potential of space varies in response to noise from an AC power source, noise from fluorescent lamp, home electronic appliances, and electric apparatuses, and the effect of charged particles in the air. The potential variations have been disregarded heretofore. These noises are superimposed on each component of the transmitter, the communication medium, and the receiver.

Figure 21:
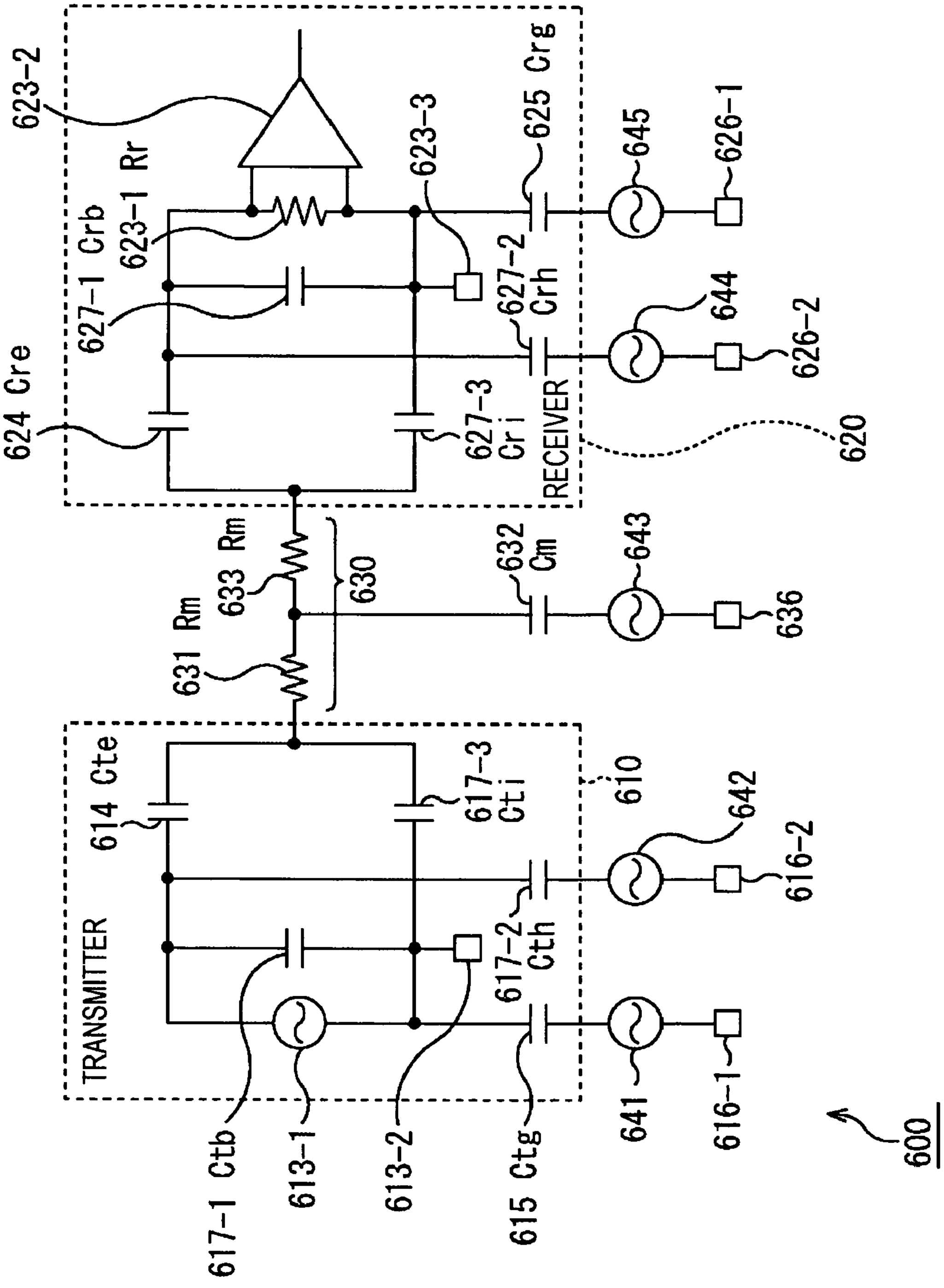
FIG. 21 illustrates another equivalent circuit of the communication system of FIG. 5.

FIG. 21 illustrates an equivalent circuit of the communication system 100 of FIG. 1 with a noise component accounted for. More specifically, in a communication system 600 of FIG. 21 corresponding to the communication system 500 of FIG. 9, a transmitter 610 in the communication system 600 corresponds to the transmitter 510 in the communication system 500, a receiver 620 corresponds to the receiver 520 in the communication system 500, and a connection line 630 corresponds to the connection line 530.

In the transmitter 610, a signal source 613-1, an in-transmitter reference point 613-2, a capacitance Cte 614, a capacitance Ctg 615, a reference point 616-1, a reference point 616-2, a capacitance Ctb 617-1, a capacitance Cth 617-2, and a capacitance Cti 617-3 respectively correspond to the signal source 513-1, the in-transmitter reference point 513-2, the capacitance Cte 514, the capacitance Ctg 515, the reference point 516-1, the reference point 516-2, the capacitance Ctb 517-1, the capacitance Cth 517-2, and the capacitance Cti 517-3, each in the transmitter 510. Unlike the transmitter 510 of FIG. 9, the transmitter 610 includes two noise sources 641 and 642 arranged respectively between the capacitance Ctg 615 and the reference point 616-1 and between the capacitance Cth 617-2 and the reference point 616-2.

In the receiver 620, a resistance Rr 623-1, a detector 623-2, an in-receiver reference point 623-3, a capacitance Cre 624, a capacitance Crg 625, a reference point 626-1, a reference point 626-2, a capacitance Crb 627-1, a capacitance Crh 627-2, and a capacitance Cri 627-3 respectively correspond to the receiving resistance Rr 523-1, the detector 523-2, the in-receiver reference point 523-3, the capacitance Cre 524, the capacitance Crg 525, the reference point 526-1, the reference point 526-2, the capacitance Crb 527-1, the capacitance Crh 527-2, and the capacitance Cri 527-3, each in the receiver 520. Unlike the receiver 520 of FIG. 9, the receiver 620 includes two noise sources 644 and 645 respectively arranged between the capacitance Crh 627-2 and the reference point 626-2, and between the capacitance Crg 625 and the reference point 626-1.

In the connection line 630, a resistance Rm 631, a capacitance Cm 632, a resistance Rm 633, and a reference point 636 respectively corresponds to the resistance Rm 531, the capacitance Cm 532, the resistance Rm 533, and the reference point 536, each in the connection line 530. Unlike the connection line 530 of FIG. 9, the connection line 630 includes a noise source 643 arranged between the capacitance Cm 632 and the reference point 636.

The transmitter and the receiver respectively operate with respect to the ground potentials of the in-transmitter reference point 613-2 and the in-receiver reference point 623-3. If a noise superimposed on the reference points has the same components relatively with respect to the transmitter, the receiver, and the communication medium, operation is not affected by the noise. On other hand, if the apparatuses are far apart, or under noisy environments, a relative noise difference is likely to take place among apparatuses. More specifically, the noise sources 641 through 645 operate differently. If such a difference is not varied in time, no problem will occur because a relative level difference of a signal in use is transferred. If a variation period of noise falls within a frequency band in use, the frequency in use and the signal level need to be determined taking into consideration the noise characteristics. In other words, if the frequency in use and the signal level are determined taking into consideration the noise characteristics, the communication system 600 becomes noise robust, the physical reference point becomes needless, and communications are performed using only the communication signal communication path only. The communication environment free from the limitation of application environments is thus constructed.

The effect of the distance between the transmitter and the receiver in communications is described below. In accordance with the principle of the present invention, if a sufficiently high capacitance is created in space between the transmission reference electrode and the reception reference electrode, neither a path using the ground between the transmitter and the receiver nor the other electrical path is required, and communications do not depend on the distance between the transmission signal electrode and the reception signal electrode. As in a communication system 700 of FIG. 22, a transmitter 710 and a receiver 720 are remotely placed from each other, and a communication medium 730 having a sufficient conductivity or a sufficient dielectric constant can capacitively couple a transmission signal electrode 711 to a reception signal electrode 721. Communications are thus possible. A transmission reference electrode 712 is capacitively coupled to space surrounding the transmitter 710 and a reception reference electrode 722 is capacitively coupled to space surrounding the receiver 720. There is no need for capacitively coupling the transmission reference electrode 712 and the reception reference electrode 722. Since a long and large communication medium 730 increases the capacitance with respect to space, these factors are also considered in the determination of the parameters.

Figure 22:
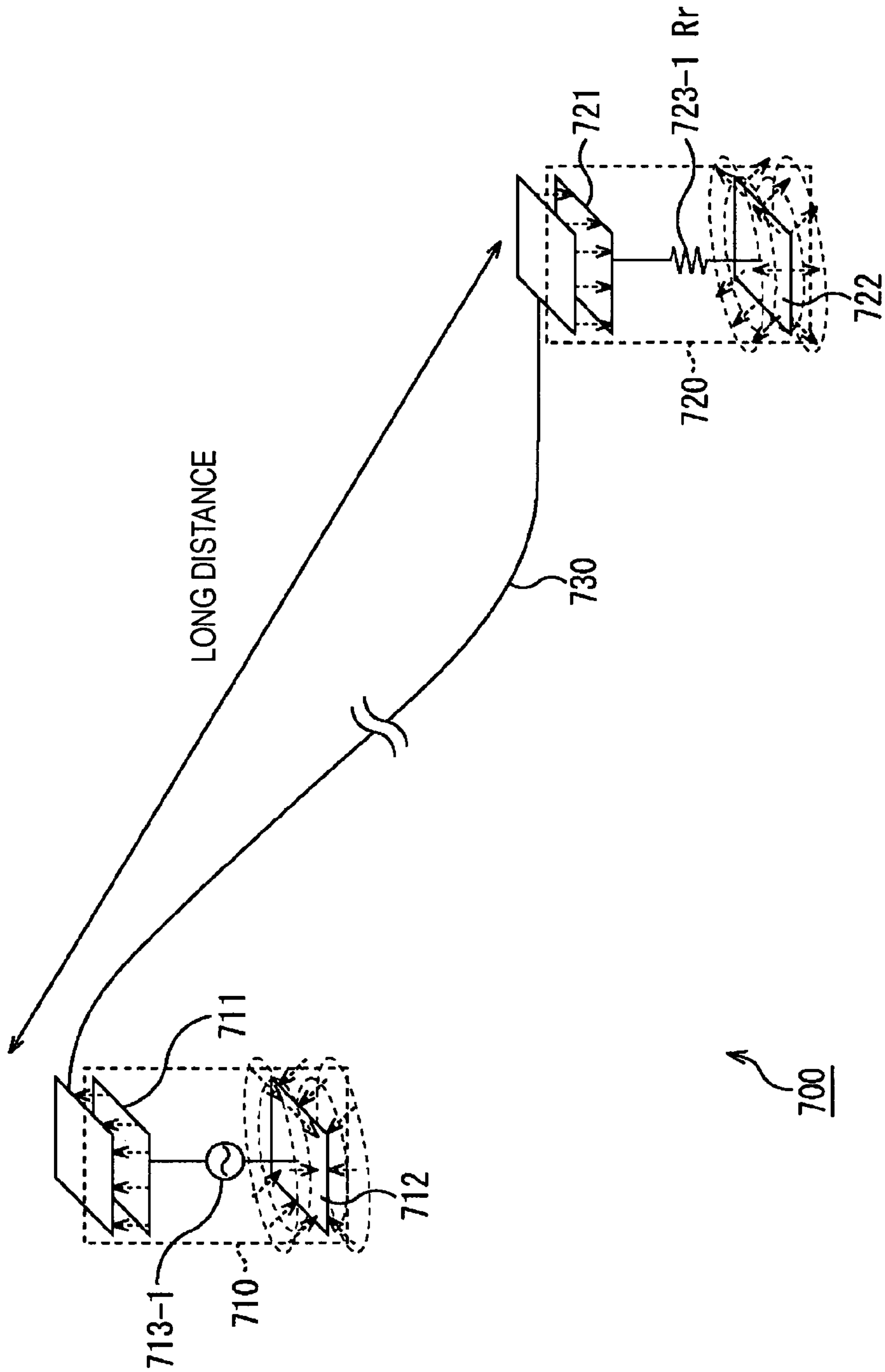
FIG. 22 illustrates an installation location of the communication system of FIG. 1.

The communication system 700 of FIG. 22 corresponds to the communication system 100 of FIG. 1. The transmitter 710 corresponds to the transmitter 110, the receiver 720 corresponds to the receiver 120, and the communication medium 730 corresponds to the communication medium 130.

The transmission signal electrode 711, the transmission reference electrode 712, and a signal source 713-1, each in the transmitter 710 respectively correspond to the transmission signal electrode 111, the transmission reference electrode 112, and the transmitting unit 113 (whole or part thereof). The reception signal electrode 721, the reception reference electrode 722, and a resistance Rr 723-1, each in the receiver 720 respectively correspond to the reception signal electrode 121, the reception reference electrode 122, and the receiving unit 123 (whole or part thereof).

The description of these elements is omitted herein.

The communication system 700 thus constructed requires no physical reference path, and can communicate using the communication signal path only. Communication environments free from the limitation of application environments are thus provided.

In the above discussion, the transmission signal electrode is contactless to the reception signal electrode. The present invention is not limited to this arrangement. If each of the transmission reference electrode and the reception reference electrode has a sufficiently high capacitance with surrounding space, the transmission signal electrode can be connected to the reception signal electrode via a communication medium having dielectricity.

Figure 23:
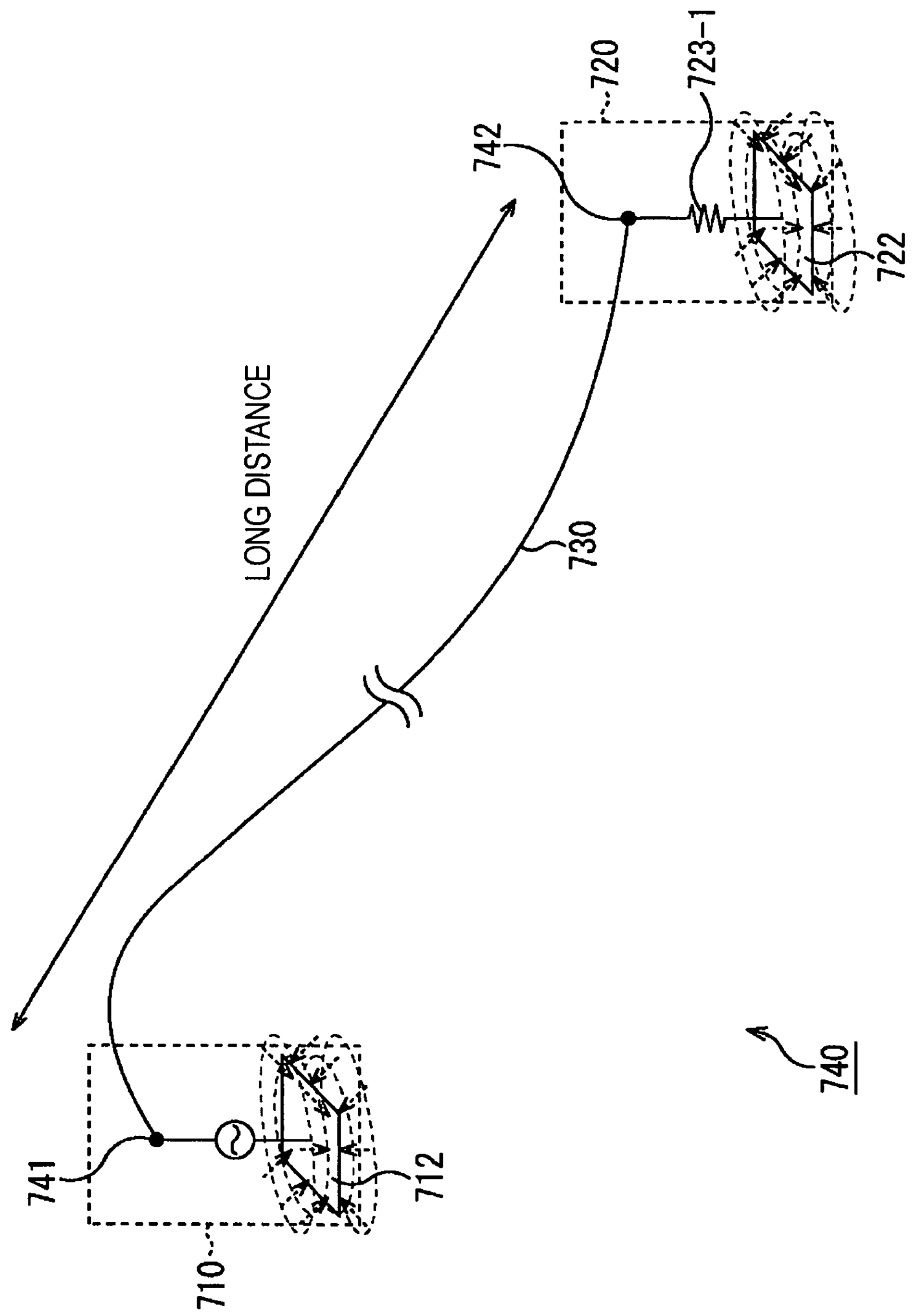
FIG. 23 illustrates another structure of a communication system in accordance with one embodiment of the present invention.

FIG. 23 illustrates a communication system 740 in which a transmission reference electrode is connected to a reception reference electrode via a communication medium.

As shown in FIG. 23, the communication system 740 corresponds to the communication system 700 of FIG. 22. In the communication system 740, the transmitter 710 includes no transmission signal electrode 711. The transmitter 710 is connected to the communication medium 730 at a junction point 741. Similarly, the receiver 720 in the communication system 740 includes no reception signal electrode 721, and is connected to the communication medium 730 at a junction point 742.

In standard wired communication systems, at least two signal wires are used and communications are performed using a relative difference in signal level. In accordance with one embodiment of the present invention, communications are performed using one signal line.

The communication system 740 thus constructed requires no physical reference path, and can communicate using the communication signal path only. Communication environments free from the limitation of application environments are thus provided.

Figure 24:
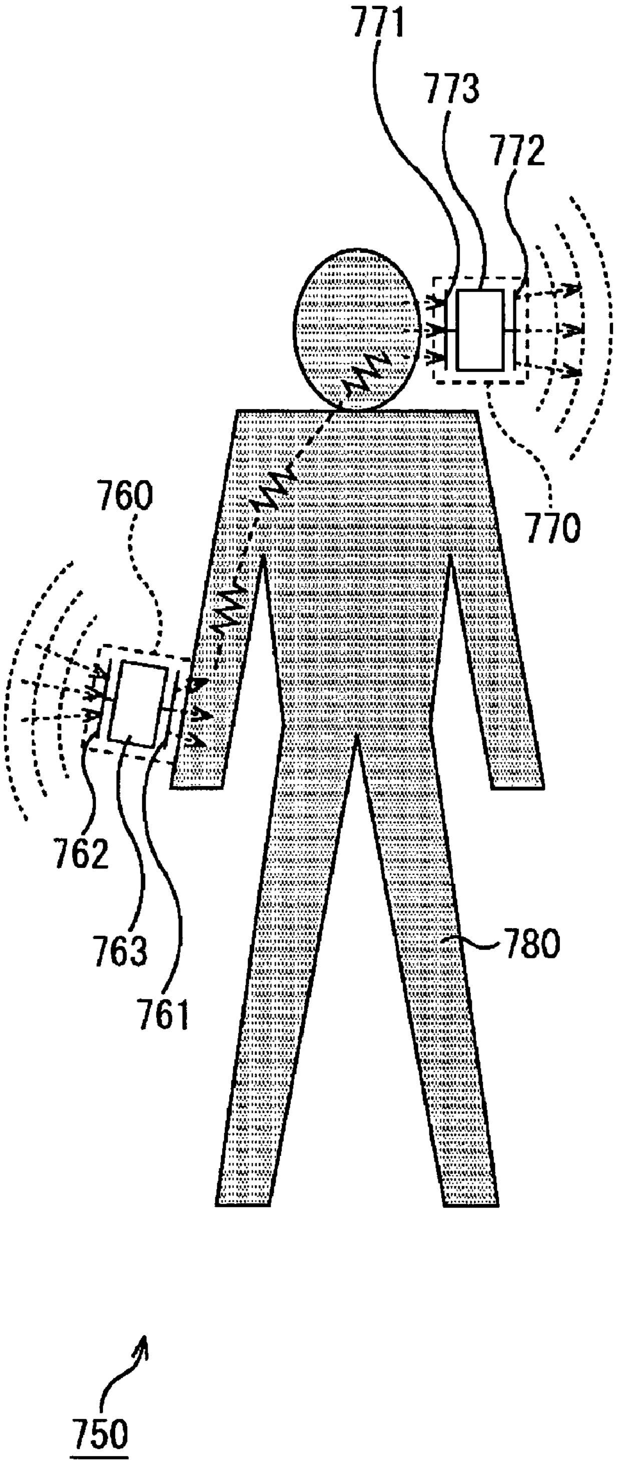
FIG. 24 illustrates an application of the communication system in accordance with one embodiment of the present invention.

A specific application example of the above-described communication system is described below. The above-described communication system can employ a living body as a communication medium. FIG. 24 diagrammatically illustrates a communication system 750 that performs communications using a human body. In the communication system 750 of FIG. 24, a transmitter 760 mounted on the chest of a user's body 780 transmits music data. A receiver 770 mounted on the head of the user's body 780 receives the music data, and converts the music data into sound, thereby letting the user to hear the sound. The communication system 750 corresponds to one of the above-described communication systems (such as the communication system 100). The transmitter 760 and the receiver 770 correspond to the transmitter 110 and the receiver 120, respectively. In the communication system 750, the human body 780 corresponds to the communication medium 130 of FIG. 1.

The transmitter 760 includes a transmission signal electrode 761, a transmission reference electrode 762, and a transmitting unit 763, respectively corresponding to the transmission signal electrode 111, the transmission reference electrode 112, and the transmitting unit 113 shown in FIG. 1. The receiver 770 includes a reception signal electrode 771, a reception reference electrode 772, and a receiving unit 773, respectively corresponding to the reception signal electrode 121, the reception reference electrode 122, and the receiving unit 123 shown in FIG. 1.

The transmitter 760 and the receiver 770 are mounted on the human body 780 serving as a communication medium in a manner such that the transmitter 760 and the receiver 770 are in contact with or close to the human body 780. Since it is sufficient if the transmission reference electrode 762 and the reception reference electrode 772 are in contact with space, neither coupling with the ground nor coupling between the transmitter 760 (or electrodes thereof) and the receiver 770 (or electrodes thereof) is required.

Figure 25:
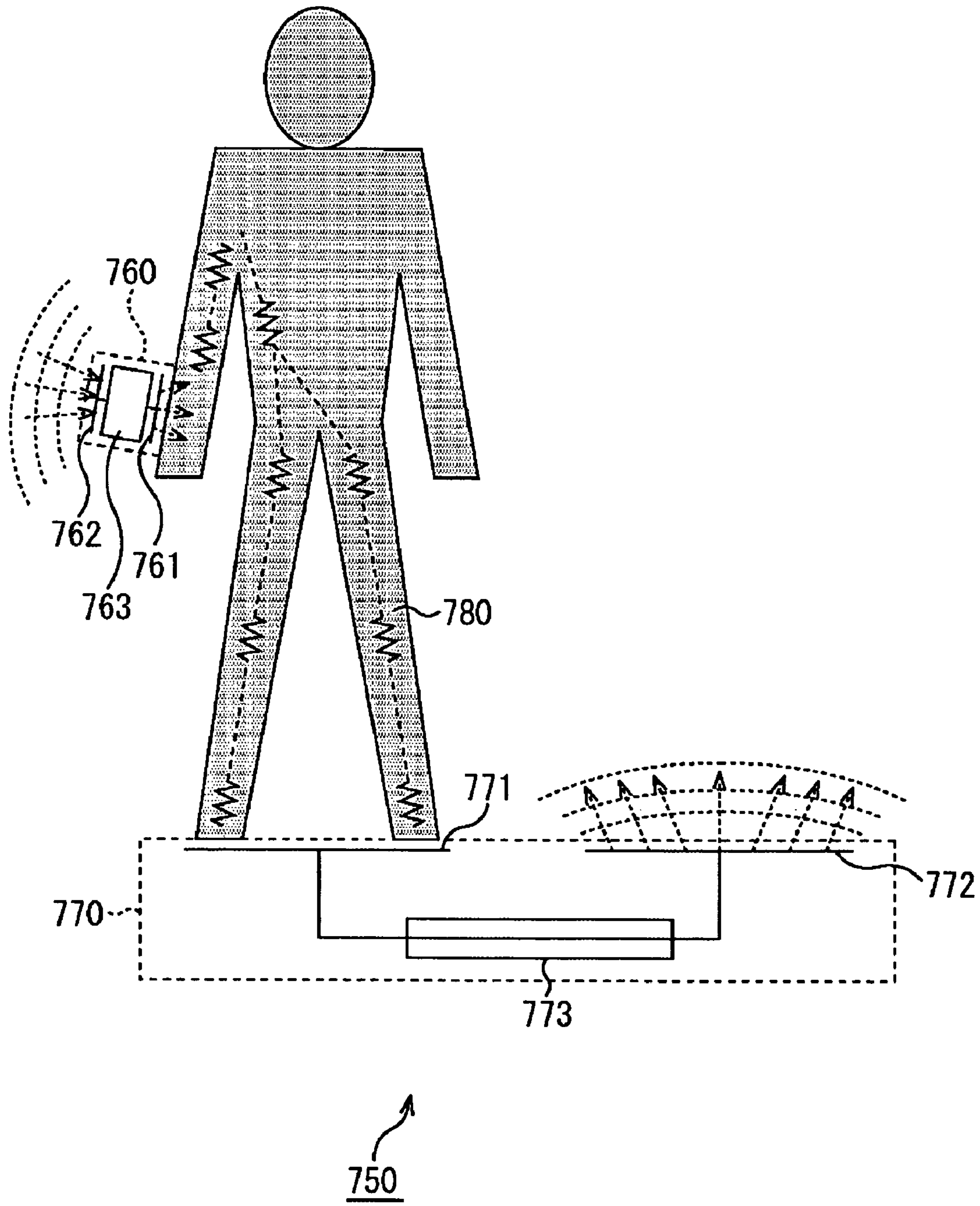
FIG. 25 illustrates another application of the communication system in accordance with one embodiment of the present invention.

FIG. 25 illustrates another example of the communication system 750. As shown in FIG. 25, the receiver 770 in contact with (or close to) the sole of the foot of the human body 780 communicates with the transmitter 760 mounted on the arm of the human body 780. The transmission signal electrode 761 and the reception signal electrode 771 are arranged so that the transmission signal electrode 761 and the reception signal electrode 771 are in contact with (or close to) the human body 780 serving as the communication medium. The transmission reference electrode 762 and the reception reference electrode 772 are arranged to face space. This is the application to which the known technique using the ground as a communication path cannot apply.

The communication system 750 thus constructed requires no physical reference path, and can communicate using the communication signal path only. Communication environments free from the limitation of application environments are thus provided.

In the above-described communication system, no particular limitation is applied to a modulation method of a signal to be supplied to the communication medium as long as the modulation method is applicable to both the transmitter and the receiver. An optimum modulation method may be selected in view of characteristics of the entire communication system. More specifically, the modulated signal in use may include at least one, alone or in combination, selected from the group consisting of a baseband analog signal, an amplitude modulated analog signal, a frequency modulated analog signal, a baseband digital signal, an amplitude modulated digital signal, and a frequency modulated digital signal.

In the above-described communication medium, a plurality of communications may be performed using a single communication medium so that a full-duplex communication is performed or so that a plurality of apparatuses may communicate with each other via the single communication medium.

Methods of performing multiplex communications is described below. A first available method is the spread-spectrum method may be used. Frequency bandwidth and particular time-series code are predetermined between the transmitter and the receiver. The transmitter changes an original signal in frequency in accordance with the time-series code within the frequency bandwidth, thereby spreading the original signal over the entire frequency bandwidth before transmission. Upon receiving the spread-spectrum signal, the receiver integrates the received signal, thereby decoding the received signal.

Advantages of the spread spectrum technique are described below. According to the Shannon-Hartley channel-capacity theorem, the following equation (23) holds:

$$C = B \times \log_2\left(1 + \frac{S}{N}\right) \text{ [bps]} \tag{23}$$

where C bps represents a channel capacity, namely, a maximum data rate at which data can be fed to a communication path in theory, B Hz represents a-channel bandwidth, and S/N represents a signal-to-noise power ratio. When expressed in Maclaurin's expression with a low S/N ratio, equation (23) is approximated by the following equation (24):

$$C \approx \frac{S}{N} \times B \text{ [bps]} \quad (24)$$

If the S/N is equal to or lower than a noise floor level, S/N<<1. By expanding the channel bandwidth B, the channel capacity C is raised to a predetermined level or higher.

If the time-series code is changed from communication path to communication path to achieve different spread spectrum operations, the frequency of the signal is spread without mutual interference. A plurality of communications are performed in a manner free from interference.

Figure 26:
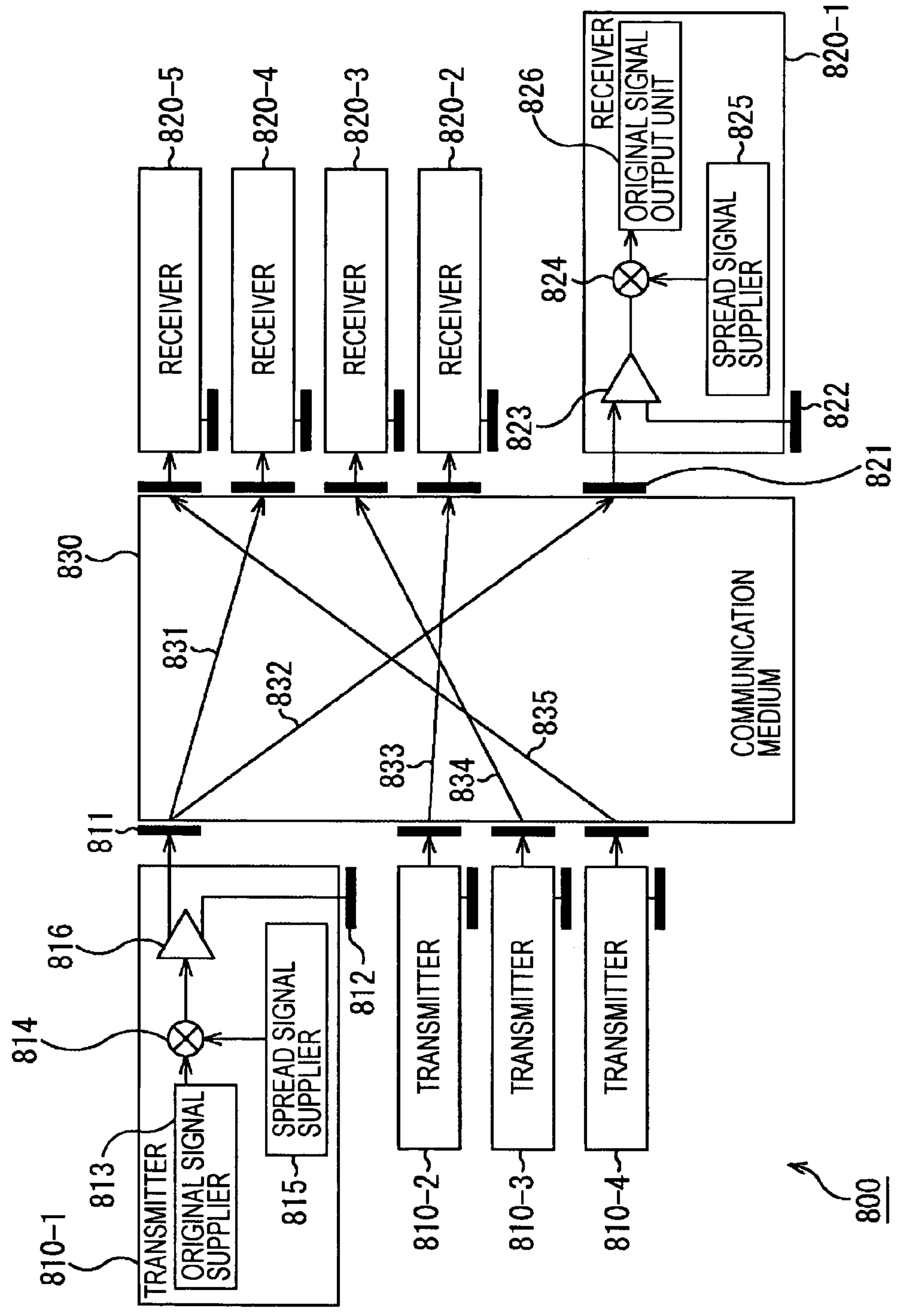
FIG. 26 illustrates yet another structure of the communication system in accordance with one embodiment of the present invention.

FIG. 26 illustrates a communication system 800 in accordance with one embodiment of the present invention. In the communication system 800 of FIG. 26, four transmitters 810-1 through 810-4, and five receivers 820-1 through 820-5 perform multiplex communications via a communication medium 830 using spread spectrum technique.

The transmitter 810-1, corresponding to the transmitter 110 of FIG. 1, includes a transmission signal electrode 811, and a transmission reference electrode 812. The transmitter 810-1 further includes, as a unit corresponding to the transmitting unit 113, an original signal supplier 813, a multiplier 814, a spread signal supplier 815, and an amplifier 816.

The original signal supplier 813 generates an original signal as a signal to be transmitted, and then supplies the original signal to the multiplier 814. The spread signal supplier 815 generates a spread signal that serves as a carrier signal for spreading the original signal over a predetermined frequency bandwidth, and then supplies the spread signal to the multiplier 814. Two typical methods of spreading the original signal with the spread signal are available, namely, direct sequence method (hereinafter referred to as DS method), and frequency hopping method (hereinafter referred to as FH method). In the DS method, the multiplier 814 multiples the original signal by a time-series code having a frequency component higher in frequency than the original signal. The multiplication result is modulated by a predetermined carrier wave, amplified by the amplifier 816, and then output.

In the FH method, the frequency of the carrier wave is changed by the time-series code to generate a spread signal. The original signal is multiplied by the spread signal by the multiplier 814, amplified by the amplifier 816, and then output. One output from the amplifier 816 is supplied to the transmission signal electrode 811 while the other output from the amplifier 816 is supplied to the transmission reference electrode 812.

The transmitters 810-2 through 810-4 have the same structure. Since the discussion of the transmitter 810-1 applies, the discussion of the transmitters 810-2 through 810-4 is omitted herein.

The receiver 820-1, corresponding to the receiver 120 of FIG. 1, includes a reception signal electrode 821, and a reception reference electrode 822. The receiver 820-1 further includes, as a unit corresponding to the receiving unit 123, an amplifier 823, a multiplier 824, a spread signal supplier 825, and an original signal output unit 826.

The receiver 820-1 decodes an electrical signal according to the method of the embodiment of the present invention, and restores the original signal (the signal supplied from the original signal supplier 813) through signal processing reversal to the process of the transmitter 810-1.

Figure 27:
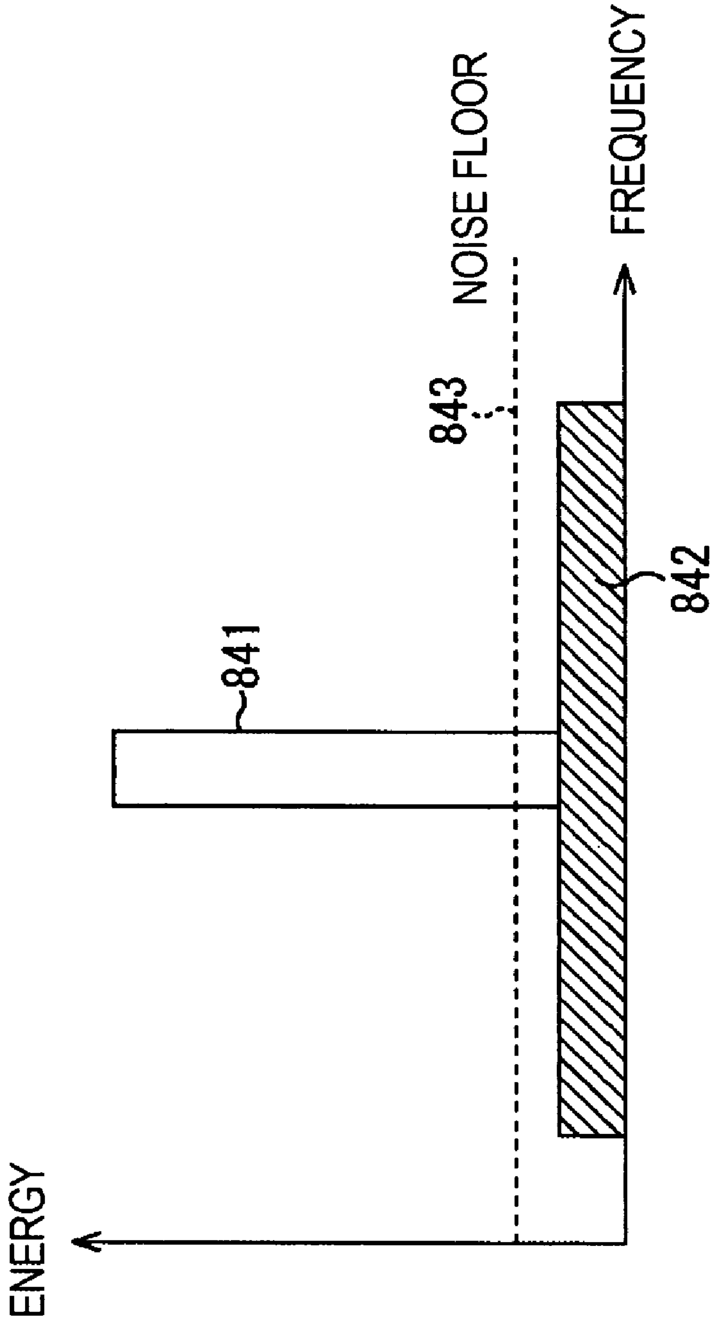
FIG. 27 illustrates a distribution of frequency spectrum.

FIG. 27 illustrates a frequency spectrum with frequency plotted in the abscissa and energy plotted in the ordinate. Spectrum 841 has the frequency fixed. Energy is concentrated on a particular frequency. In this method, any signal, if the energy thereof dropped below a noise floor level 843, cannot be restored. Spectrum 842 is the one of the spread spectrum method. Energy spreads over a wide frequency bandwidth. The area of a rectangle is considered as the entire energy. Regardless of whether each frequency component is lower than the noise floor level 843 or not, the signal of the spectrum 842 is restored by integrating energy over the entire frequency bandwidth. Communications are thus possible.

With the spread spectrum technique, the communication system 800 can perform concurrent communications using the same communication medium 830. As shown in FIG. 26, paths 831 through 835 indicate communication paths on the communication medium 830. With the spread spectrum technique, the communication system 800 perform many-to-one communications as represented by the path 831 and the path 832 or many-to-many communications.

A second method for multiplex communications is a frequency division method. In the frequency division method, a frequency bandwidth is predetermined between a transmitter and a receiver, and then divided into a plurality of bands. The transmitter (or receiver) complies with a particular frequency bandwidth allocation rule or detects a frequency bandwidth at the start of communication, and is assigned a frequency bandwidth in accordance with the detection results.

Figure 28:
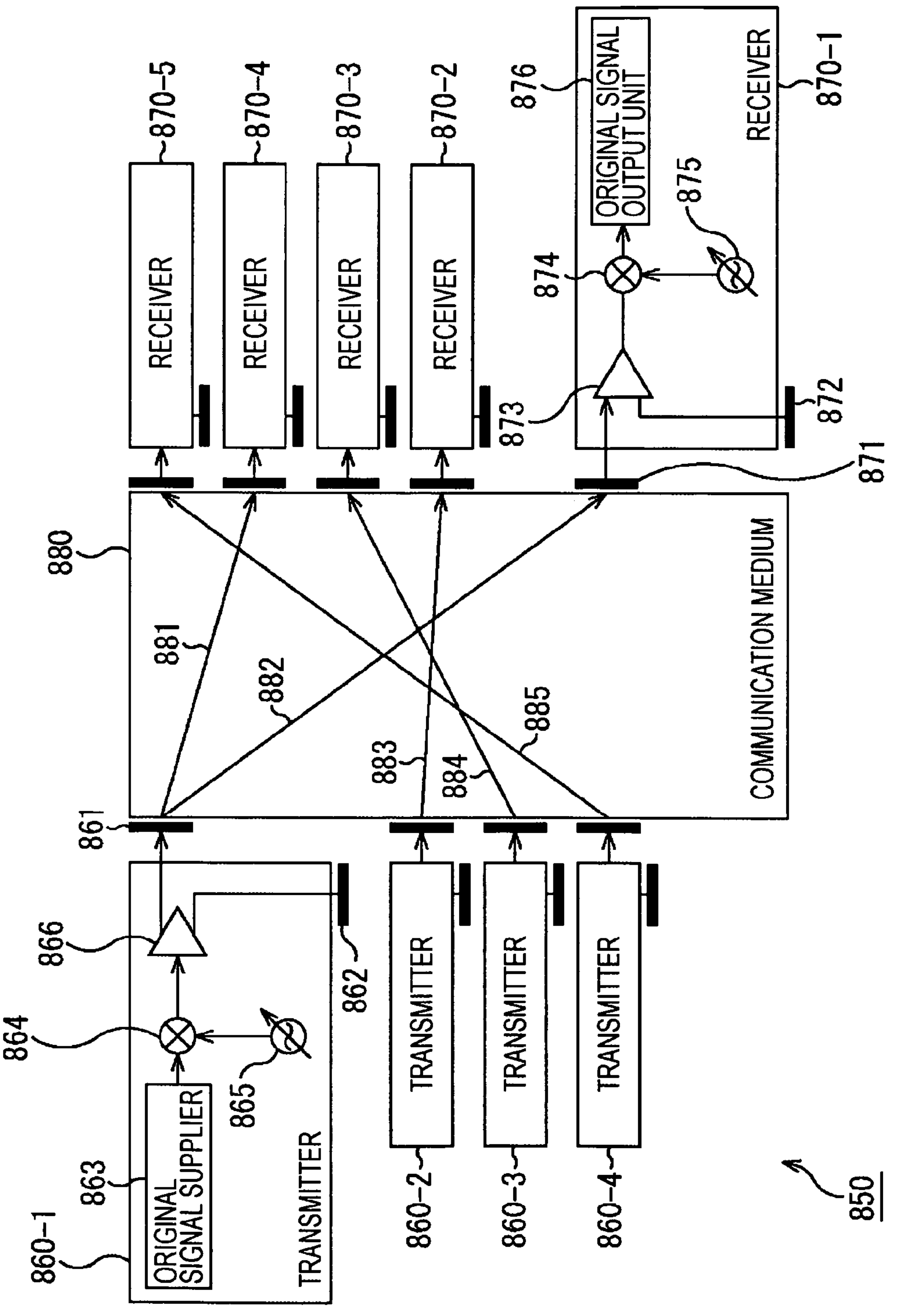
FIG. 28 illustrates yet a further structure of the communication system in accordance with one embodiment of the present invention.

FIG. 28 illustrates a communication system 850 in accordance with one embodiment of the present invention. The communication system 850 includes four transmitters 860-1 through 860-4 and five receivers 870-1 through 870-5, and performs multiplex communications on a communication medium 880 using the frequency division method.

The transmitter 860-1, corresponding to the transmitter 110 of FIG. 1, includes a transmission signal electrode 861 and a transmission reference electrode 862. The transmitter 860-1 further includes, as a unit corresponding to the transmitting unit 113, an original signal supplier 863, a multiplier 864, a frequency variable oscillator 865, and an amplifier 866.

A signal, generated by the frequency variable oscillator 865 and having a particular frequency component, is multiplexed by an original signal supplied from the original signal supplier 863 by the multiplier 864, amplified by the amplifier 866, and then output (as necessary, further filtered). One output from the amplifier 866 is supplied to the transmission signal electrode 861 and the other output from the amplifier 866 is supplied to the transmission reference electrode 862.

The transmitters 860-2 through 860-4 have the same structure as the transmitter 860-1. Since the discussion of the transmitter 860-1 equally applies to the transmitters 860-2 through 860-4, the discussion thereof is omitted herein.

The receiver 870-1, corresponding to the receiver 120 of FIG. 1, includes a reception signal electrode 871 and a reception reference electrode 872. The receiver 870-1 further includes, as a unit corresponding to the receiving unit 123, an amplifier 873, a multiplier 874, a frequency variable oscillator 875, and an original signal output unit 876.

The receiver 870-1 restores an electrical signal in accordance with the method of one embodiment of the present invention, and then restores the original-signal (signal supplied from the original signal supplier 863) through signal processing reversal to the process of the transmitter 860-1.

Figure 29:
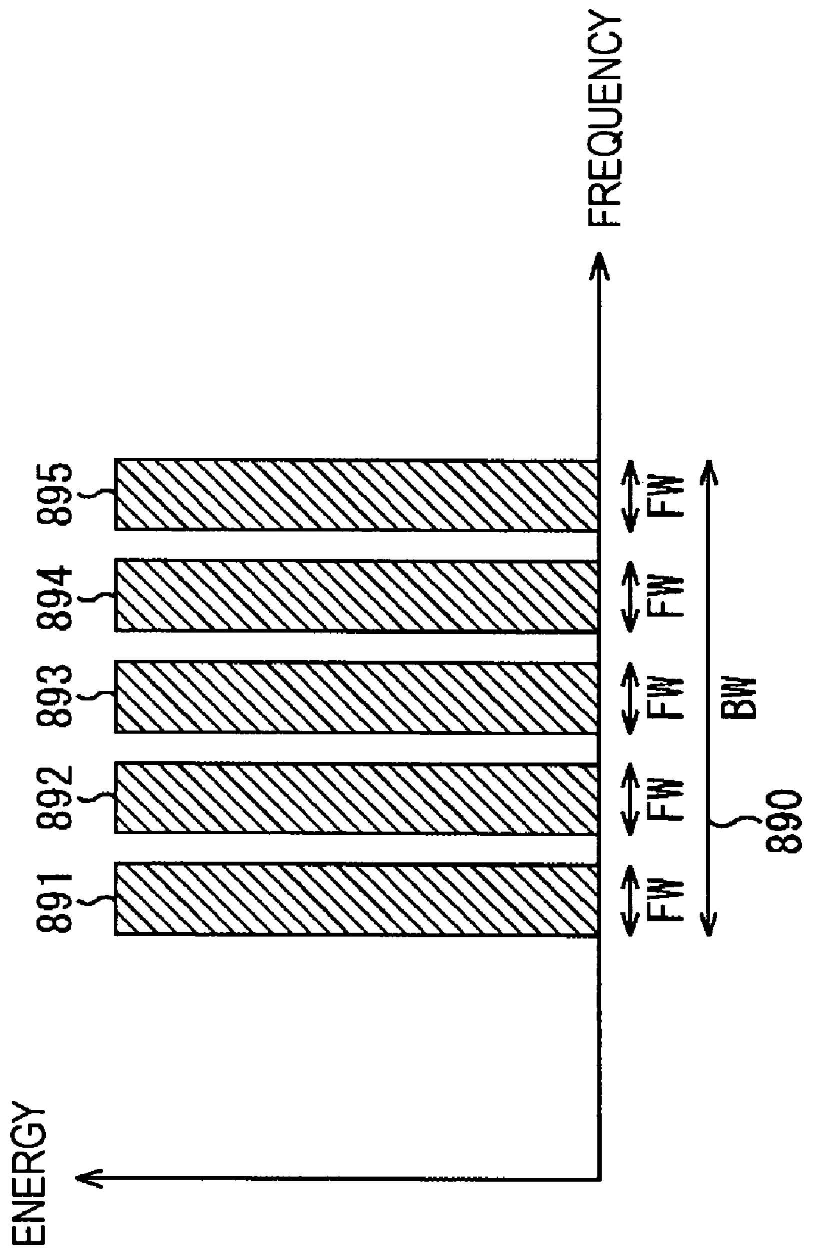
FIG. 29 illustrates a distribution of frequency spectrum.

FIG. 29 illustrates an example of frequency spectrum with frequency plotted in the abscissa and energy plotted in the ordinate. For the convenience of explanation, an entire frequency bandwidth (BW) is divided into five bandwidths (FW) 891 through 895. Divided frequency bandwidths are used for mutually different communication paths. The transmitter 860 (receiver 870) in the communication system 850 uses different frequency bandwidths from communication path to communication path, thereby concurrently performing communications on the single communication medium 880 in a manner free from interference as shown in FIG. 28. FIG. 28 illustrates communication paths 881 through 885 on the communication medium 880. With the frequency division technique, the communication system 850 performs many-to-one communications as represented by the path 881 and the path 882 or many-to-many communications.

The communication system 850 (the transmitter 860 or the receiver 870) divides the entire bandwidth 890 into five bandwidths 891 through 895. The number of divisions is not limited to any particular number, and the divided bandwidths may be different in bandwidth.

Available as a third method for multiplex communications is a time-division technique that divides communication time among transmitters and receivers. The transmitter (or the receiver) complies with a particular time division rule or detects a time slot unoccupied at the start of communication, and is assigned a communication time in accordance with the detection results.

Figure 30:
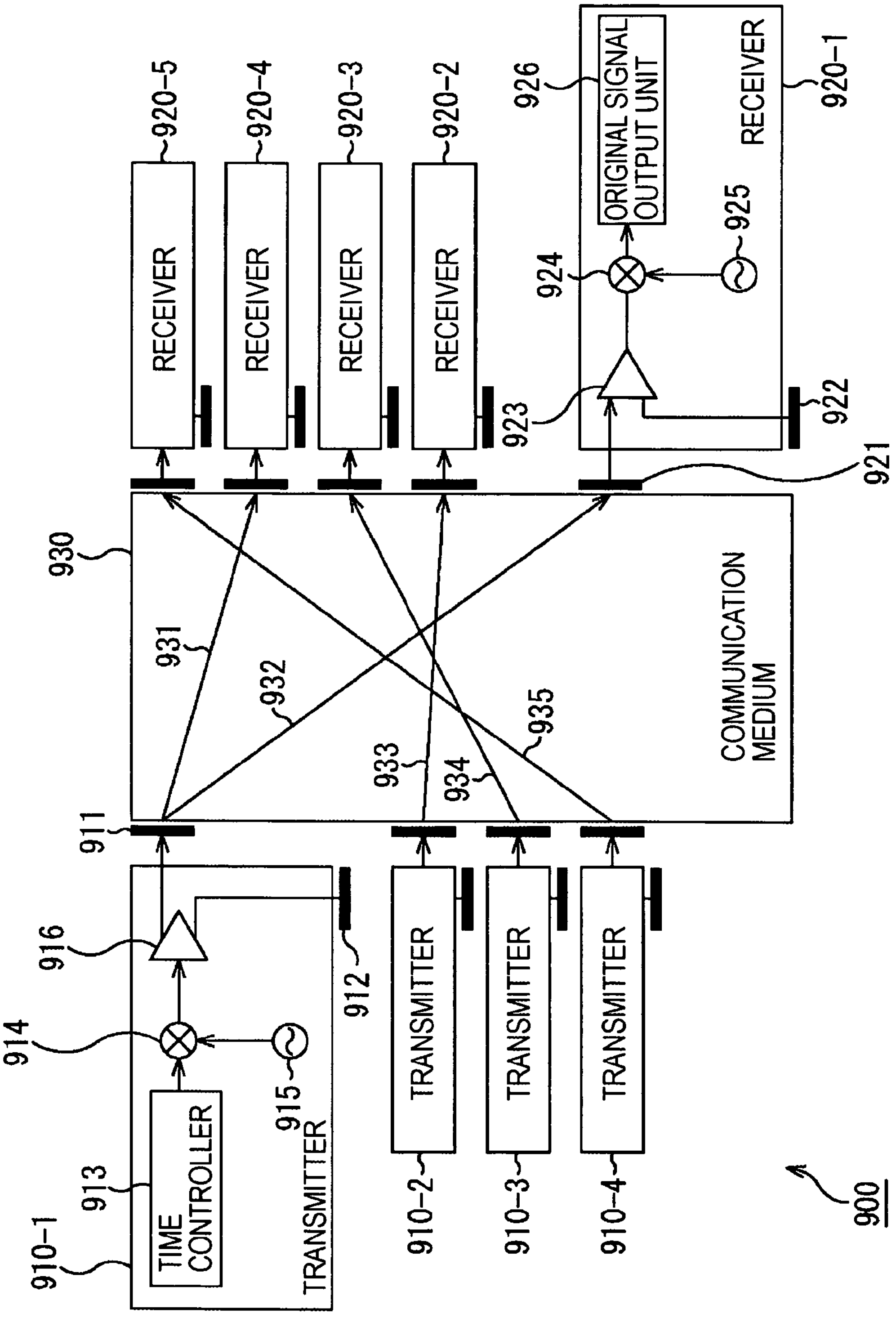
FIG. 30 illustrates yet a further structure of the communication system in accordance with one embodiment of the present invention.

FIG. 30 illustrates a communication system 900. The communication system 900 of FIG. 30 includes four transmitters 910-1 through 910-4 and five receivers 920-1 through 920-5 and performs multiplex communications on a communication medium 930 using the time division technique.

The transmitter 910-1, corresponding to the transmitter 110 of FIG. 1, includes a transmission signal electrode 911 and a transmission reference electrode 912. The transmitter 910-1 further includes, as a unit corresponding to the transmitting unit 113, a time controller 913, a multiplier 914, an oscillator 915, and an amplifier 916.

The time controller 913 outputs an original signal at predetermined time. The multiplier 914 multiplies the original signal by the signal generated by the oscillator 915, and outputs the resulting signal (after being filtered as appropriate). One output from the amplifier 916 is supplied to the transmission signal electrode 911 and the other output from the amplifier 916 is supplied to the transmission reference electrode 912.

The transmitters 910-2 through 910-4 have the same structure as the transmitter 910-1. The discussion of the transmitter 910-1 also applies to the transmitters 910-2 through 910-4, and the discussion thereof is omitted herein.

The receiver 920-1, corresponding to the receiver 120 of FIG. 1, includes a reception signal electrode 921 and a reception reference electrode 922. The receiver 920-1 further includes, as a unit corresponding to the receiving unit 123, an amplifier 923, a multiplier 924, an oscillator 925, and an original signal output unit 926.

The receiver 920-1 decodes an electrical signal in accordance with one embodiment of the present invention, and then restores the original signal (original signal supplied from the time controller 913) through signal processing reversal to the process of the transmitter 910-1.

Figure 31:
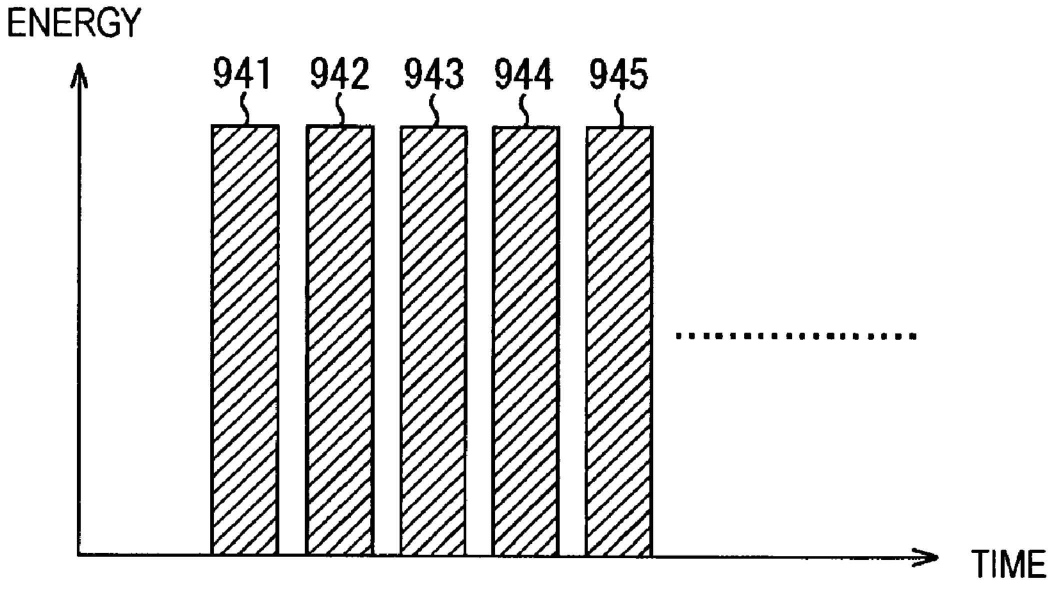
FIG. 31 illustrates a distribution of signals with respect to time.

FIG. 31 illustrates a spectrum obtained in accordance with this method with time plotted in the abscissa and energy plotted in the ordinate. For the convenience of explanation, five time slots 941 through 945 are shown. In practice, these time slots 941 through 945 are followed by further time slots. Each time slot divided in this way is used for a different communication path. The transmitter 910 (receiver 920) in the communication system 900 communicates using a time slot different from communication path to communication path, thereby controlling mutual interference as shown in FIG. 30. A plurality of communications are thus performed on the single communication medium 930. FIG. 30 illustrates communication paths 931 through 935 on the communication medium 930. With the time division technique, the communication system 900 performs many-to-one communications as represented by the path 931 and the path 932, or many-to-many communications.

Time slots divided by the communication system 900 (the transmitter 910 or the receiver 920) may be different in time width.

Two or more of the three communication techniques described above may be combined.

In a particular application, the feature that each of the transmitter and the receiver communicates with a plurality of apparatuses is very important. Each of the transmitter and the receiver may be applied for ticket handling in transportation facility. A user holding an apparatus A having information related to commuter pass, and an apparatus B having a digital money function may use an automatic ticket gate. With the above-described method used, the apparatus A and the apparatus B concurrently operate. Even if the user travels in a route beyond the coverage of the commuter pass, an excess fee may be deducted from the digital money of the apparatus B.

Figure 32:
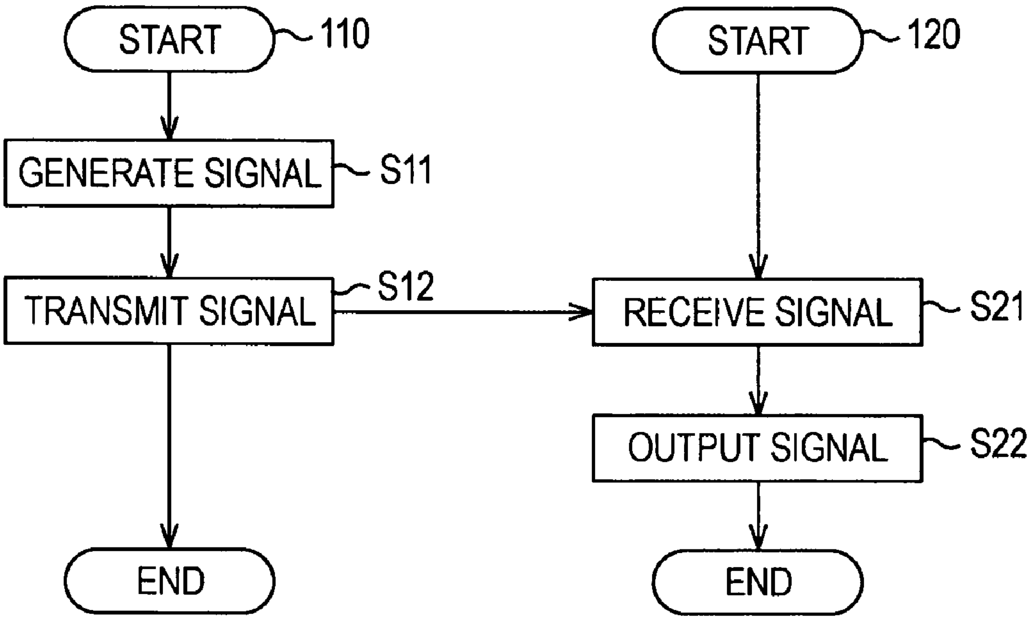
FIG. 32 is a flowchart illustrating a communication process.

A communication process performed between a transmitter and a receiver, for example, performed between the transmitter 110 and the receiver 120 in the communication system 100 of FIG. 1 is described below with reference to a flowchart of FIG. 32.

In step S11, the transmitting unit 113 in the transmitter 110 generates a signal to be transmitted. In step S12, the transmitting unit 113 transmits the generated signal to the communication medium 130 via the transmission-signal electrode 111. Upon transmitting the generated signal, the transmitting unit 113 ends the communication process. The signal transmitted from the transmitter 110 is supplied to the receiver 120 via the communication medium 130. In step S21, the receiving unit 123 in the receiver 120 receives the signal via the reception signal electrode 121. In step S22, the receiving unit 123 outputs the received signal. Upon outputting the received signal, the receiving unit 123 ends the communication process thereof.

The transmitter 110 and the receiver 120 perform basic communication through a simple process, without the need for performing any complex process. More specifically, free from constructing a closed circuit using a reference electrode, the transmitter 110 and the receiver 120 can perform a reliable communication process by simply transmitting and then receiving signals via the signal electrodes thereof in a manner not affected by environments. The transmitter 110 and the receiver 120 (communication system 100) reduces workload and manufacturing costs involved in the communication process to be reliably performed in a manner not affected by environments. Since the structure of the communication process is simplified, the communication system 100 can easily use a variety of communication methods in combination, such as modulation, encoding, encrypting, and multiplexing.

In the above communication systems, the transmitter and the receiver are separate apparatuses. A transceiver having the functions of both the transmitter and the receiver may be used to construct a communication system.

Figure 33:
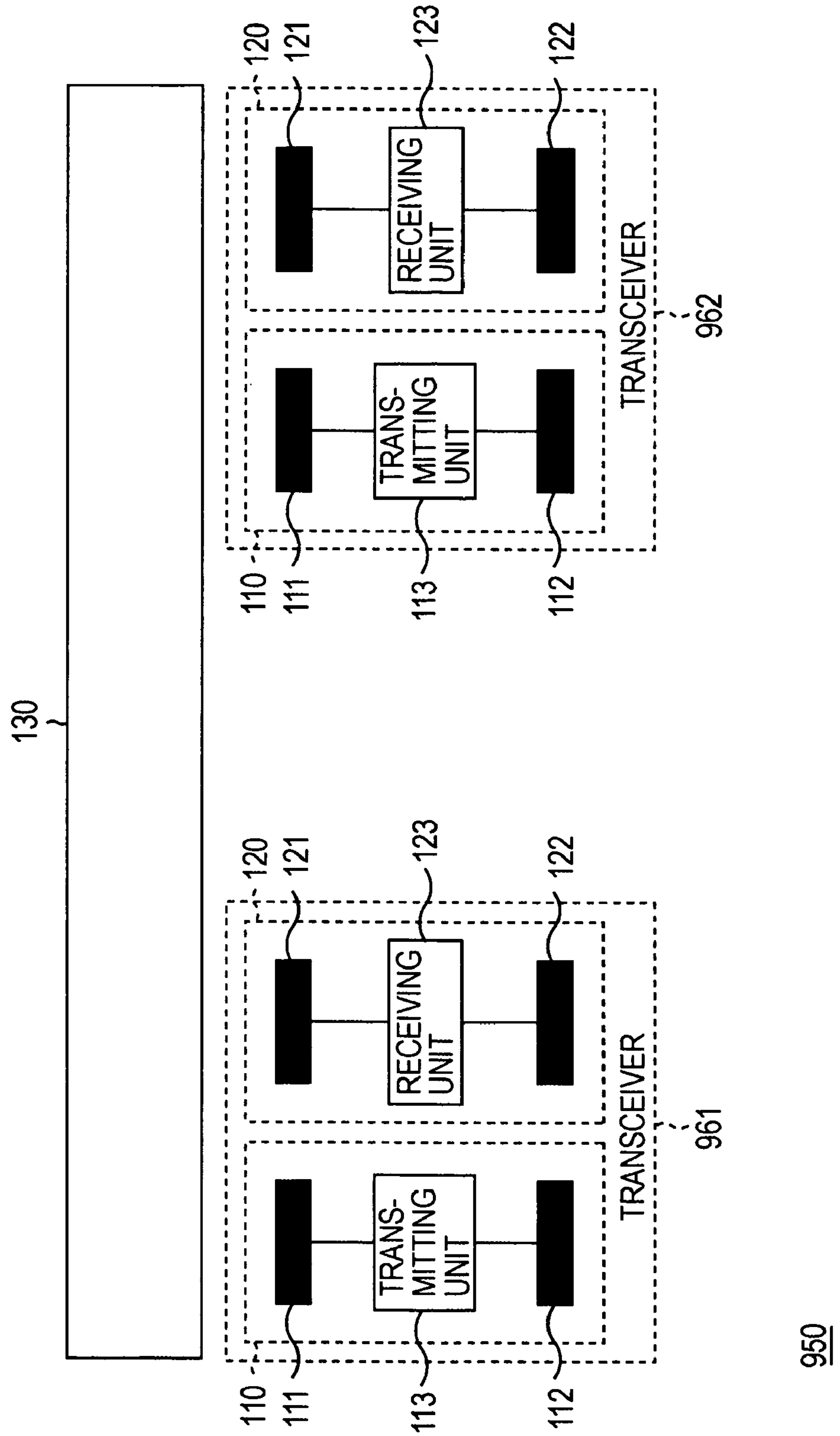
FIG. 33 illustrates yet a further structure of the communication system in accordance with one embodiment of the present invention.

FIG. 33 illustrates a communication system 950 in accordance with one embodiment of the present invention.

As shown in FIG. 33, the communication system 950 includes a transceiver 961, a transceiver 962, and a communication medium 130. In the communication system 950, the transceiver 961 and the transceiver 962 exchange signals in two-way communications via the communication medium 130.

The transceiver 961 includes a transmitter 110 identical to the transmitter 110 of FIG. 1, and a receiver 120 identical to the receiver 120 of FIG. 1. More specifically, the transceiver 961 includes the transmission signal electrode 111, the transmission reference electrode 112, the transmitting unit 113, the reception signal electrode 121, the reception reference electrode 122, and the receiving unit 123.

The transceiver 961 transmits a signal via the communication medium 130 using the transmitter 110, and receives a signal via the communication medium 130 using the receiver 120. The transceiver 961 is designed so that the communication through the transmitter 110 and the communication through the receiver 120 do not interfere with each other.

The transceiver 962 is identical in structure to the transceiver 961, and operates in the same way. The discussion of the transceiver 962 is thus omitted herein. The transceiver 961 and the transceiver 962 perform two-way communications in the same way via the communication medium 130.

The communication system 950 (including the transceiver 961 and the transceiver 962) can easily perform the two-way communications in a manner free from the limitation of application environments.

In the above communication system, the electrodes for transmission are different the electrodes for reception. Alternatively, only a pair of signal electrode and a reference electrode may be used and the connection thereof for transmission and reception may be switched.

Figure 34:
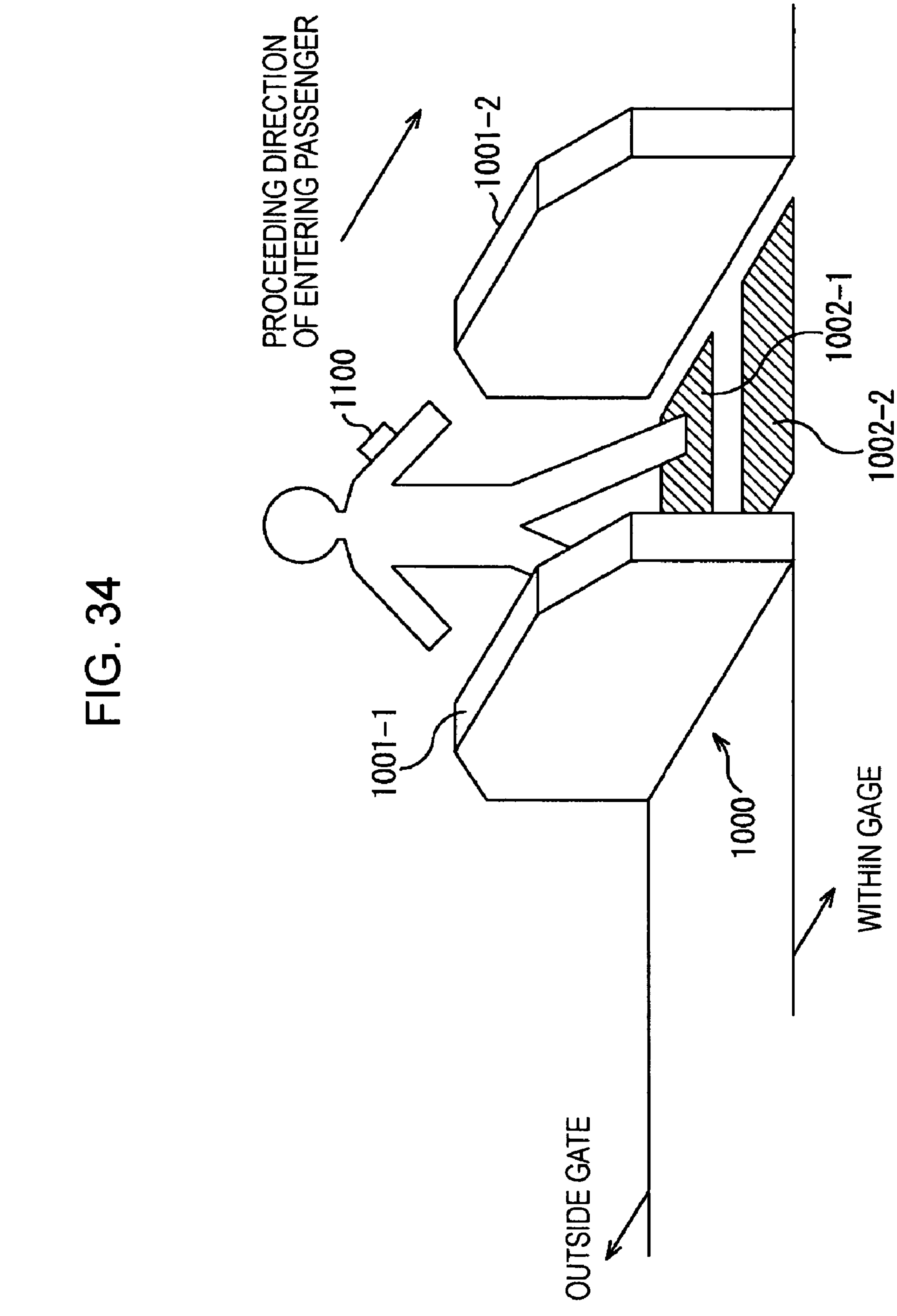
FIG. 34 illustrates a ticket inspection system in accordance with one embodiment of the present invention.
Figure 35:
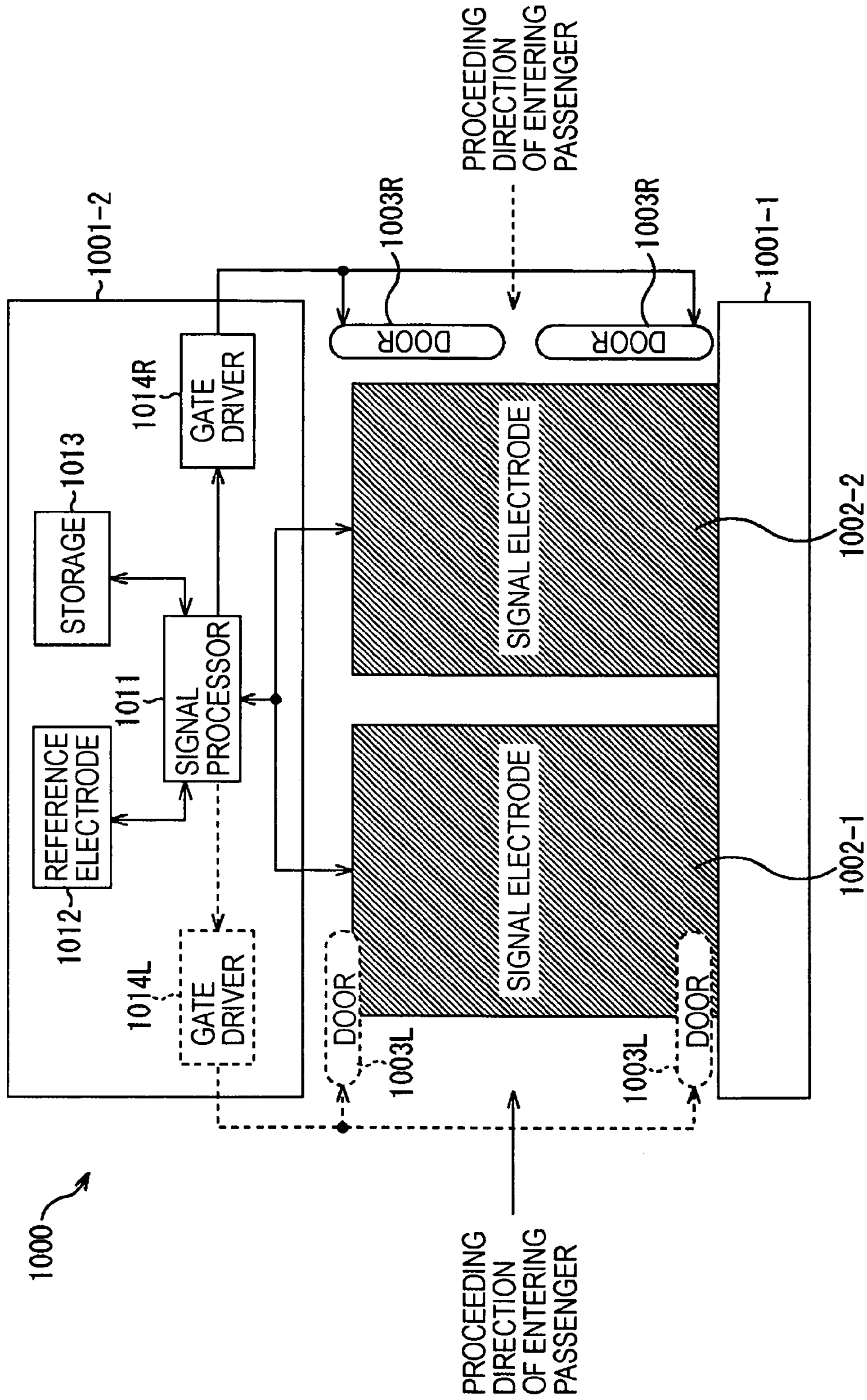
FIG. 35 illustrates the ticket inspection system of FIG. 34 viewed from above.

A ticket inspection system 1000 based on the above-described communication system is described below with reference to FIGS. 34 and 35. FIG. 34 illustrates the ticket inspection system 1000 viewed at a slantly downward angle from above within a ticket gate. FIG. 35 illustrates the communication system 100 viewed from right above.

The ticket inspection system 1000 is installed at an entrance of a railway station, an art museum or the like (FIG. 35 illustrates the ticket inspection system 1000 installed at a railway station entrance). From a user device (UD) 1100 mounted on an arm of a user passing through the ticket gate (corresponding to the transceiver 962 of FIG. 33), the ticket inspection system 1000 reads information corresponding to commuter pass or the like, performs a ticket inspection process based on the read information, and opens or closes doors 1003 of ticket gates 1001-1 and 1001-2.

Subsequent to the end of ticket inspection, the ticket inspection system 1000 reads pre-stored subscription information of a content such as newspapers and magazines from the user device 1100 that is mounted on the arm of the user passing through the ticket gate. Based on the read information, the transmitter 110 delivers the data of the content to the user device 1100.

The ticket inspection system 1000 includes the ticket gates 1001-1 and 1001-2, signal electrodes 1002-1 and 1002-2, doors 1003L and 1003R arranged between the ticket gates 1001-1 and 1001-2, a signal processor 1011, a reference electrode 1012, a storage 1013, and gate drivers 1014L and 1014R.

Each of the signal electrodes 1002-1 and 1002-2 is constructed by integrating the transmission signal electrode 111 and the reception signal electrode 121 of FIG. 3. The signal electrodes 1002-1 and 1002-2 are arranged on a floor surface between the ticket gates 1001-1 and 1001-2. The signal electrodes 1002-1 and 1002-2 may be arranged with the top surface thereof exposed upwardly or covered with an insulator. The signal electrodes 1002-1 and 1002-2 are divided into a plurality of segments and each segment is switched to be connected to the signal processor 1011 in a time division manner for communications.

The signal processor 1011 is constructed by integrating the transmitting unit 113 and the receiving unit 123 of FIG. 33. The signal processor 1011 performs wireless communications discussed with reference to FIGS. 1 through 33 using the user device 1100 and the human body of the passenger as the communication medium corresponding to the communication medium 130 of FIG. 33. The user device 1100 is mounted on the arm of the passenger passing through the ticket gates 1001-1 and 1001-2 connected to the signal electrodes 1002-1 and 1002-2.

The reference electrode 1012 is constructed by integrating the transmission reference electrode 112 and the reception reference electrode 122 of FIG. 33, and may be installed at any convenient place. As shown in FIG. 35, the reference electrode 1012 is installed together with the signal processor 1011 in one ticket gate 1001-2.

The storage 1013 stores content data periodically acquired from a content delivery server (not shown). The signal processor 1011 reads the content data from the storage 1013. The storage 1013 further stores a ticket inspection completion table. On the ticket inspection completion table, the signal processor 1011 registers a device identification (ID) of the user device 1100 having undergone the ticket inspection process together with a session key shared during authentication in the ticket inspection process.

The gate driver 1014L under the control of the signal processor 1011 opens or closes the door 1003L. The gate driver 1014R under the control of the signal processor 1011 opens or closes the door 1003R.

With reference to FIG. 35, the left door 1003L is open while the right door 1003R is closed.

Each of the ticket gates 1001-1 and 1001-2 is referred to as a ticket gate 1001, each of the signal electrodes 1002-1 and 1002-2 is referred to as a signal electrode 1002, each of the doors 1003L and 1003R is referred to as a door 1003, and each of the gate drivers 1014L and 1014R is referred to as a gate driver 1014, if there is no need for discriminating therebetween.

In the ticket inspection system 1000, passengers may proceed from the signal electrode 1002-1 (from the left side of FIG. 35) as represented by an arrow-headed solid line to enter the gate or may proceed from the signal electrode 1002-2 (from the right side of FIG. 35) as represented by an arrow-headed broken line to exit the gate. The passengers can enter or exit the gate through the ticket inspection system 1000.

When the passenger enters from the left side of FIG. 35 (from outside the gate), the signal processor 1011 communicates with the user device 1100 via the signal electrode 1002-1 to perform the ticket inspection process. The signal processor 1011 controls the gate driver 1014R, thereby opening or closing the door 1003R. Via the signal electrode 1002-2, the signal processor 1011 delivers (transmits) content data stored on the storage 1013 to the user device 1100 in accordance with communication results with the user device 1100.

When the passenger exits from the right side of FIG. 35 (from inside the gate), the signal processor 1011 communicates with the user device 1100 via the signal electrode 1002-2 to perform the ticket inspection process. The signal processor 1011 controls the gate driver 1014L, thereby opening or closing the door 1003L. Via the signal electrode 1002-1, the signal processor 1011 delivers (transmits) content data stored on the storage 1013 to the user device 1100 in accordance with communication results with the user device 1100.

The signal processor 1011 switches between the signal electrodes 1002-1 and 1002-2 for communications in a time-division manner. The signal processor 1011 performs the ticket inspection process in communication with the user device 1100 via the signal electrode 1002-1 or the signal electrode 1002-2 depending on the direction of proceeding of the passenger, and then performs the content delivery process in communication with the user device 1100 via the signal electrode 1002-1 or the signal electrode 1002-2 depending on the direction of proceeding of the passenger.

Figure 36:
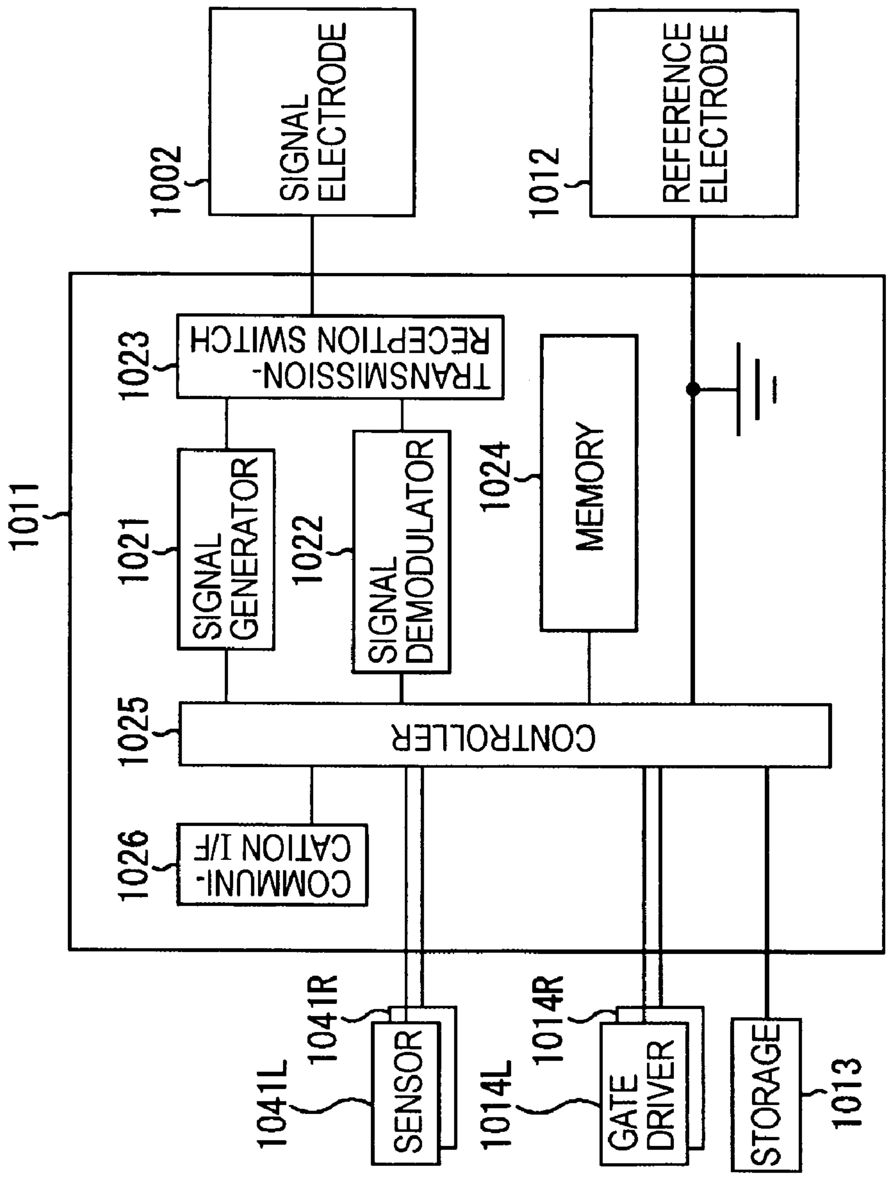
FIG. 36 is a block diagram of a signal processing apparatus of FIG. 35.

FIG. 36 is a block diagram illustrating the structure of the signal processor 1011.

For example, to transmit information to the user device 1100, a signal generator 1021 in the signal processor 1011 generates a signal corresponding to the information under the control of a controller 1025. When a signal is received from the user device 1100, a signal demodulator 1022 demodulates the signal and supplies the demodulated signal to the controller 1025.

A transmission-reception switch 1023 under the control of the controller 1025 selects between the signal electrode 1002-1 and the signal electrode 1002-2 as the signal electrode 1002, and switches between the signal generator 1021 and the signal demodulator 1022 to be connected to the signal electrode 1002.

The controller 1025 includes a central processing unit (CPU), a read-only memory (ROM), and a random-access memory (RAM). By performing a variety of programs, the controller 1025 controls operation of each of the signal generator 1021, the signal demodulator 1022, a communication interface 1026, and the gate driver 1014.

The controller 1025 controls the signal generator 1021, thereby causing the signal generator 1021 to generate a signal to be transmitted to the user device 1100. The controller 1025 controls the signal demodulator 1022, thereby causing the signal demodulator 1022 to demodulate a signal received from the user device 1100. The controller 1025 causes the gate driver 1014 to open or close the door 1003 in response to a sensor output from one of a sensor 1041L and a sensor 1041R and communication results with the user device 1100. The controller 1025 periodically controls the communication interface 1026, thereby causing the communication interface 1026 to access a content delivery server (not shown) via a network (not shown) such as the Internet. The controller 1025 thus causes the communication interface 1026 to acquire data of a content and the storage 1013 to store the acquired content data.

A memory 1024, composed of an electrically erasable programmable read only memory (EEPROM), stores required data as necessary.

The communication interface 1026 under the control of the controller 1025 accesses the content delivery server (not shown) via the network (not shown) such as the Internet and acquires the content data.

As shown in FIG. 35, the controller 1025 connects to the storage 1013, the gate drivers 1014L and 1014R, and the sensors 1041L and 1041R. Each of the sensor 1041L and the sensor 1041R is referred to as a sensor 1041 if there is no need for discriminating therebetween.

The sensor 1041 detects a human using laser, and is installed at each of the right side and the left side of the ticket gate 1001. The sensor 1041 outputs a sensor output signal to the controller 1025 when a passenger enters between the +ticket gate 1001-1 and the ticket gate 1001-2. The sensor 1041 has a sensing area just in front of the ticket gate 1001.

The sensor 1041 is not limited to the one using laser. The sensor 1041 may be any type detecting the passage or the presence of a passenger. For example, the sensor 1041 may be a pressure sensor or an optical sensor and installed in each of the signal electrode 1002-1 and the signal electrode 1002-2.

Figure 37:
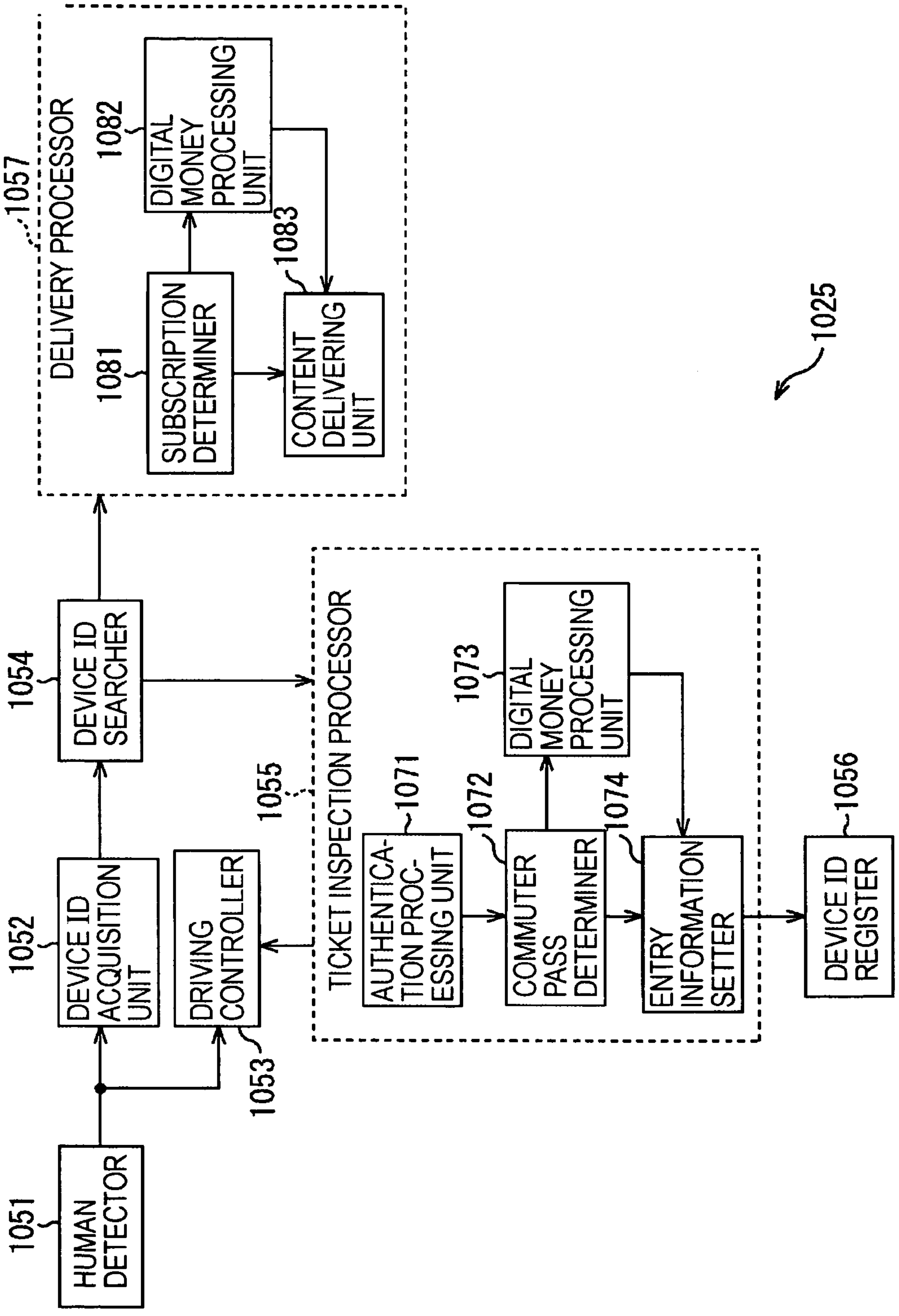
FIG. 37 is a block diagram of a controller of FIG. 35.

FIG. 37 illustrates the structure of the controller 1025 in the signal processor 1011.

As shown in FIG. 37, the controller 1025 includes a human detector 1051, a device ID acquisition unit 1052, a driving controller 1053, a device ID searcher 1054, a ticket inspection processor 1055, a device ID register 1056, and a delivery processor 1057.

The human detector 1051 detects a human (passenger) in response to the sensor output from one of the sensor 1041L and the sensor 1041R, and supplies the detection result to each of the human detector 1051 and the driving controller 1053.

The device ID acquisition unit 1052 transmits a start command to the user device 1100 of the passenger to notify the user device 1100 of the start of communication, acquires a device identification (ID) transmitted from the user device 1100 in response to the notification, and supplies the acquired device ID to the device ID searcher 1054.

The device ID searcher 1054 responds to a notification from the ticket inspection processor 1055 or both the detection result of the human detector 1051 and the operational status of the signal processor 1011 (including the ticket inspection processor 1055 and the delivery processor 1057). More specifically, the device ID searcher 1054 controls one of the gate driver 1014L and the gate driver 1014R to open or close the one of the door 1003L and the door 1003R.

For example, when the detection result is supplied from the sensor 1041L with neither the ticket inspection processor 1055 nor delivery processor 1057 being operative, the driving controller 1053 controls the gate driver 1014L to allow the passenger to enter from the left side of FIG. 35, thereby opening the door 1003L on the side of the sensor 1041L having detected the passenger. Similarly, when the detection result is supplied from the sensor 1041R with neither the ticket inspection processor 1055 nor delivery processor 1057 being operative, the driving controller 1053 controls the gate driver 1014R to allow the passenger to enter from the right side of FIG. 35, thereby opening the door 1003R on the side of the sensor 1041R having detected the passenger. The door on the opposite side may also be opened or closed.

When the ticket inspection processor 1055 notifies the driving controller 1053 of a successful ticket inspection process in response to a passenger entering from the left side of FIG. 35, the driving controller 1053 controls the gate driver 1014R to open the door 1003R located in a direction opposite from the proceeding direction (from left to right). On the other hand, when the ticket inspection processor 1055 notifies the driving controller 1053 of a successful ticket inspection process in response to a passenger entering from the right side of FIG. 35, the driving controller 1053 controls the gate driver 1014L to open the door 1003L located in a direction opposite from the proceeding direction (from right to left).

When the ticket inspection processor 1055 notifies the driving controller 1053 of an authentication error or a failed ticket inspection process in response to a passenger entering from the left side of FIG. 35, the driving controller 1053 controls the gate driver 1014R to close the door 1003R located in a direction opposite from the proceeding direction (from left to right). On the other hand, when the ticket inspection processor 1055 notifies the driving controller 1053 of an authentication error or a failed ticket inspection process in response to a passenger entering from the right side of FIG. 35, the driving controller 1053 controls the gate driver 1014L to close the door 1003L located in a direction opposite from the proceeding direction (right to left).

As previously discussed with reference to FIG. 35, the storage 1013 stores the ticket inspection completion table. The ticket inspection completion table registers the device ID of the user device 1100, ticket inspected by the signal processor 1011, together with the session key shared at the authentication of the ticket inspection process. The ticket inspection completion table may be stored on the memory 1024 in the signal processor 1011 instead of on the storage 1013.

The device ID searcher 1054 references the ticket inspection completion table on the storage 1013, thereby determining whether the device ID from the device ID acquisition unit 1052 is registered in the ticket inspection completion table. If it is determined that the device ID is not registered, the device ID searcher 1054 supplies the device ID to the ticket inspection processor 1055. If it is determined that the device ID is registered, the device ID searcher 1054 reads a session key registered in association with the device ID from the ticket inspection completion table of the storage 1013, and then supplies the session key to the delivery processor 1057.

The ticket inspection processor 1055 includes an authentication processing unit 1071, a commuter pass determiner 1072, a digital money processing unit 1073, and an entry information setter 1074. In response to the device ID from the device ID searcher 1054, the ticket inspection processor 1055 performs the ticket inspection process on the transmitter 110 via the signal electrode 1002.

The authentication processing unit 1071 mutually authenticates the user device 1100 via the signal electrode 1002. The authentication processing unit 1071 authenticates the user device 1100 using the device ID. If the authentication process has been successfully completed, the authentication processing unit 1071 generates the session key and transmits the generated session key to the user device 1100 via the signal electrode 1002. The authentication processing unit 1071 thus shares the session key with the user device 1100. The authentication processing unit 1071 also transfers the device ID and the session key to the commuter pass determiner 1072.

If the authentication process has not been successfully completed, the authentication processing unit 1071 notifies the driving controller 1053 of an authentication error.

Using the session key, the commuter pass determiner 1072 communicates with the user device 1100 via the signal electrode 1002, acquires commuter pass information, determines whether the corresponding commuter pass is valid in service range and unexpired in service period. If it is determined that the commuter pass is valid in service range and unexpired in service period, the commuter pass determiner 1072 notifies the entry information setter 1074 of the determination results together with the device ID and the session key. If it is determined that the commuter pass is invalid or expired, the commuter pass determiner 1072 supplies the device ID and the session key to the digital money processing unit 1073, thereby controlling the digital money processing unit 1073 to deduct from a remaining digital money of the user device 1100.

The digital money processing unit 1073 under the control of the commuter pass determiner 1072 communicates with the user device 1100 via the signal electrode 1002 using the session key, thereby deducting from the remaining digital money stored on the user device 1100. If the deduction is successful, the digital money processing unit 1073 notifies the entry information setter 1074 of the successful reduction result together with the device ID and the session key. If the deduction is unsuccessful, the digital money processing unit 1073 notifies the driving controller 1053 of a deduction error.

In response to the notification from one of the commuter pass determiner 1072 and the digital money processing unit 1073, the entry information setter 1074 communicates with the user device 1100 via the signal electrode 1002 using the session key to set entry information of the user device 1100 to perform the ticket inspection process.

When a passenger enters the ticket gate, the entry-information setter 1074 sets an entry flag in the entry information of the user device 1100, and further sets entry time and entry station in the entry information. On the other hand, when a passenger exits the ticket gate, the entry information setter 1074 clears the entry information set in the user device 1100.

After setting the entry information, the entry information setter 1074 notifies the device ID register 1056 and the driving controller 1053 of the end of ticket inspection process together with the device ID and the session key.

In response to the notification from the entry information setter 1074, the device ID register 1056 registers in the ticket inspection completion table of the storage 1013 the device ID of the ticket-inspected user device 1100 together with the session key.

The delivery processor 1057 includes a subscription determiner 1081, a digital money processing unit 1082, and a content delivering unit 1083. Upon receiving the device ID and the session key from the device ID searcher 1054, the delivery processor 1057 performs a content delivery process to the user device 1100 via the signal electrode 1002 using the session key. Communication with the user device 1100 via the signal electrode 1002 is encrypted using the session key shared during the authentication step.

The subscription determiner 1081 communicates with the user device 1100 via the signal electrode 1002 using the session key, thereby acquiring subscription information of a content, such as newspapers, magazines, or the like, prestored on the user device 1100. In accordance with the subscription information, the subscription determiner 1081 determines whether any content is subscribed with the content subscription period thereof currently unexpired. If it is determined that the content is subscribed with the content subscription period unexpired, the subscription determiner 1081 determines whether the payment method is each-time payment method.

If it is determined that the payment method of the subscribed content is not each-time payment method (i.e., the payment method of the subscribed content is a lump-sum payment method), the subscription determiner 1081 requests the content delivering unit 1083 to deliver the content because the subscription fee of the content must have been made at the storage of the subscription information.

If it is determined that the payment method of the subscribed content is the each-time payment method, the subscription determiner 1081 controls the digital money processing unit 1082 to deduct from the remaining digital money of the user device 1100 by the fee of the content. If it is determined that no content is subscribed or that the content subscription period of a content, if subscribed, is expired, the determination result is transferred to the content delivering unit 1083. The content delivering unit 1083 performs no delivery process.

The digital money processing unit 1082 under the control of the subscription determiner 1081 communicates with the user device 1100 via the signal electrode 1002 using the session key, thereby deducting the remaining digital money stored on the user device 1100 by the fee of the content. If the deduction has been successfully completed, the digital money processing unit 1082 requests the content delivering unit 1083 to deliver that content. If the deduction has failed, the digital money processing unit 1082 notifies the content delivering unit 1083 of a deduction error.

The content delivering unit 1083 reads from the storage 1013 data of a content requested by one of the subscription determiner 1081 and the digital money processing unit 1082. The content delivering unit 1083 communicates with the user device 1100 via the signal electrode 1002 using the session key, thereby delivering the content to the user device 1100. If the content delivering unit 1083 is notified of the error by the one of the subscription determiner 1081 and the digital money processing unit 1082, no content is delivered to the user device 1100.

Figure 38:
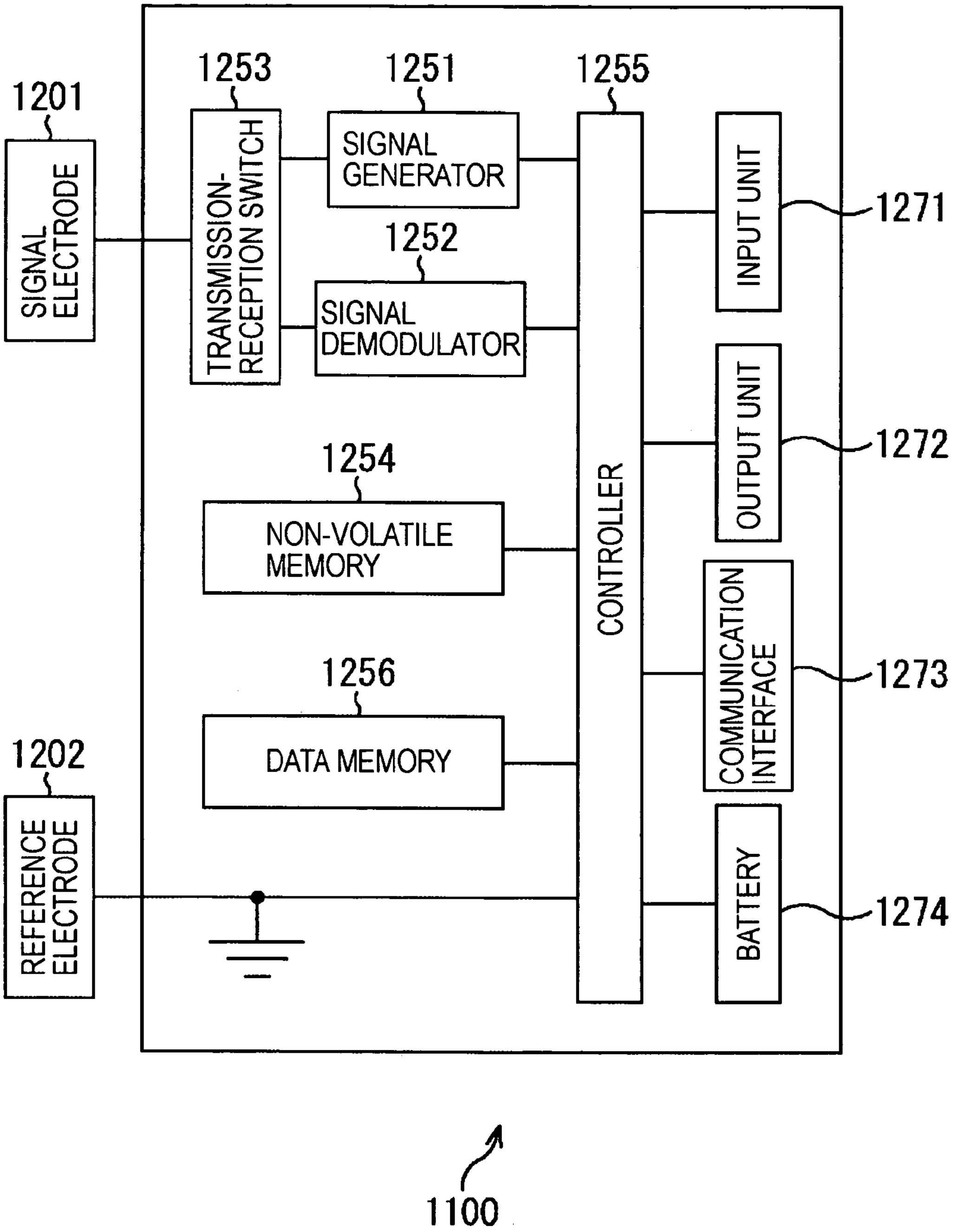
FIG. 38 is a block diagram of a user device.

FIG. 38 is a block diagram illustrating the internal structure of the user device 1100. With reference to FIG. 38, a signal generator 1251 through a transmission-reception switch 1253 are respectively identical in function to the signal generator 1021 through the transmission-reception switch 1023 of FIG. 36, and the detailed discussion thereof is omitted herein.

The signal electrode 1201 and the reference electrode 1202 are those used for wireless communications and described with reference to FIGS. 1 through 33. The signal electrode 1201 is arranged to be close to the communication medium (such as a human body), and the reference electrode 1202 is arranged to face space. The reference electrode 1202 corresponds to one of the transmission reference electrode 112 and the reception reference electrode 122 of FIG. 33, and the signal electrode 1201 corresponds to one of the transmission signal electrode 111 and the reception signal electrode 121 of FIG. 33. The communication medium may be a unitary one-material object or a composite body composed of a plurality of conductors and dielectric materials.

A controller 1255, composed of a CPU, a ROM and a RAM, performs a variety of programs, thereby controlling operation of the signal generator 1251 and the signal demodulator 1252.

The controller 1255 controls one of the signal generator 1251 and the signal demodulator 1252, thereby generating a signal to be transmitted to the signal processor 1011 or demodulating a signal received from the signal processor 1011. The controller 1255 deducts an entrance fee to enter the ticket gate 1001 or an amount requested by the signal processor 1011 from the remaining digital money amount stored on a non-volatile memory 1254.

The non-volatile memory 1254 includes a secure memory such as an electronically erasable programmable read only memory (EEPROM) featuring tamper resistance. To increase tamper resistance, the non-volatile memory 1254 preferably has a one-chip structure in which a CPU forming the controller 1255 is integrated.

The non-volatile memory 1254 under the control of the controller 1255 stores remaining digital money amount information, commuter pass information, ticket inspection entry information, and subscription information of contents including newspapers and magazines. The non-volatile memory 1254 pre-stores the device ID unique to the user device 1100 (each individual portable device), and further stores the session key shared in the authentication step with the signal processor 1011.

The remaining digital money amount information may be a pre-paid amount of money. Optionally, if the remaining amount of pre-paid money is zero, overdraft amounts may be permitted below a predetermined amount depending on the credit of a passenger, and then paid later.

The commuter pass information relates to a transportation service range between predetermined stations and a transportation service period of the transportation service range pre-purchased by the passenger. The ticket inspection entry information includes an entry flag indicating an entry history, entry times, and entry stations, set by the signal processor 1011 at the completion of the ticket inspection process.

The passenger may pre-purchase content such as newspaper, magazines, etc. by accessing a content delivery server connected to a vending machine 1400 (to be discussed later with reference to FIG. 45) or a network. The subscription information relates to the type (title) of content pre-purchased by the passenger or scheduled to purchase by the passenger, a subscription period of the content, and a payment method of the purchase (each-time payment or lump-sum payment).

The data memory 1256, including one of a non-volatile memory, a hard disk, and a removable memory, stores data of the content delivered from the signal processor 1011.

The data memory 1256 may be integrated with the non-volatile memory 1254 that is integrated with the CPU in the one-chip structure. But such further integration increases manufacturing costs. As shown in FIG. 38, the data memory 1256 is arranged to be separate from the non-volatile memory 1254.

The controller 1255 further connects to an input unit 1271, an output unit 1272, a communication interface (I/F) 1273 and a battery 1274.

The input unit 1271 is used to input commands from the user to the user device 1100, and includes operation keys, buttons, and switches, for example. The input unit 1271 may further include a pressure sensor detecting a grip pressure of the passenger who carries the user device 1100, an acceleration sensor detecting acceleration of the user device 1100 when the passenger moves the user device 1100, an optical sensor detecting whether incident light is blocked or not, and an biometric sensor detecting biometric information such as a fingerprint of the passenger.

The output unit 1272 outputs information from the user device 1100 to the user or is used by the user to listen to a content stored on the data memory 1256. The output unit 1272 may include a liquid-crystal display (LCD), for example. Furthermore, the output unit 1272 may include a loudspeaker outputting sound, a light-emitting diode (LED) flashing light at predetermined intervals, and a motor to present vibration to the user.

The communication interface 1273 under the control of the controller 1255 accesses a server (not shown) via a network (not shown) such as the Internet for communications. The battery 1274 feeds power to the entire user device 1100.

The process of the signal processor 1011 in the ticket inspection system 1000 of FIG. 35 is described below with reference to a flowchart of FIG. 39.

For example, no further passenger has entered the gate with the door 1003R opened and the door 1003L closed since an exiting passenger entered the ticket gate from the right side of FIG. 35 with the ticket inspection process and the content delivery process performed on the user device 1100 mounted on the passenger a few minutes ago.

A new passenger now may attempt to enter the ticket gate from the left side of FIG. 35 in this condition. The sensor 1041L installed on the left side of the ticket gate 1001 outputs the sensor output thereof to the human detector 1051 in response to the passenger who is entering between the ticket gate 1001-1 and the ticket gate 1001-2. In response to the sensor output from the sensor 1041L, the human detector 1051 detects the user (passenger), and notifies the device ID acquisition unit 1052 and the driving controller 1053 of the detection result.

The driving controller 1053 receives the detection result from the sensor 1041L in the condition that neither the ticket inspection processor 1055 nor the delivery processor 1057 operates. The driving controller 1053 thus controls the gate driver 1014L, thereby causing the door 1003L on the side of the sensor 1041L having detected the human to open. In this way, the new passenger passes on the signal electrode 1002-1 and the signal electrode 1002-2 in that order between the ticket gate 1001-1 and the ticket gate 1001-2.

The gate driver 1014R can cause the door 1003R to close then, thereby preventing another passenger from entering from the right of FIG. 35.

Upon receiving the detection result from the human detector 1051, the device ID acquisition unit 1052 performs a detection process of the user device 1100 via the signal electrode 1002-1 in step S11. More specifically, the device ID acquisition unit 1052 transmits via the signal electrode 1002-1 to the user device 1100 of the passenger a start command notifying the user device 1100 of the start of communication.

If the sensor 1041 and the human detector 1051, which are non-essential elements, are not employed, the device ID acquisition unit 1052 transmits the start command until a response (device ID) is received from the user device 1100.

Figure 42:
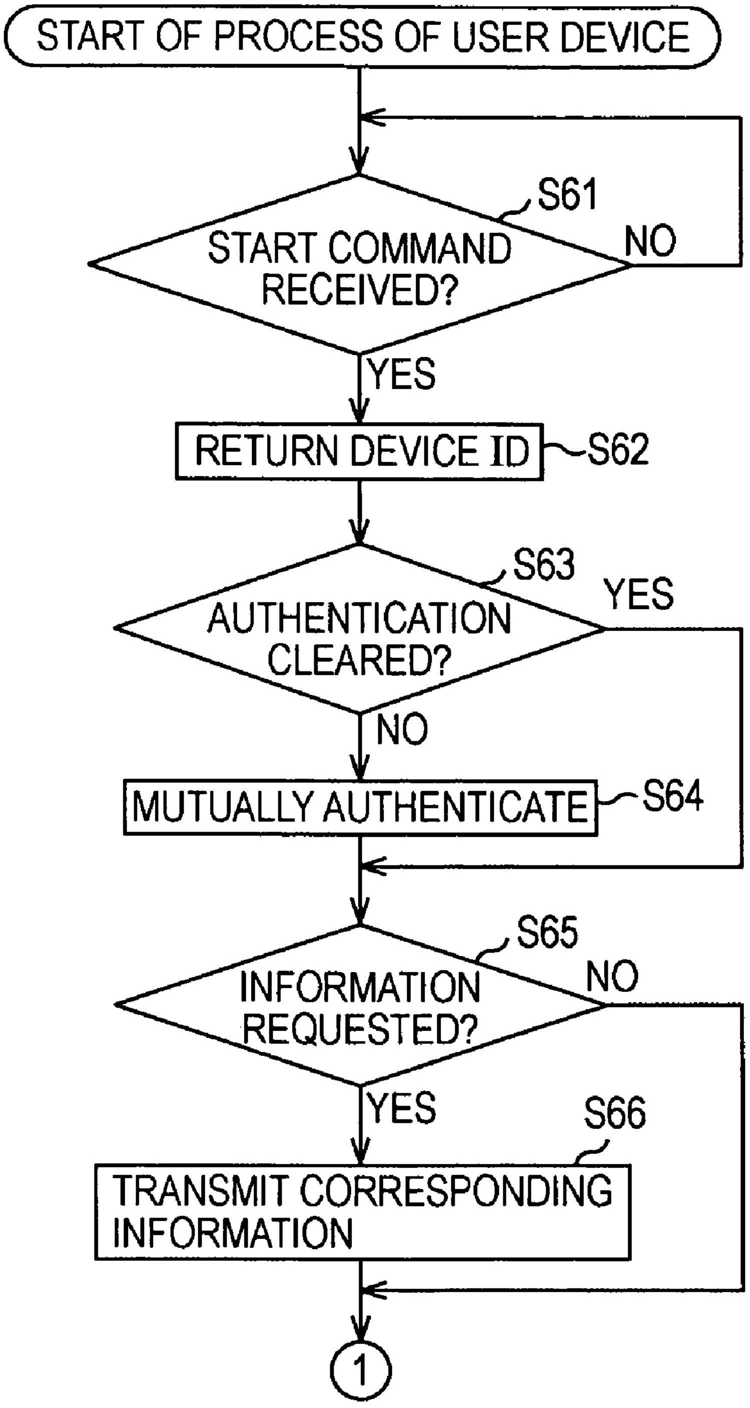
FIG. 42 is a flowchart illustrating a process of the user device.

In response to the start command, the user device 1100 transmits the device ID in step S62 of FIG. 42. The device ID acquisition unit 1052 determines in step S12 that the device ID has been received from the user device 1100. The device ID acquisition unit 1052 supplies the acquired device ID to the device ID searcher 1054. Processing proceeds to step S13.

If it is determined in step S12 that no device ID has been received, processing returns to step S11 to repeat step S11 and subsequent step. Mote specifically, steps S11 and S12 are repeated until it is determined that the device ID has been received.

In step S13, the device ID searcher 1054 references the ticket inspection completion table on the storage 1013 to determine whether the device ID from the device ID acquisition unit 1052 is registered in the ticket inspection completion table. If the ticket inspection process has not been completed, the device ID from the device ID acquisition unit 1052 has not been registered in the ticket inspection completion table. The device ID searcher 1054 determines that the ticket inspection process has not been completed, and then supplies the device ID to the ticket inspection processor 1055.

In response, the ticket inspection processor 1055 performs the ticket inspection process on the user device 1100 in step S14. The ticket inspection process will be detailed with reference to a flowchart of FIG. 40.

In step S14, communications are performed with the user device 1100 via the signal electrode 1002-1. The mutual authentication step is performed, the session key is shared, the commuter pass information is read using the session key, the fee is deducted from the remaining digital money amount based on the commuter pass information, and the entry information is set. The device ID register 1056 and the driving controller 1053 are notified of the end of the ticket inspection process, and the door 1003R is opened.

In response to the notification of the end of the ticket inspection process from the ticket inspection processor 1055, the device ID register 1056 registers in step S15 in the ticket inspection completion table the device ID of the user device 1100 having undergone the ticket inspection process together with the session key shared in the authentication step with the user device 1100. The process of the signal processor 1011 thus ends.

The device ID and the session key, registered in the ticket inspection completion table, are deleted at the end of the delivery of a content or after a predetermined time elapse subsequent to the end of the delivery of the content.

The signal processor 1011 completes the ticket inspection process by communicating with the user device 1100 via the signal electrode 1002-1. The signal processor 1011 then switches the signal electrode. In step S11, the signal processor 1011 performs a detection process to the user device 1100 via the signal electrode 1002-2, thereby acquiring the device ID via the signal electrode 1002-2.

Since the device ID of the user device 1100 has already been registered in the ticket inspection completion table, the device ID searcher 1054 determines in step S13 that the device ID from the device ID acquisition unit 1052 has been registered in the ticket inspection completion table. The device ID searcher 1054 reads the session key in association with the device ID from the ticket inspection completion table on the storage 1013, and supplies the session key to the delivery processor 1057. Processing proceeds to step S16.

In step S16, the delivery processor 1057 performs a content delivery process. The content delivery process will be described below in detail with reference to FIG. 41.

In the content delivery process in step S16, the session key shared in the mutual authentication step with the user device 1100 during the ticket inspection process is used to perform communications with the user device 1100 via the signal electrode 1002-2. The subscription information is thus acquired. Based on the acquired subscription information, the data of the content stored on the storage 1013 is delivered to the user device 1100. The process of the signal processor 1011 now ends.

If it is determined in step S13 that the device ID from the device ID acquisition unit 1052 is not registered in the ticket inspection completion table, the session key shared with the user device 1100 in the ticket inspection process in step S14 is read from the ticket inspection completion table based on the device ID and then supplied to the delivery processor 1057. In the delivery process in step S16, there is no need for performing the authentication step to construct a secure path.

The ticket inspection process is performed as described above when the passenger carrying the user device 1100 passes over the floor, between the ticket gate 1001-1 and the ticket gate 1001-2, having the signal electrode 1002 embedded. Subsequent to the end of the ticket inspection process, the content subscribed or the content reserved for subscription is delivered. Without the need for showing his intention to purchase each time, the user quickly receives a content delivery service by simply passing through the ticket gate 1001 in commutation.

The process of the communication system with the passenger entering from the left side of FIG. 35 (from outside the gate) has been discussed with reference to FIG. 9. When the passenger enters from the right side of FIG. 35 (from within the gate), the process remains unchanged in principle except that the signal electrodes to be connected are mutually interchanged, and the gate driver 1014L and gate driver 1014R are interchanged. The discussion of the operation in that case remain unchanged and is thus omitted herein.

Figure 39:
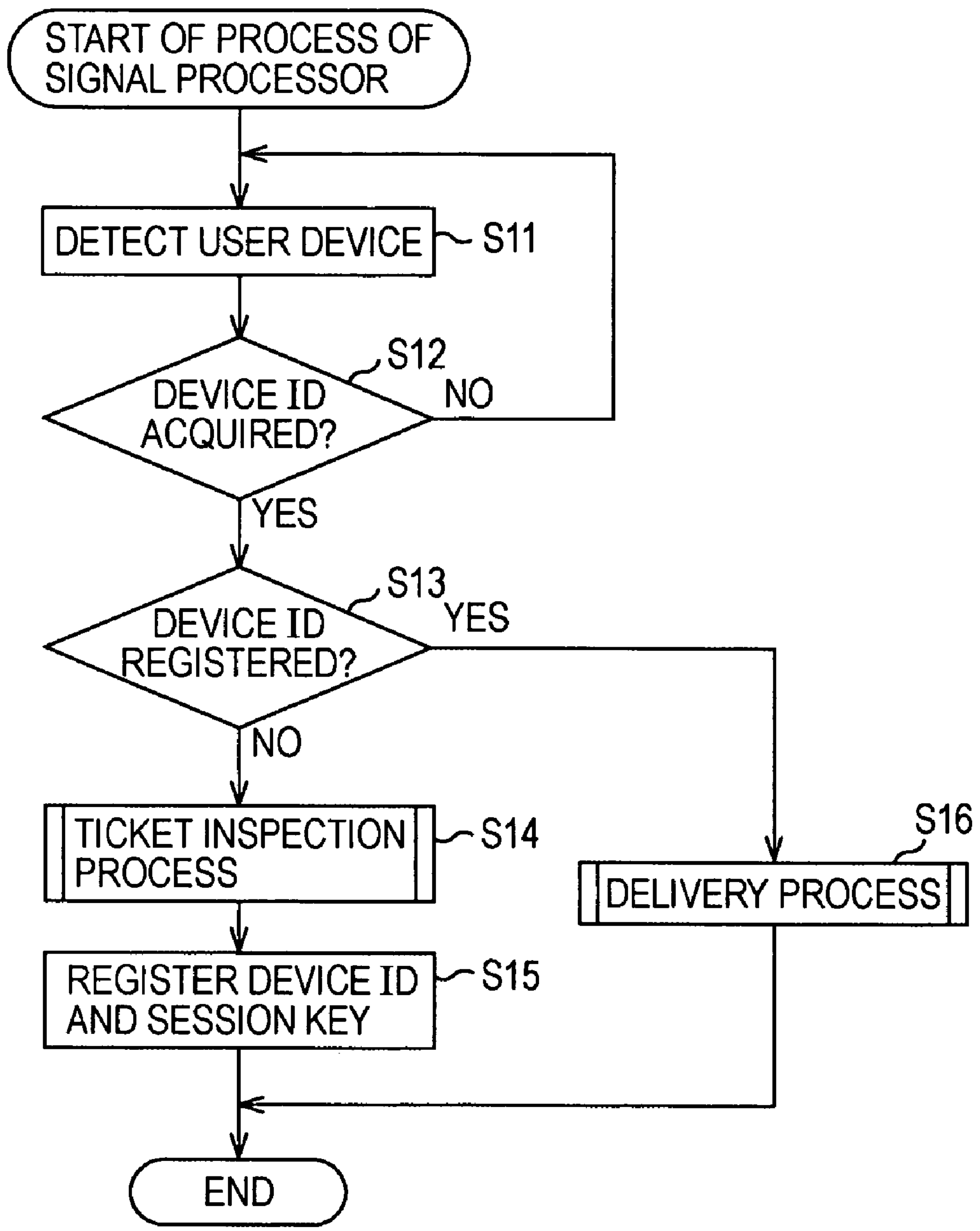
FIG. 39 is a flowchart illustrating a process of the signal processing apparatus in the ticket inspection system of FIG. 35.

The ticket inspection process in step S14 of FIG. 39 is described below with reference to a flowchart of FIG. 40.

The authentication processing unit 1071 in the ticket inspection processor 1055 mutually authenticates in step S21 the user device 1100 using the device ID supplied from the device ID searcher 1054, and determines in step S22 whether the authentication process has been successfully completed.

The mutual authentication process in step S21 is described below. The authentication method used herein is the one standardized by ISO/IEC9798-2 or ISO/IEC9798-3. A mutual authentication process in step S64 of FIG. 42 performed by the user device 1100 in response to the authentication process in step S21 is also discussed together.

The authentication processing unit 1071 generates an authentication key unique to the user device 1100 from the device ID, generates a random number, encrypts the generated random number with the authentication key, and then transmits the encrypted random number to the user device 1100 via the signal electrode 1002-1.

Upon receiving the encrypted random number, the user device 1100 decrypts the encrypted random number, generates another random number, encrypts the two random numbers (the generated random number and the received random number) with the authentication key, and transmits the encrypted random numbers to the signal processor 1011.

The authentication processing-unit 1071 decrypts the returned random number, determines whether one of the random numbers is the one generated by itself (integrity of the random number), determines in step S22 that the authentication process has been successfully completed if the random number is the one generated by itself (authentication processing unit 1071). If the authentication process has been successfully completed, the authentication processing unit 1071 generates a session key, combines the session key with the random number generated by the user device 1100, encrypts the combination with the authentication key, transmits the encrypted combination to the user device 1100 via the signal electrode 1002-1. Processing proceeds to step S23. The authentication processing unit 1071 supplies the device ID and the session key to the commuter pass determiner 1072.

The user device 1100 receives the encrypted session key and random number, verifies the integrity of the decrypted random number, and determines that the authentication has been successful if the decrypted random number is the one generated by itself (user device 1100). If the authentication has been successful, the user device 1100 shares the session key with the signal processor 1011.

Communications are hereinafter performed between the signal processor 1011 and the user device 1100 using the session key (i.e., through encryption using the session key). Communications are thus performed using a secure path constructed based on the mutual authentication.

In step S23, the commuter pass determiner 1072 communicates with the user device 1100 via the signal electrode 1002 using the session key from the authentication processing unit 1071, thereby acquiring the commuter pass information.

In step S24, the commuter pass determiner 1072 determines based on the acquired commuter pass information whether a commuter pass is valid. More specifically, the commuter pass determiner 1072 determines whether the commuter pass is valid in service range and unexpired (before the expiration date). If no commuter pass information is available, the commuter pass determiner 1072 determines in step S24 that the commuter pass is not valid.

If it is determined in step S24 that the commuter pass is not valid, the commuter pass determiner 1072 supplies the device ID and the session key to the digital money processing unit 1073. Processing proceeds to step S25. When the passenger enters a ticket gate, the corresponding fee is deducted from the remaining digital money amount. When the passenger exits another ticket gate later, the payment of the fee from the remaining money amount is actually settled.

In step S25, the commuter pass determiner 1072 controls the digital money processing unit 1073, thereby deducting from the digital money amount of the user device 1100. More specifically, the digital money processing unit 1073 communicates with the user device 1100 via the signal electrode 1002 using the session key from the commuter pass determiner 1072 to deduct from the remaining digital money amount stored on the user device 1100. In step S26, the digital money processing unit 1073 determines whether the deduction has been successful.

Figure 43:
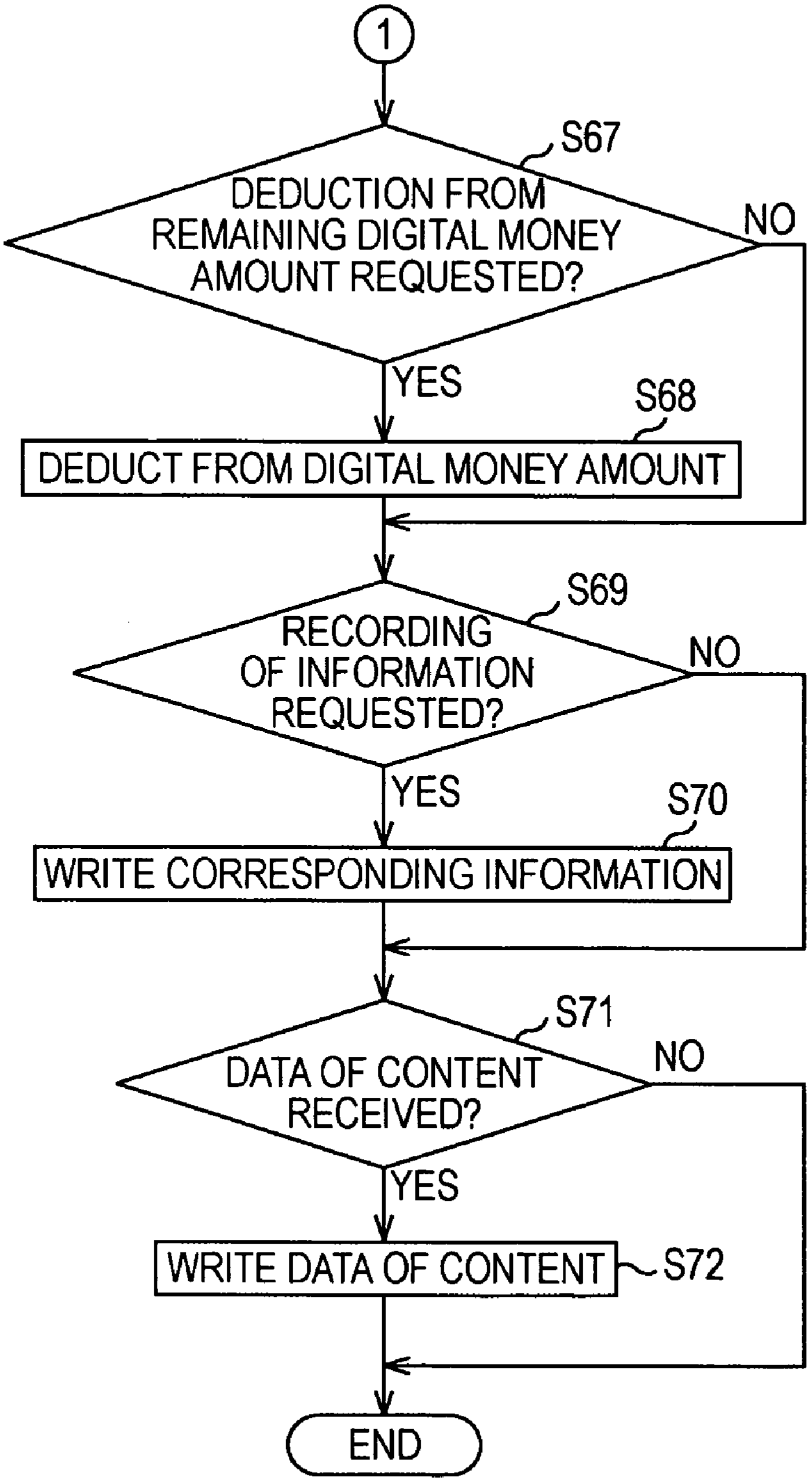
FIG. 43 is a continuation of the flowchart FIG. 42.

If the deduction of the fee from the remaining digital money amount has been successfully completed in step S68 of FIG. 43, the user device 1100 transmits information regarding deduction completion to the signal processor 1011 via the signal electrode 1201. In this case, the digital money processing unit 1073 determines in step S26 that the fee has been successfully deducted from the remaining digital money amount, and then notifies the entry information setter 1074 of the deduction success together with the device ID and the session key. Processing proceeds to step S27.

If it is determined in step S24 that the commuter pass is valid, the commuter pass determiner 1072 notifies the entry information setter 1074 of the determination result together with the device ID and the session key. Processing proceeds to step S27 with steps S25 and S26 skipped.

In step S27, the entry information setter 1074 communicates with the user device 1100 via the signal electrode 1002 using the device ID and the session key from one of the commuter pass determiner 1072 and the digital money processing unit 1073, thereby setting the entry information of the user device 1100.

When a passenger enters the ticket gate 1001 from the left side FIG. 35, the entry information setter 1074 sets an entry flag, the entry time, and the entry station in the entry information of the user device 1100. When a passenger exits the ticket gate 1001 from the right of FIG. 35 from inside the gate, the entry information setter 1074 clears the entry information set in the user device 1100, thereby performing the ticket inspection process. The entry information setter 1074 notifies the device ID register 1056 and the driving controller 1053 of the end of the ticket inspection process and supplies the device ID and the session key to the device ID register 1056.

In response, the device ID register 1056 registers in step S15 of FIG. 39 the device ID of the user device 1100 together with the session key in the ticket inspection completion table on the storage 1013.

In step S28, the driving controller 1053 controls the gate driver 1014R in response to the notification of the end of the ticket inspection process from the entry information setter 1074, thereby opening the door 1003R of the ticket gate 1001. The door 1003R, if already open, remains open.

If the mutual authentication reveals that the random number is invalid, the authentication process is determined to be unsuccessful (authentication failure) in step S22. The authentication processing unit 1071 notifies the driving controller 1053 of an authentication error. Processing proceeds to step S29. If it is determined in step S26 that the deduction has been unsuccessful, the digital money processing unit 1073 notifies the driving controller 1053 of a deduction error. Processing proceeds to step S29.

In step S29, the driving controller 1053 controls the gate driver 1014R in response to the notification of a ticket inspection failure from the ticket inspection processor 1055 (one of the authentication error from the authentication processing unit 1071 and the deduction error from the digital money processing unit 1073), thereby closing the door 1003R of the ticket gate 1001. The door 1003R, if already closed, remains closed.

The mutual authentication is thus performed. The session key is shared, the commuter pass information of the user device 1100 is acquired using the shared session key, and settlement process (deduction of the remaining digital money amount) is performed based on the acquired commuter pass information. The ticket inspection process is thus completed.

The content delivery process in step S16 of FIG. 39 is described below with reference to the flowchart of FIG. 41. Through the encryption process with the session key supplied from the device ID searcher 1054, communications are performed on a secure path constructed in the authentication step in the ticket inspection process.

In step S41, the subscription determiner 1081 in the delivery processor 1057 acquires the subscription information from the user device 1100 via the signal electrode 1002 using the session key supplied from the device ID searcher 1054. In step S42, the subscription determiner 1081 determines based on the subscription information whether any content is subscribed and whether the content subscription period of the content is unexpired.

If it is determined that a content is subscribed and that the content subscription period of the content is unexpired, processing proceeds to step S43. The subscription determiner 1081 determines whether the payment method of the subscription is an each-time payment method or not.

If it is determined in step S43 that the payment method of the subscription is an each-time payment method, the subscription determiner 1081 controls in step S44 the digital money processing unit 1082, thereby deducting a fee of the content from the remaining digital money amount.

The digital money processing unit 1082 under the control of the subscription determiner 1081 communicates with the user device 1100 via the signal electrode 1002 using the session key, thereby deducting the fee of the content from the remaining digital money amount stored on the transmitter 110.

In step S45, the digital money processing unit 1082 determines whether the deduction from the remaining digital money amount has been successful. If the deduction from the remaining digital money amount has been successful in step S68 of FIG. 43 as described later, the user device 1100 transmits a notification of the successful deduction to the signal processor 1011 via the signal electrode 1201. In step S45, the digital money processing unit 1082 determines that the deduction from the remaining digital money amount has been successful, and requests the content delivering unit 1083 to deliver the content. Processing proceeds to step S46.

If it is determined in step S43 that the payment method of the subscription is a lump-sum payment method, processing proceeds to step S46 with steps S44 and S45 skipped because the full payment was already completed at the subscription contracted.

In step S46, the content delivering unit 1083 reads from the storage 1013 the data of the content requested by one of the subscription determiner 1081 and the digital money processing unit 1082, and communicates with the user device 1100 via the signal electrode 1002 using the session key to deliver the content to the user device 1100.

If it is determined in step S42 that no content is subscribed or that the content subscription period of a content, if any, is expired, the subscription determiner 1081 notifies the content delivering unit 1083 of the determination result. Processing proceeds to step S47.

If it is determined in step S45 that the deduction from the remaining digital money amount has failed, the digital money processing unit 1082 notifies the content delivering unit 1083 of the deduction error. Processing proceeds to step S47.

The content delivering unit 1083 is notified of the determination result or the error by the subscription determiner 1081 or the digital money processing unit 1082. In step S47, the content delivering unit 1083 delivers no content.

Since not only the ticket inspection process but also the content delivery process is performed during the passage of the passenger through the ticket gate 1001, the passenger can easily get the data of the content by simply passing through the ticket gate 1001. The passenger is thus freed from going to a newsstand to browse captions and then buy desired newspapers.

Subsequent to the ticket inspection process, the session key shared in the course of authentication is registered. The content delivery process is performed using the shared session key. In the content delivery process, the secure path constructed during the authentication step in the ticket inspection process is used as is. This arrangement eliminates the need for performing the authentication step again.

The user device 1100 responds to the process of the signal processor 1011 described with reference to FIG. 39. The process performed by the user device 1100 is described below with reference to flowcharts of FIGS. 42 and 43. The process of the user device 1100 is a single process, but for the convenience of explanation, the process is divided into two groups, steps S61 through S66 in one group of FIG. 42 and steps S67 through S72 in the other group of FIG. 43.

In step S61 of FIG. 42, the controller 1255 in the user device 1100 waits on standby for the reception of a start command via the signal electrode 1201 transmitted by the signal processor 1011.

In step S11 of FIG. 39, the signal processor 1011 transmits the start command to the user device 1100.

In response to the reception of the start command, processing proceeds to step S62. The controller 1255 reads the device ID unique to the user device 1100 from the non-volatile memory 1254, and returns the device ID to the signal processor 1011 via the signal electrode 1201. Communications are thus established between the signal processor 1011 and the user device 1100.

In step S63, the controller 1255 references the non-volatile memory 1254, thereby determining whether the authentication step has been completed with the signal processor 1011. If the ticket inspection process has not been completed (or if the authentication step has not been completed), the session key with the signal processor 1011 is not registered on the non-volatile memory 1254. The controller 1255 determines in step S63 that the authentication step has not been completed, and processing proceeds to step S64.

As previously discussed in detail with step S21 of FIG. 40, the signal processor 1011 transmits the random number generated in response to the authentication key. In step S64, the controller 1255 mutually authenticates the signal processor 1011, and stores the obtained session key onto the non-volatile memory 1254 after successful authentication. A secure path is established with the signal processor 1011. Using the session key, communications with the signal processor 1011 are performed.

If the ticket inspection process has been successfully completed (or if the authentication step has been successfully completed), the session key with the signal processor 1011 is stored on the non-volatile memory 1254. In step S63, the controller 1255 determines that the authentication has been completed, and then proceeds to step S65 with step S64 skipped. In this case, the secure path has already been established with the signal processor 1011. Using the session key stored on the non-volatile memory 1254, communications are performed with the signal processor 1011.

In step S65, the controller 1255 determines whether the signal processor 1011 has requested any information. For example, if the signal processor 1011 requests the commuter pass information in step S23 of FIG. 40, or if the signal processor 1011 requests the subscription information in step S41 of FIG. 41, processing proceeds to step S66. The controller 1255 reads the corresponding information (the commuter pass information or the subscription information) from the non-volatile memory 1254, and then transmits the corresponding information to the signal processor 1011 via the signal electrode 1201.

If no information has been requested by the signal processor 1011, processing proceeds to step S67 of FIG. 43 with step S66 skipped.

In step S67, the controller 1255 determines whether the signal processor 1011 requests a deduction from the remaining digital money amount. For example, the signal processor 1011 requests a deduction from the remaining digital money amount in step S25 of FIG. 40 or in step S44 of FIG. 41. If the signal processor 1011 requests to deduct from the remaining digital money amount, processing proceeds to step S68. The controller 1255 deducts from the remaining digital money amount stored on the non-volatile memory 1254, and transmits a notification of the end of deduction to the signal processor 1011 via the signal electrode 1201.

If no deduction from the remaining digital money amount is requested by the signal processor 1011, processing proceeds to step S69 with step S68 skipped.

In step S69, the controller 1255 determines whether the signal processor 1011 has requested recording of information. If the signal processor 1011 requests the entry information to be set or to be cleared in step S27 of FIG. 40, or if the signal processor 1011 requests the subscription information to be recorded in step S120 of FIG. 47 to be discussed later, processing proceeds to step S70. The controller 1255 writes the corresponding information onto the non-volatile memory 1254.

If the signal processor 1011 has requested no recording of information, processing proceeds to step S71 with step S70 skipped.

In step S71, the controller 1255 determines whether the data of the content has been received from the signal processor 1011. For example, the signal processor 1011 delivers the content in step S46 of FIG. 41. When the content data is received from the signal processor 1011, processing proceeds to step S72. The controller 1255 writes the received content data onto the data memory 1256.

If the signal processor 1011 has requested no recording of information, the process in step S72 is skipped. Processing thus ends.

The ticket inspection system 1000 of FIG. 35 completes not only the ticket inspection process but also the content delivery process when the passenger carrying the user device 1100 simply passes over the signal electrode 1002 with the wireless communication discussed with reference to FIGS. 1 through 33 performed.

The user can quickly enjoy the content delivery service simply by passing through the ticket gate 1001 in commutation without the need for particularly showing purchase intentions.

Figure 44:
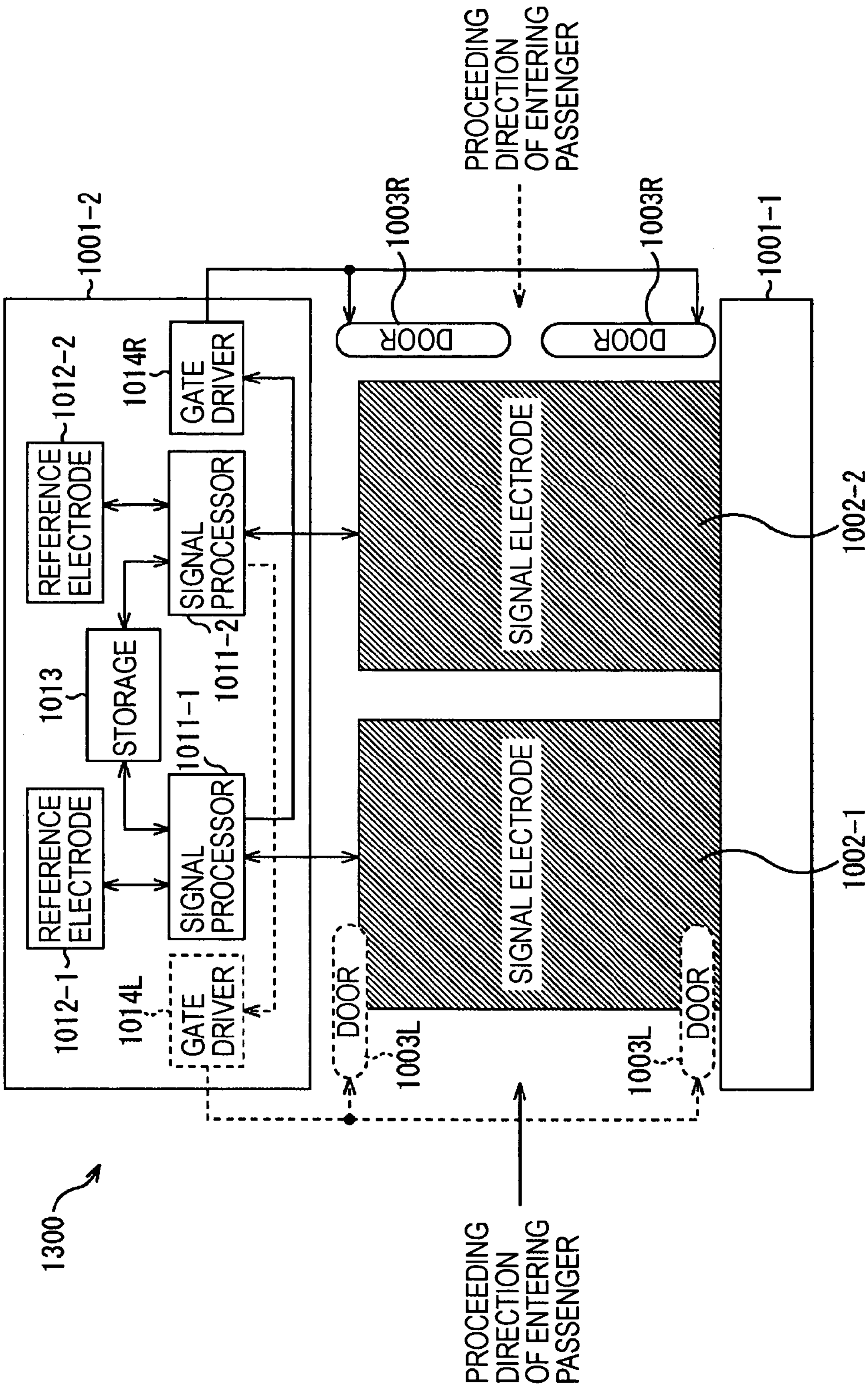
FIG. 44 illustrates another structure of the ticket inspection system in accordance with one embodiment of the present invention.

As shown in FIG. 35, the ticket inspection system 1000 includes a single signal processor 1011 that switches between the signal electrode 1002-1 and the signal electrode 1002-2 in a time-division manner. With reference to FIG. 44, a ticket inspection system 1300 is described below. The ticket inspection system 1300 includes a signal processor 1011-1 in communication with the signal electrode 1002-1 and a signal processor 1011-2 in communication with the signal electrode 1002-2.

FIG. 44 illustrates the ticket inspection system 1300.

The ticket inspection system 1300 of FIG. 44 is different from the ticket inspection system 1000 of FIG. 35 in that the signal processor 1011 is replaced with the signal processor 1011-1 and the signal processor 1011-2 and that the reference electrode 1012 is replaced with the reference electrode 1012-1 and the reference electrode 1012-2. As the ticket inspection system 1000 of FIG. 35, the ticket inspection system 1300 of FIG. 44 includes the ticket gates 1001-1 and 1001-2, the signal electrodes 1002-1 and 1002-2, the doors 1003L and 1003R, the storage 1013, and the gate drivers 1014L and 1014R.

Since each of the signal processors 1011-1 and 1011-2 is identical in structure and operation to the signal processor 1011 of FIG. 35, the discussion thereof is omitted herein.

The ticket inspection system 1300 includes the signal processor 1011-1 and the signal processor 1011-2. The signal processor 1011-1, connected to the reference electrode 1012-1, communicates with the user device 1100 via the signal electrode 1002-1. The signal processor 1011-2, connected to the reference electrode 1012-2, communicates with the user device 1100 via the signal electrode 1002-2. One of the signal processor 1011-1 and the signal processor 1011-2 performs the ticket inspection process while the other of the signal processor 1011-1 and the signal processor 1011-2 performs the content delivery process.

A passenger entering from the left side of FIG. 44 (from outside the gate) may now pass first over the signal electrode 1002-1. The signal processor 1011-1 communicates with the user device 1100 via the signal electrode 1002-1, thereby acquiring the device ID. Since no device-ID is present in the ticket inspection completion table on the storage 1013, the signal processor 1011-1 performs the ticket inspection process with the user device 1100 via the signal electrode 1002-1 including the authentication step. The signal processor 1011-1 thus controls the gate driver 1014R, thereby opening or closing the door 1003R. The device ID and the session key obtained in the authentication step are registered in the ticket inspection completion table on the storage 1013. More specifically, the signal electrode 1002-1 serves as a signal electrode to be used in the ticket inspection process.

In succession, the passenger passes over the signal electrode 1002-2. The signal processor 1011-2 communicates with the user device 1100 via the signal electrode 1002-2, thereby acquiring the device ID. Since the device ID is registered in the ticket inspection completion table on the storage 1013, the signal processor 1011-2 reads the session key, and acquires the subscription information from the user device 1100 via the signal electrode 1002-2 using the session key. The signal processor 1011-2 performs the content delivery process based on the subscription information, and transmits the content data stored on the storage 1013 to the user device 1100. The signal electrode 1002-2 serves as a signal electrode to be used in the content delivery process.

A passenger entering from the right side of FIG. 44 (from within the gate) may pass first over the signal electrode 1002-2. The signal processor 1011-2 communicates with the user device 1100 via the signal electrode 1002-2, thereby acquiring the device ID. Since no device ID is present in the ticket inspection completion table on the storage 1013, the signal processor 1011-2 performs the ticket inspection process with the user device 1100 via the signal electrode 1002-2 including the authentication step. The signal processor 1011-2 thus controls the gate driver 1014L, thereby opening or closing the door 1003L. The device ID and the session key obtained in the authentication step are registered in the ticket inspection completion table on the storage 1013. More specifically, the signal electrode 1002-2 serves as a signal electrode to be used in the ticket inspection process.

In succession, the passenger passes over the signal electrode 1002-1. The signal processor 1011-1 communicates with the user device 1100 via the signal electrode 1002-1, thereby acquiring the device ID. Since the device ID is registered in the ticket inspection completion table on the storage 1013, the signal processor 1011-1 reads the session key, and acquires the subscription information from the user device 1100 via the signal electrode 1002-1 using the session key. The signal processor 1011-1 performs the content delivery process based on the subscription information, and transmits the content data stored on the storage 1013 to the user device 1100. The signal electrode 1002-1 serves as a signal electrode to be used in the content delivery process.

The ticket inspection system 1300 of FIG. 44 includes the two signal processors, one for performing the ticket inspection process and the other for performing the content delivery process. In this way, workload on each processor is shared and thus reduced. Processing speed is thus increased.

Figure 45:
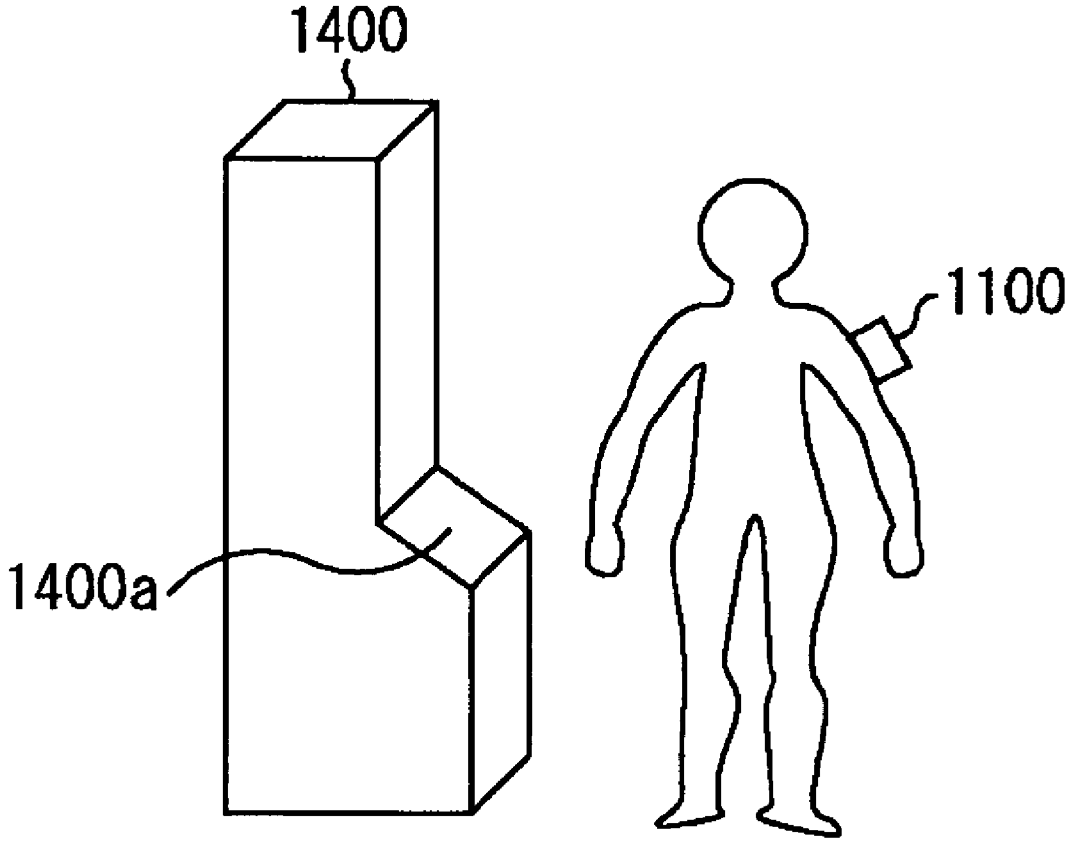
FIG. 45 illustrates a vending machine that causes subscription information to be registered in the user device.

A vending machine 1400 is described below with reference to FIG. 45. The vending machine 1400 pre-registers the subscription information onto the non-volatile memory 1254 in the user device 1100.

The vending machine 1400 may be a ticket vending machine, for example. A liquid-crystal display (LCD) 1400*a* laminated with a touchpanel arranged on the front of the vending machine 1400 includes, in addition to ticket selling buttons for purchasing a ticket, a select button for selecting and inputting predetermined information for subscribing a content (related to the type of a content and the subscription period of the content), and an enter button for entering the decision of the subscription of the content.

Figure 46:
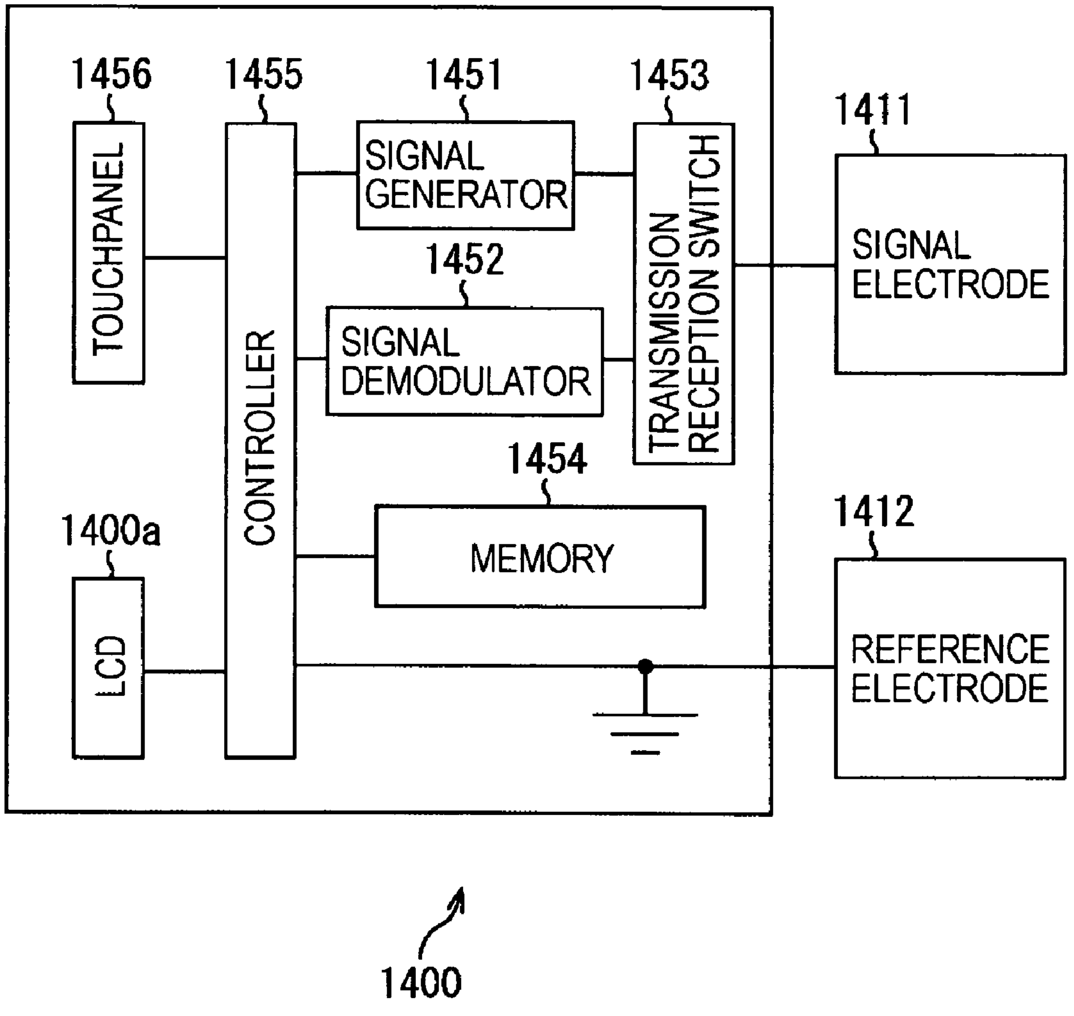
FIG. 46 is a block diagram illustrating the vending machine of FIG. 45.

A portion of the LCD 1400 a marking the enter button is laminated with a signal electrode 1411 (FIG. 46). The signal electrode 1411 is used to perform wireless communication with the user device 1100 mounted on the user via the human body of the user.

The user selects the select button on the LCD 1400*a* (with a finger in contact with the select button) to enter the type and the subscription period of the content, and the payment method to the vending machine 1400. The user then selects the enter button to decide the subscription of the content based on the entered information.

The vending machine 1400 communicates with the user device 1100 mounted on the user via the human body of the user, and the signal electrode 1411 laminated with the enter button. After performing the mutual authentication and the deduction from the remaining digital money amount, the vending machine 1400 writes the subscription information of the content onto the non-volatile memory 1254 of the user device 1100.

Since the subscription information of the content is written on the non-volatile memory 1254 of the user device 1100, the user can complete the ticket inspection process and receive the content by simply passing over the signal electrode 1002 arranged on the floor surface between the ticket gates 1001.

FIG. 46 is a block diagram illustrating the vending machine 1400. As shown in FIG. 46, a signal generator 1451 through a controller 1455 are respectively identical in function and operation to the signal generator 1021 through the controller 1025 of FIG. 36, and the discussion thereof is omitted herein.

A reference electrode 1412 and a signal electrode 1411 correspond to the reference electrode and the signal electrode for use in wireless communication discussed with reference to FIGS. 1 through 33. The signal electrode 1411 is laminated in an area of the LCD 1400 a bearing the enter button in a manner such that the signal electrode 1411 becomes close to a communication medium (such as a finger of the user body). The reference electrode 1412 is arranged in the casing of the vending machine 1400. The reference electrode 1412 corresponds to one of the transmission reference electrode 112 and the reception reference electrode 122 of FIG. 33, and the signal electrode 1411 corresponds to one of the transmission signal electrode 111 and the reception signal electrode 121 of FIG. 33. The communication medium may be a unitary one-material body or a composite body of a plurality of conductors and a plurality of dielectric materials.

The controller 1455 of FIG. 46 connects to a touchpanel 1456 and the LCD 1400*a*. The touchpanel 1456 is laminated to the LCD 1400*a*, and inputs to the controller 1455 an operation signal responsive to an operation by the user.

Figure 47:
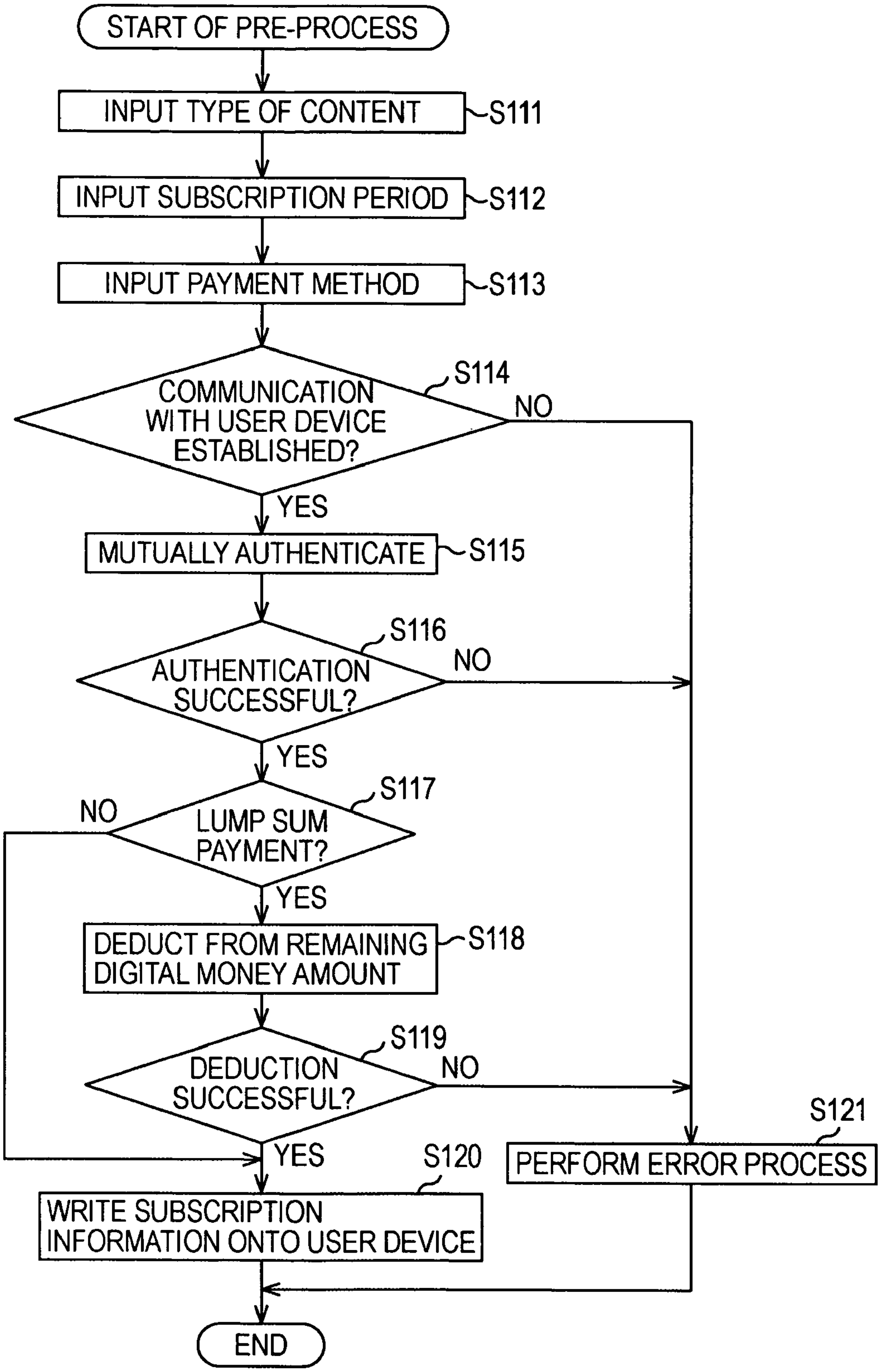
FIG. 47 is a flowchart illustrating a pre-process of the vending machine of FIG. 45.

A pre-process of the vending machine 1400 is described below with reference to a flowchart of FIG. 47. The process of the user device 1100 responsive to the pre-process is substantially identical to the process discussed with reference to FIGS. 42 and 43, and the discussion thereof is omitted herein.

The user enters the type and the subscription period of the content and the payment method to the vending machine 1400 by operating the select button displayed on the LCD 1400 a (namely, the touchpanel 1456). In step S111, the touchpanel 1456 inputs the type of the content to the controller 1455. The controller 1455 receives the type of the content.

In step S112, the touchpanel 1456 enters the subscription period. The controller 1455 receives the input of the subscription period from the touchpanel 1456. In step S113, the touchpanel 1456 inputs the payment method. The controller 1455 receives the input of the payment method from the touchpanel 1456.

In step S114, the controller 1455 determines whether communications with the user device 1100 have been established. More specifically, in response to the input of all information required to subscribe the content input from the touchpanel 1456, the controller 1455 transmits a start command via the signal electrode 1411.

After entering all information required to subscribe the content, the user touches the enter button with a finger displayed on the area of the signal electrode 1411 to decide the subscription of the content based on the input-information. The user device 1100 receives the start command via the human body of the user and the signal electrode 1201. In step S62 of FIG. 42, the user device 1100 reads the device ID from the non-volatile memory 1254 and transmits the device ID via the signal electrode 1201.

Upon receiving the device ID of the user device 1100 via the signal electrode 1411, the controller 1455 determines in step S114 that communications with the user device 1100 have been established. Processing proceeds to step S115.

In step S115, the controller 1455 performs the mutual authentication step with the user device 1100 using the received device ID. In step S116, the controller 1455 determines whether the authentication step has been successfully completed. The mutual authentication step in step S115 is identical to the mutual authentication step in step S21 of FIG. 40, and the discussion thereof is omitted herein.

If it is determined in step S116 that the authentication step has been successfully completed, processing proceeds to step S117. The controller 1455 determines whether the payment method received from the touchpanel 1456 (i.e., the user) is a lump-sum payment. If it is determined that the payment method is a lump-sum payment, processing proceeds to step S118.

In step S118, the controller 1455 communicates with the user device 1100 via the signal electrode 1411 using the session key shared in the authentication step, thereby deducting the fee of the content from the remaining digital money amount stored on the user device 1100.

In step S119, the controller 1455 determines whether the deduction from the remaining digital money amount has been successful. When the deduction from the remaining digital money amount has been successfully completed in step S68 of FIG. 43, the user device 1100 transmits a notification of the end of the deduction to the vending machine 1400 via the signal electrode 1201. The controller 1455 determines in step S119 that the deduction from the remaining digital money amount has been successfully completed. Processing proceeds to step S120.

If it is determined in step S117 that the payment method is not a lump-sum payment method (namely the payment method is an each-time payment), processing proceeds to step S120 with steps S118 and 119 skipped.

In step S120, the controller 1455 writes onto the user device 1100 via the signal electrode 1411 the information received in steps S111 through S113 (related to the type and the subscription period of the content, and the payment method of the content) as the subscription information using the session key.

In step S121, the controller 1455 performs an error process if it is determined in step S114 that communications with the user device 1100 have not been established, if it is determined in step S116 that the authentication has failed, or if it is determined in step S119 that the deduction from the remaining digital money amount has failed. The information input by the user is deleted, and the LCD 1400 a may be commanded to display a message urging the user to input information again.

The subscription information of the content input on the vending machine 1400 by the user is registered on the non-volatile memory 1254 of the user device 1100.

In the above discussion, the subscription information of the content is registered on the memory 1454 in the ticket vending machine 1400. The present invention is not limited to the vending machine 1400. For example, a personal computer connected to a reader/writer composed a reference electrode, a signal electrode, and a transceiver may access a server (not shown) to receive information relating to subscription of a content. Subscription information may be registered by causing the reader/writer to communicate with the user device 1100.

Figure 48:
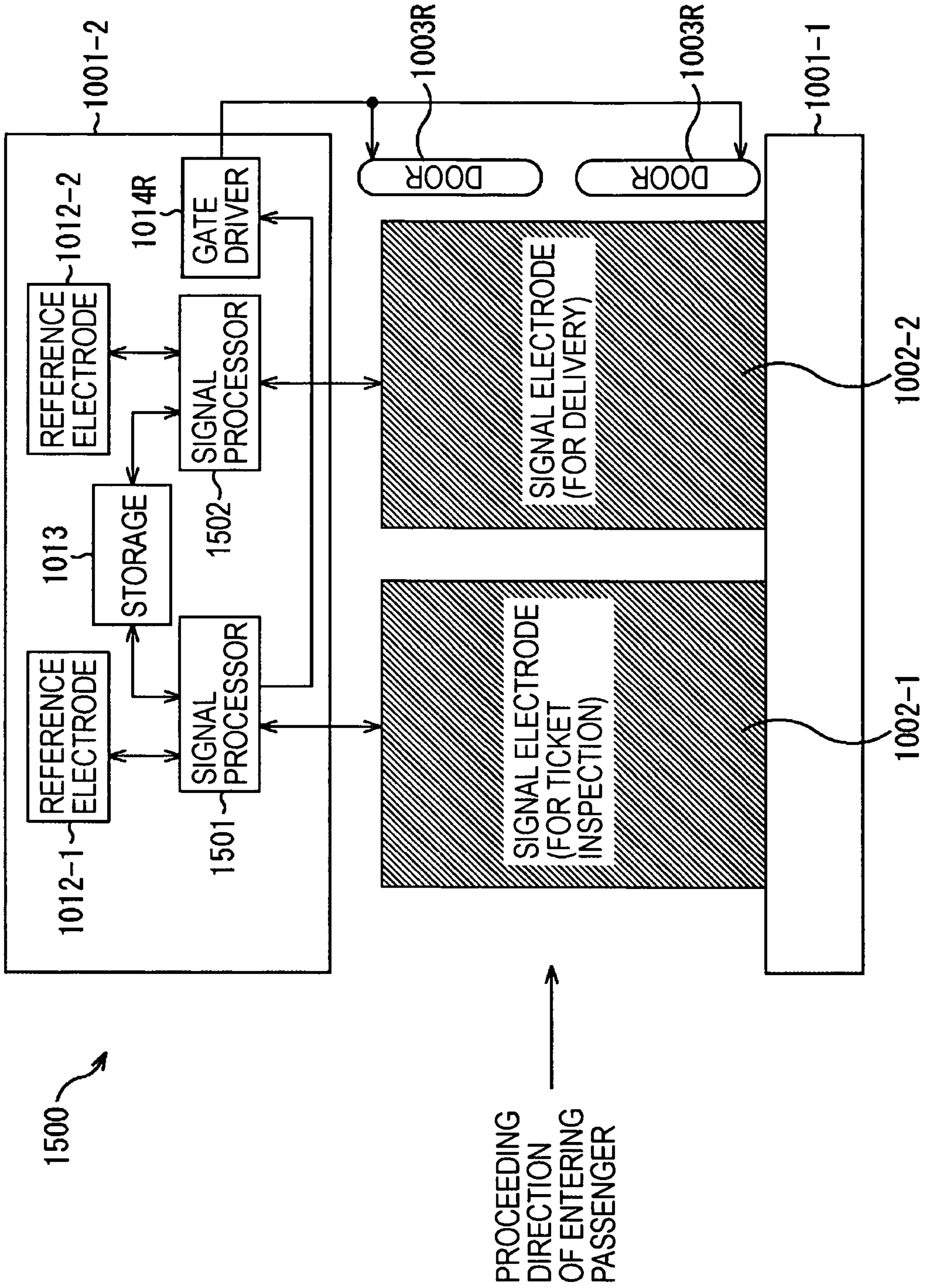
FIG. 48 illustrates another ticket inspection system in accordance with one embodiment of the present invention.

FIG. 48 illustrates a ticket inspection system 1500 in accordance with one embodiment of the present invention.

The ticket inspection system 1500 of FIG. 48 is different from the ticket inspection system 1300 of FIG. 44 in that the door 1003L and the gate driver 1014L are eliminated, that the signal electrode 1002-1 is for ticket inspection use while the signal electrode 1002-2 is for content delivery use, and that the signal processors 1011-1 and 1011-2 are respectively replaced with signal processor 1501 for ticket inspection and the signal processor 1502 for content delivery. As the ticket inspection system 1300 of FIG. 44, the ticket inspection system 1500 includes the ticket gates 1001-1 and 1002-1, the door 1003R, the reference electrodes 1012-1 and 1012-2, the storage 1013, and the gate driver 1014R.

Unlike the ticket inspection system 1500 of FIG. 35 and the ticket inspection system 1300 of FIG. 44, the ticket inspection system 1500 permits passengers to enter in one way only (from the side of the signal electrode 1002-1 as indicated by an arrow-headed solid line in FIG. 48, namely, from the left side of FIG. 48 from outside the gate).

A ticket inspection system may be designed to permit entrance from both sides as in the ticket inspection system 1000 of FIG. 35 and the ticket inspection system 1300 of FIG. 44, but set to permit one-way entrance even with the door 1003L and the gate driver 1014L (not shown in FIG. 48) arranged. Such a system is basically identical to the ticket inspection system 1500 of FIG. 48, and the discussion thereof is omitted herein.

As shown in FIG. 48, a passenger entering from the left side of FIG. 48 (from outside the gate) passes over the signal electrode 1002-1 for ticket inspection. The ticket inspection signal processor 1501 communicates with the user device 1100 via the ticket inspection signal electrode 1002-1, thereby acquiring the device ID. The ticket inspection signal processor 1501 performs the ticket inspection process including the authentication step with the ticket inspection signal electrode 1002-1, thereby controlling the gate driver 1014R to open or close the door 1003R. The ticket inspection signal processor 1501 registers the device ID and the session key in the authentication in the ticket inspection completion table on the storage 1013.

In the case of FIG. 48, the ticket inspection completion table may be stored on a memory in the content delivery signal processor 1502.

The passenger then passes over the content delivery signal electrode 1002-2. The content delivery signal processor 1502 communicates with the user device 1100 via the content delivery signal electrode 1002-2, thereby acquiring the device ID. The device ID is registered in the ticket inspection completion table on the storage 1013. The content delivery signal processor 1502 reads the session key, acquires the subscription information from the user device 1100 via the content delivery signal electrode 1002-2 using the session key, performs the content delivery process based on the subscription information, and delivers the content data stored on the reference electrode 1012 to the user device 1100.

Each of the reference processors 1501 and 1502 is basically identical in structure to the signal processor 1011 discussed with reference to FIG. 36, and the discussion thereof is omitted herein. Only the controller 1025 in each of the reference processors 1501 and 1502, different from the counterpart in the signal processor 1011, is described below with reference to FIGS. 49 and 50.

As shown in FIG. 48, the passenger enters from the left side only (from outside the gate). A ticket inspection system permitting a passenger from the right side (from within the gate) is also available. Such a ticket inspection system is different in the proceeding direction, but has basically the same structure, and the discussion thereof is omitted herein.

Figure 49:
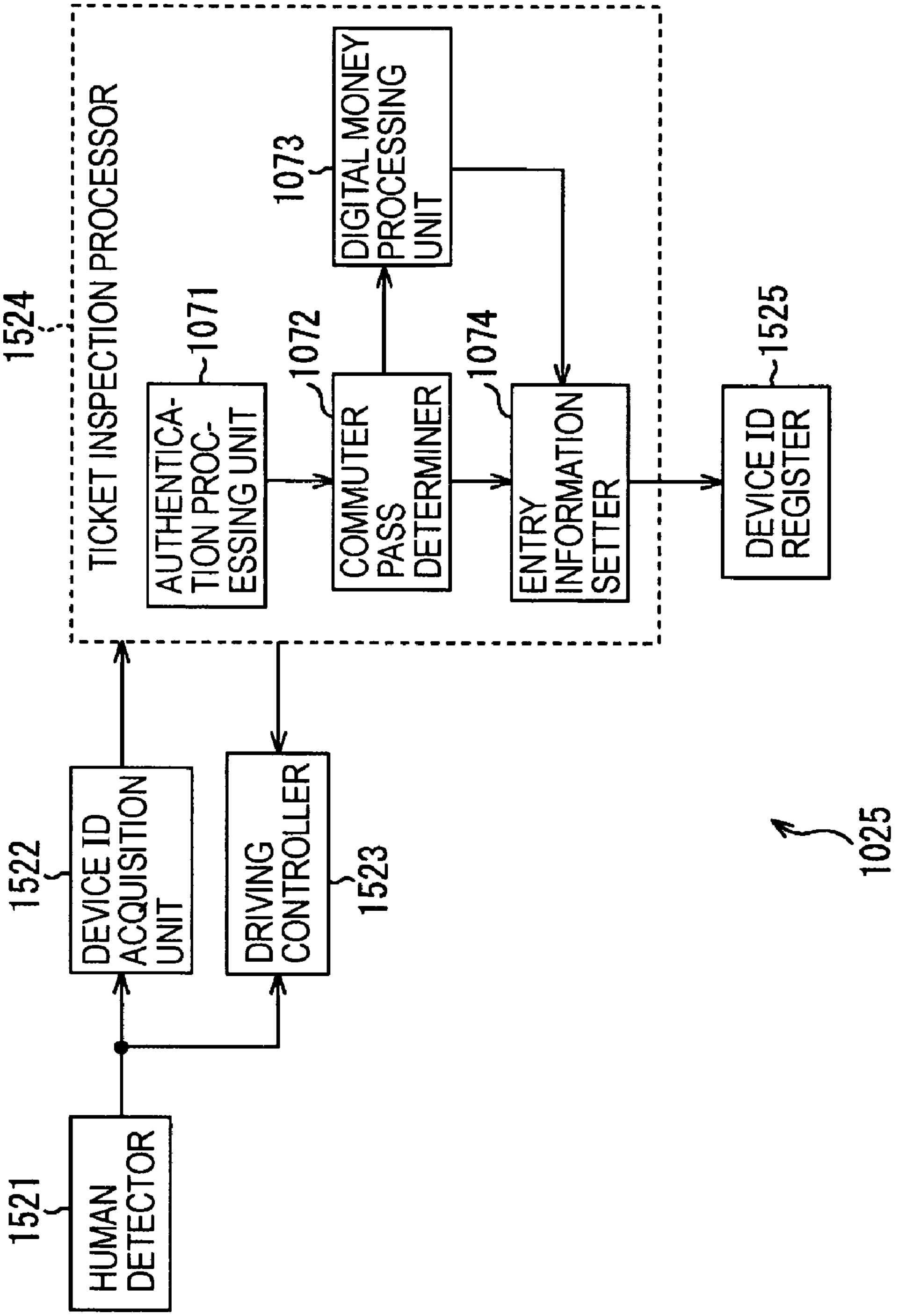
FIG. 49 is a block diagram illustrating a controller in a signal processing apparatus for ticket inspection of FIG. 48.

FIG. 49 illustrates a controller 1025 of the ticket inspection signal processor 1501.

The controller 1025 of FIG. 49 includes a human detector 1521, a device ID acquisition unit 1522, a driving controller 1523, a ticket inspection processor 1524, and a device ID register 1525.

The human detector 1521, basically identical in structure to the human detector 1051 of FIG. 37, detects a human (passenger) in response to a sensor output from one of the sensor 1041L and the sensor 1041R, and notifies the device ID acquisition unit 1522 and the driving controller 1523 of the detection results.

The device ID acquisition unit 1522 is basically identical in structure to the device ID acquisition unit 1052 of FIG. 37. The device ID acquisition unit 1522 transmits to the user device 1100 via the ticket inspection signal electrode 1002-1 a start command notifying the user device 1100 of the start of communication. The device ID acquisition unit 1522 receives the device ID the user device 1100 transmits in response to the start command, and then supplies the acquired device ID to the ticket inspection processor 1524.

The driving controller 1523 is basically identical in structure to the driving controller 1053 of FIG. 37. In response to the detection result from the human detector 1521 or the notification from the ticket inspection processor 1524, the driving controller 1523 controls the gate driver 1014R, thereby opening or closing the corresponding door 1003R.

As the ticket inspection processor 1055 of FIG. 37, the ticket inspection processor 1524 includes the authentication processing unit 1071, the commuter pass determiner 1072, the digital money processing unit 1073, and the entry information setter 1074. Upon receiving the device ID from the device ID acquisition unit 1522, the ticket inspection processor 1524 performs the ticket inspection process on the user device 1100 via the ticket inspection signal electrode 1002-1.

The device ID register 1525 is basically identical in structure to the device ID register 1056 of FIG. 37, and registers the device ID of the ticket-inspected user device 1100 together with the session key in the ticket inspection completion table on the storage 1013.

Figure 50:
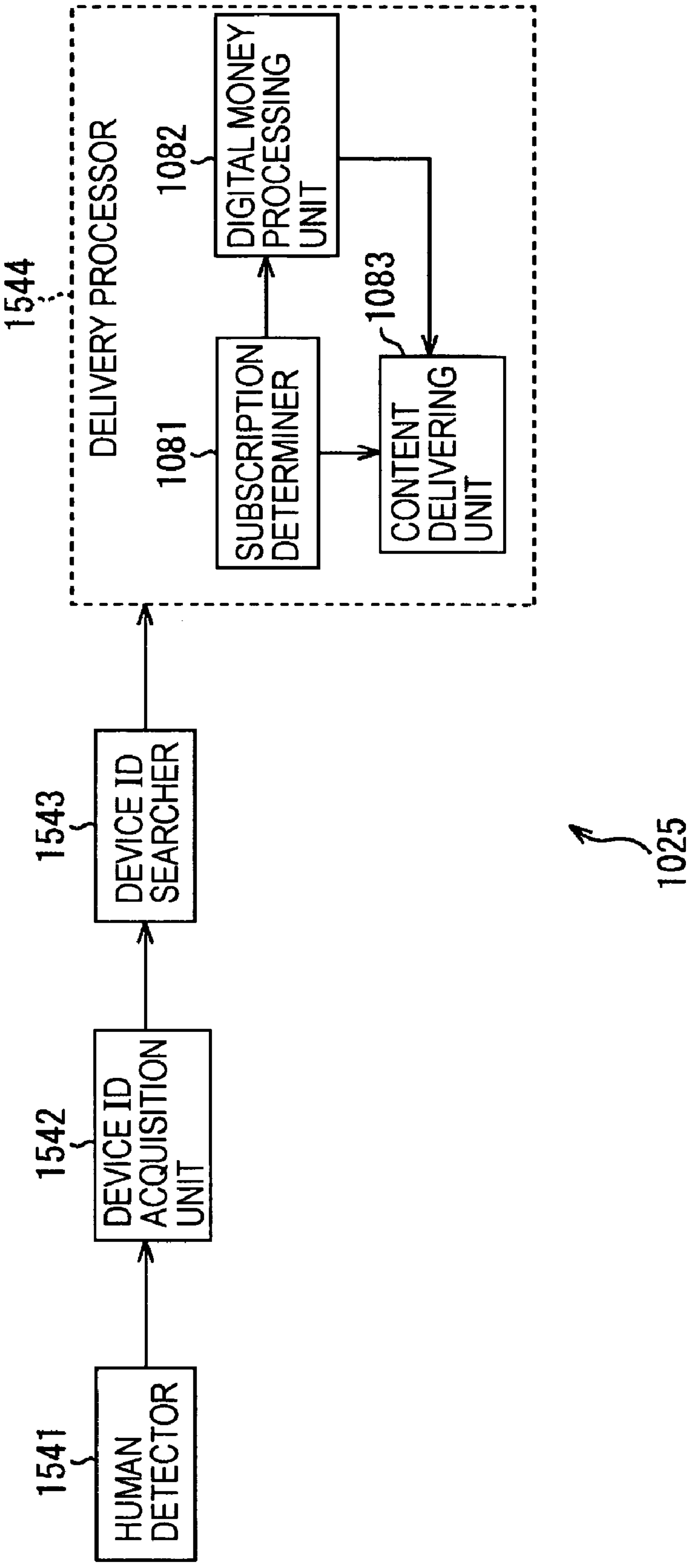
FIG. 50 is a block diagram illustrating the controller in the signal processing apparatus for content deliver of FIG. 48.

FIG. 50 illustrates the controller 1025 in the content delivery signal processor 1502.

As shown in FIG. 50, the controller 1025 includes a human detector 1541, a device ID acquisition unit 1542, a device ID searcher 1543, and a delivery processor 1544.

The human detector 1541 is basically identical in structure to the human detector 1051 of FIG. 37, and detects a human (passenger) in response to a sensor output signal from one of the sensor 1041L and the sensor 1041R, and notifies the device ID acquisition unit 1542 of the detection result.

The device ID acquisition unit 1542 is basically identical in structure to the device ID acquisition unit 1052 of FIG. 37. The device ID acquisition unit 1542 transmits to the user device 1100 of the passenger via the content delivery signal electrode 1002-2 a start command notifying the user device 1100 of the start of communication. The device ID acquisition unit 1542 acquires the device ID transmitted from the user device 1100 in response to the start command, and then supplies the acquired device ID to the device ID searcher 1543.

The device ID searcher 1543 is basically identical in structure to the device ID searcher 1054 of FIG. 37. The device ID searcher 1543 references the ticket inspection completion table on the storage 1013 to determine whether the device ID from the device ID acquisition unit 1542 is registered in the ticket inspection completion table. If the device ID is not registered, the device ID searcher 1543 supplies only the device ID to the delivery processor 1544. If the device ID is registered, the device ID searcher 1543 reads from the ticket inspection completion table on the storage 1013 the session key in association with the device ID and supplies the session key to the delivery processor 1544.

As the delivery processor 1057 of FIG. 37, the delivery processor 1544 includes the subscription determiner 1081, the digital money processing unit 1082, and the content delivering unit 1083. Upon receiving the device ID and the session key from the device ID searcher 1543, the delivery processor 1544 performs the content delivery process on the user device 1100 via the content delivery signal electrode 1002-2 using the session key.

If only the device ID is supplied form the device ID searcher 1543, no content delivery is performed.

Figure 51:
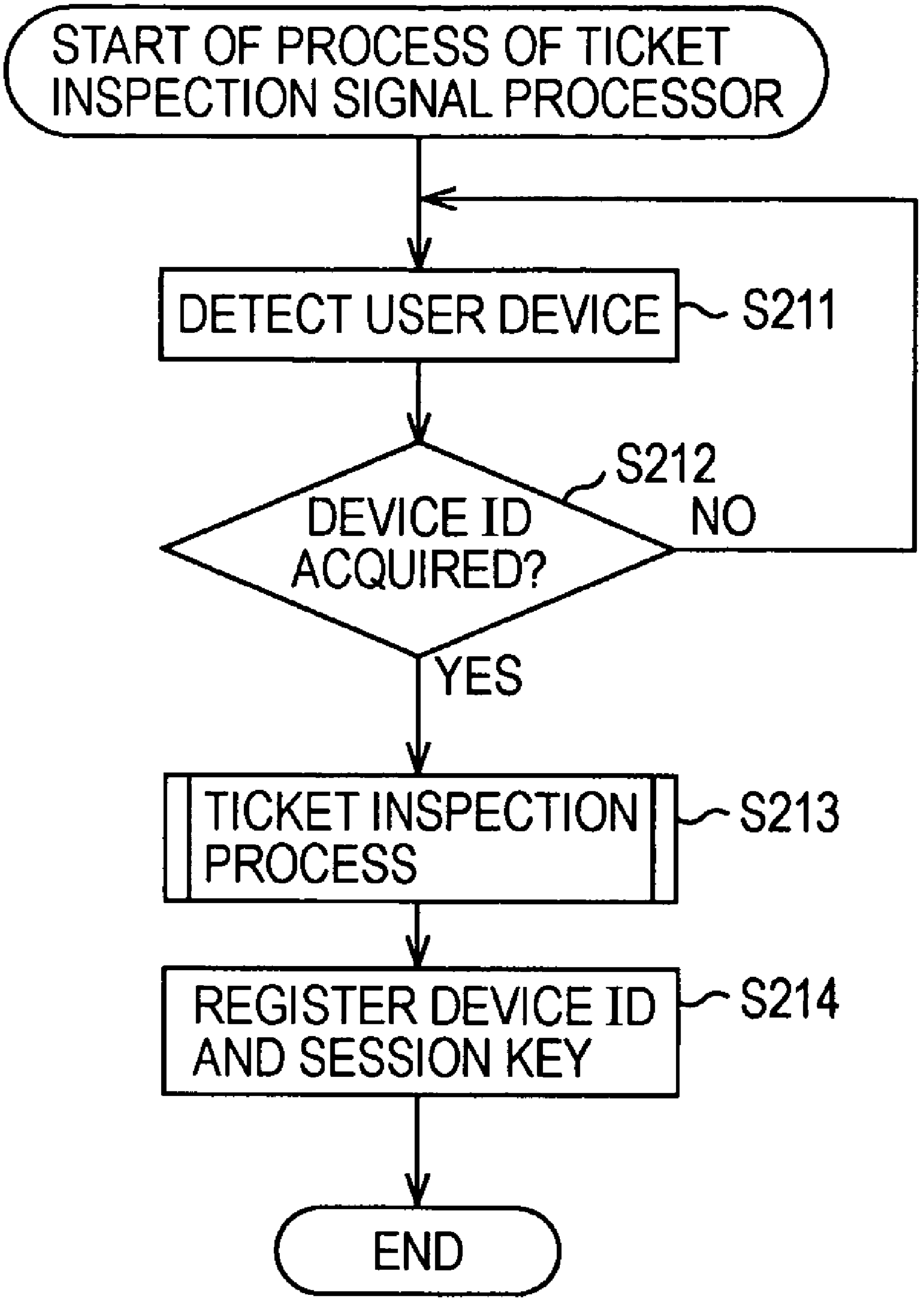
FIG. 51 is a flowchart illustrating a process of the signal processing apparatus for ticket inspection in the ticket inspection system of FIG. 48.

The process of the ticket inspection signal processor 1501 in the ticket inspection system 1500 of FIG. 48 is described below with reference to a flowchart of FIG. 51. Steps S211 through S214 of FIG. 51 are respectively identical to steps S11, S12, S14 and S15 of FIG. 39, and the discussion thereof is omitted herein.

A passenger now enters from the left side of FIG. 48. The sensor 1041L arranged on the left side of the ticket gate 1001 outputs to the human detector 1521 and the human detector 1541 a sensor output that changes in response to the passenger who is about to enter between the ticket gate 1001-1 and the ticket gate 1001-2. In response to the sensor output from the sensor 1041L, the human detector 1521 detects the human (passenger), and notifies the device ID acquisition unit 1522 and the driving controller 1523 of the detection result.

In response to the detection result from the sensor 1041L, the driving controller 1523 causes the gate driver 1014R to close the door 1003R on the opposite side from the sensor 1041L.

In response to the detection result from the human detector 1521, the device ID acquisition unit 1522 performs the ticket inspection process on the user device 1100 via the ticket inspection signal electrode 1002-1 in step S211. The device ID acquisition unit 1522 transmits to the user device 1100 via the ticket inspection signal electrode 1002-1 a command notifying the user device 1100 of the start of communication.

The user device 1100 transmits the device ID in response to the start command in step S62 of FIG. 42. The device ID acquisition unit 1522 determines in step S212 that the device ID has been acquired from the user device 1100, and then supplies the acquired device ID to the ticket inspection processor 1524. Processing proceeds to step S213.

If it is determined in step S212 that the device ID has not been acquired, processing returns to step S211 to repeat step S211 and subsequent step. More specifically, steps S211 and S212 are repeated until it is determined in step S212 that the device ID has been acquired.

Upon receiving the device ID, the ticket inspection processor 1524 performs the ticket inspection process on the user device 1100 in step S213. Since the ticket inspection process has been discussed with reference to FIG. 40, the discussion thereof is omitted herein.

In the ticket inspection process in step S213, communications are performed with the user device 1100 via the ticket inspection signal electrode 1002-1. The mutual authentication is thus performed, the session key is shared, the subscription information is read using the session key, the deduction is performed on the remaining digital money amount based on the subscription information, and the entry information is set. A notification of the end of the ticket inspection process is transmitted to the device ID register 1525 and the driving controller 1523. The door 1003R is opened.

Upon receiving the notification of the end of the ticket inspection process from the ticket inspection processor 1524, the device ID register 1525 registers in step S214 the device ID of the ticket inspected user device 1100 together with the session key used in the authentication step with the user device 1100 in the ticket inspection completion table on the storage 1013. The process of the ticket inspection signal processor 1501 is thus completed.

Figure 52:
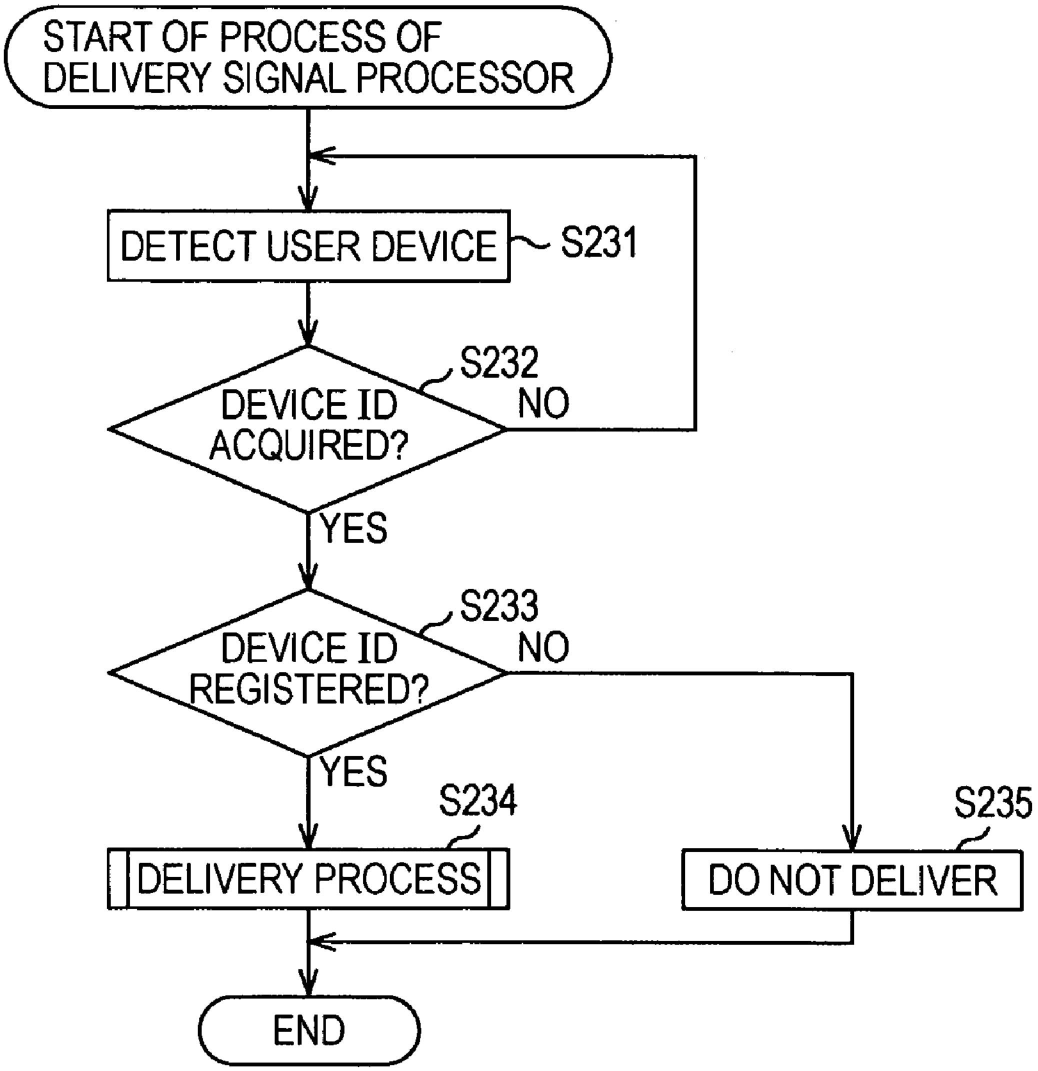
FIG. 52 is a flowchart illustrating a process of the signal processing apparatus for content delivery in the ticket inspection system of FIG. 48.

The process of the content delivery signal processor 1502 in the ticket inspection system 1500 of FIG. 48 described below with reference to a flowchart of FIG. 52. Steps S231 through S234 of FIG. 52 are substantially identical to steps S11 through S13 and S16 of FIG. 39, respectively, and the discussion thereof is omitted herein.

The sensor output from the sensor 1041L is output to each of the human detector 1521 and the human detector 1541 as previously described with reference to FIG. 51. In response to the sensor output from the sensor 1041L, the human detector 1541 detects a human (passenger) and notifies the device ID acquisition unit 1542 of the detection result.

In step S231, the device ID acquisition unit 1542 performs the detection process to detect the user device 1100 via the content delivery signal electrode 1002-2. More specifically, the device ID acquisition unit 1542 transmits to the user device 1100 of the user via the content delivery signal electrode 1002-2 a start command to notify the user device 1100 of the start of communication.

The user device 1100 transmits the device ID in step S62 of FIG. 42 in response to the start command. The signal demodulator 1452 determines in step S232 that the device ID has been acquired from the user device 1100, and supplies the acquired device ID to the device ID searcher 1543. Processing proceeds to step S233.

If it is determined in step S232 that no device ID has been acquired, processing returns to step S231 to repeat step S231 and subsequent step. More specifically, steps S231 and S232 are repeated until if it is determined in step S232 that the device ID has been acquired.

In step S233, the device ID searcher 1543 references the ticket inspection completion table on the storage 1013 to determine whether the device ID from the device ID acquisition unit 1542 is registered in the ticket inspection completion table.

If it is determined in step S233 that the device ID from the device ID acquisition unit 1542 is registered in the ticket inspection completion table, the device ID searcher 1543 reads the session key in association with the device ID from the ticket inspection completion table on the storage 1013 and supplies the session key to the delivery processor 1544. Processing proceeds to step S234.

In step S234, the delivery processor 1544 performs the content delivery process using the session key shared in the mutual authentication of the ticket inspection signal processor 1501 with the user device 1100. The content delivery process has been discussed with reference to FIG. 41.

In the content delivery process in step S234, communications are performed with the user device 1100 via the content delivery signal electrode 1002-2 using the session key. The subscription information is then acquired. Based on the acquired subscription information, the content data stored on the storage 1013 is delivered to the user device 1100. The process of the content delivery signal processor 1502 is thus completed.

If it is determined in step S233 that the device ID from the device ID acquisition unit 1542 is not registered in the ticket inspection completion table, the ticket inspection process is determined to be unfinished. Processing proceeds to step S235 for error process. The process of the content delivery signal processor 1502 ends with no content delivery performed.

Since the ticket inspection process is unfinished, the content delivery signal processor 1502 may perform the ticket inspection process on behalf of the ticket inspection signal processor 1501. When the content delivery signal processor 1502 has successfully completed the ticket inspection process, the content delivery signal processor 1502 may directly control the gate driver 1014R. Alternatively, the content delivery signal processor 1502 may notify the ticket inspection signal processor 1501 of the success of the ticket inspection process, thereby allowing the ticket inspection signal processor 1501 to control the gate driver 1014R. If time allows, the content delivery signal processor 1502 continuously performs the delivery process.

In the ticket inspection system 1500 that is hardware designed or software set to allow passengers to enter in one-way only between the ticket gates 1001, the signal processors are assigned respective functions with the signal processor 1501 for ticket inspection and the signal processor 1502 for content delivery. With this arrangement, workload on each processor is reduced and processing speed is increased.

As described above, a single signal processor may work even in a ticket inspection system that is hardware designed or software set to allow passengers to enter in one-way only between the ticket gates 1001.

Figure 53:
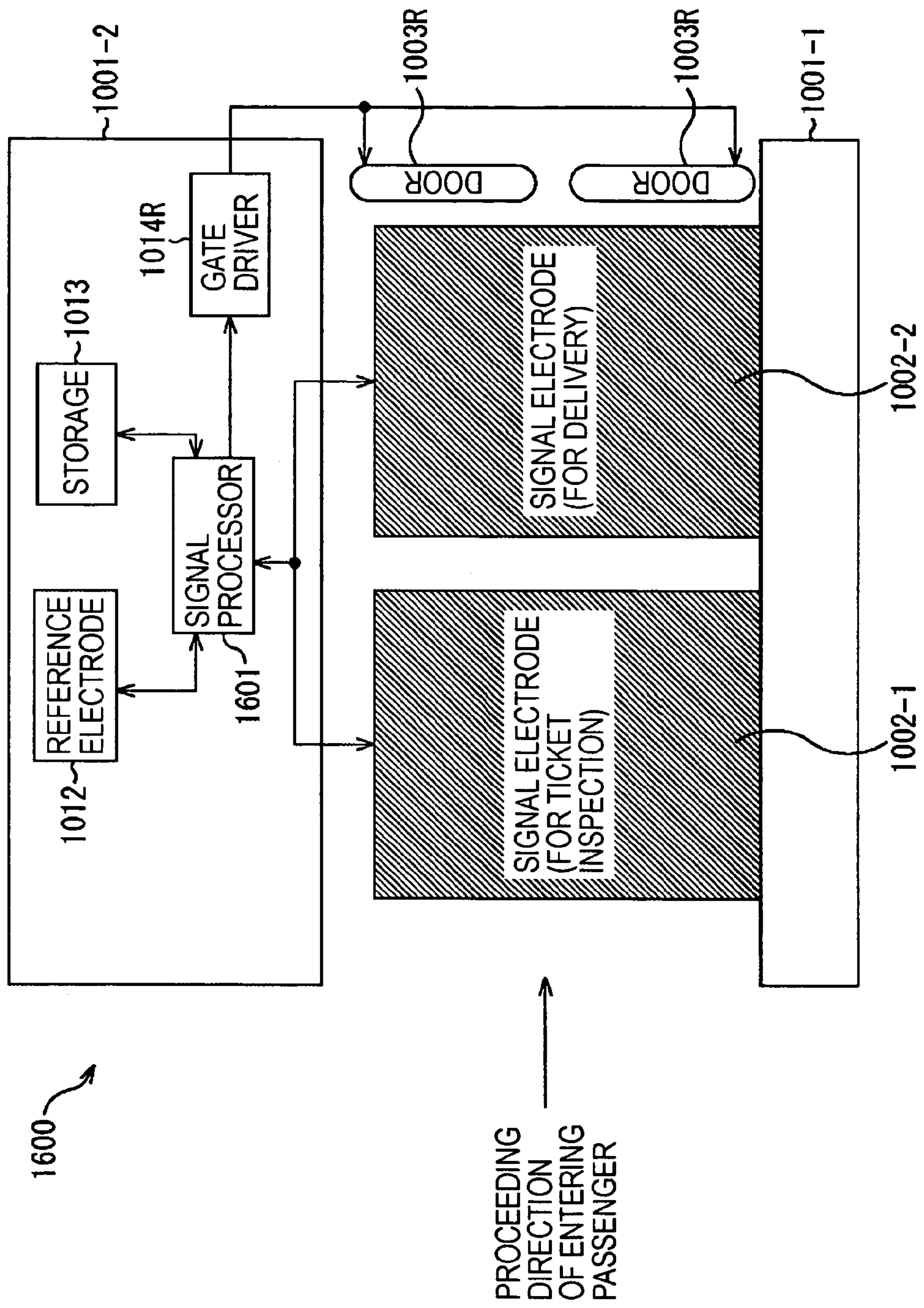
FIG. 53 illustrates another ticket inspection system in accordance with one embodiment of the present invention.

FIG. 53 illustrates a ticket inspection system 1600 in accordance with one embodiment of the present invention.

The ticket inspection system 1600 of FIG. 53 is different from the ticket inspection system 1500 of FIG. 48 in that the ticket inspection signal processor 1501 and the content delivery signal processor 1502 are integrated into a signal processor 1601, and that the reference electrodes 1012-1 and 1012-2 are replaced with a reference electrode 1012. As the ticket inspection system 1500 of FIG. 48, the ticket inspection system 1600 includes the ticket gates 1001-1 and 1001-2, the ticket inspection signal electrode 1002-1 and the content delivery signal electrode 1002-2, the door 1003R, the storage 1013, and the gate driver 1014R.

The signal processor 1601 is identical in structure and operation to a combination of the ticket inspection signal processor 1501 and the content delivery signal processor 1502, and the discussion thereof is omitted herein.

In the ticket inspection system 1600, the signal processor 1601 performs communications with the signal electrodes 1002-1 and 1002-2 switched in a time-division manner to perform the ticket inspection process and the content delivery process.

As the ticket inspection system 1500 of FIG. 48, the ticket inspection system 1600 allows passengers to enter in one-way only (from the left side of the signal electrode 1002-1 as represented by an arrow-headed solid line as shown in FIG. 53, i.e., from outside the gate).

A passenger entering from the left side of FIG. 53 (from outside the gate) first passes over the ticket inspection signal electrode 1002-1. The signal processor 1601 causes the controller 1025 of FIG. 49 to function, thereby communicating with the user device 1100 via the ticket inspection signal electrode 1002-1 to acquire the device ID. The signal processor 1601 performs the ticket inspection process including the authentication step with the user device 1100 via the ticket inspection signal electrode 1002-1, thereby control the gate driver 1014R to open or close the door 1003R. The signal processor 1601 registers the device ID and the session key in the authentication step in the ticket inspection completion table on the storage 1013.

The passenger next passes over the content delivery signal electrode 1002-2. The signal processor 1601 causes the controller 1025 of FIG. 50 to function, thereby communicating with the user device 1100 via the content delivery signal electrode 1002-2 to acquire the device ID. Since the device ID is already registered in the ticket inspection completion table on the storage 1013, the signal processor 1601 reads the device ID, acquires the subscription information from the user device 1100 via the content delivery signal electrode 1002-2 using the session key, performs the content delivery process based on the subscription information, and then transmits the content data stored on the storage 1013 to the user device 1100.

Even in the ticket inspection system 1600 that is hardware designed or software set to allow passengers to enter in one-way only between the ticket gates 1001, the single signal processor 1601 can perform the ticket inspection process and the content delivery process in a time-vision manner. The single signal processor 1601 works and costs of the ticket inspection system are thus reduced.

Figure 54:
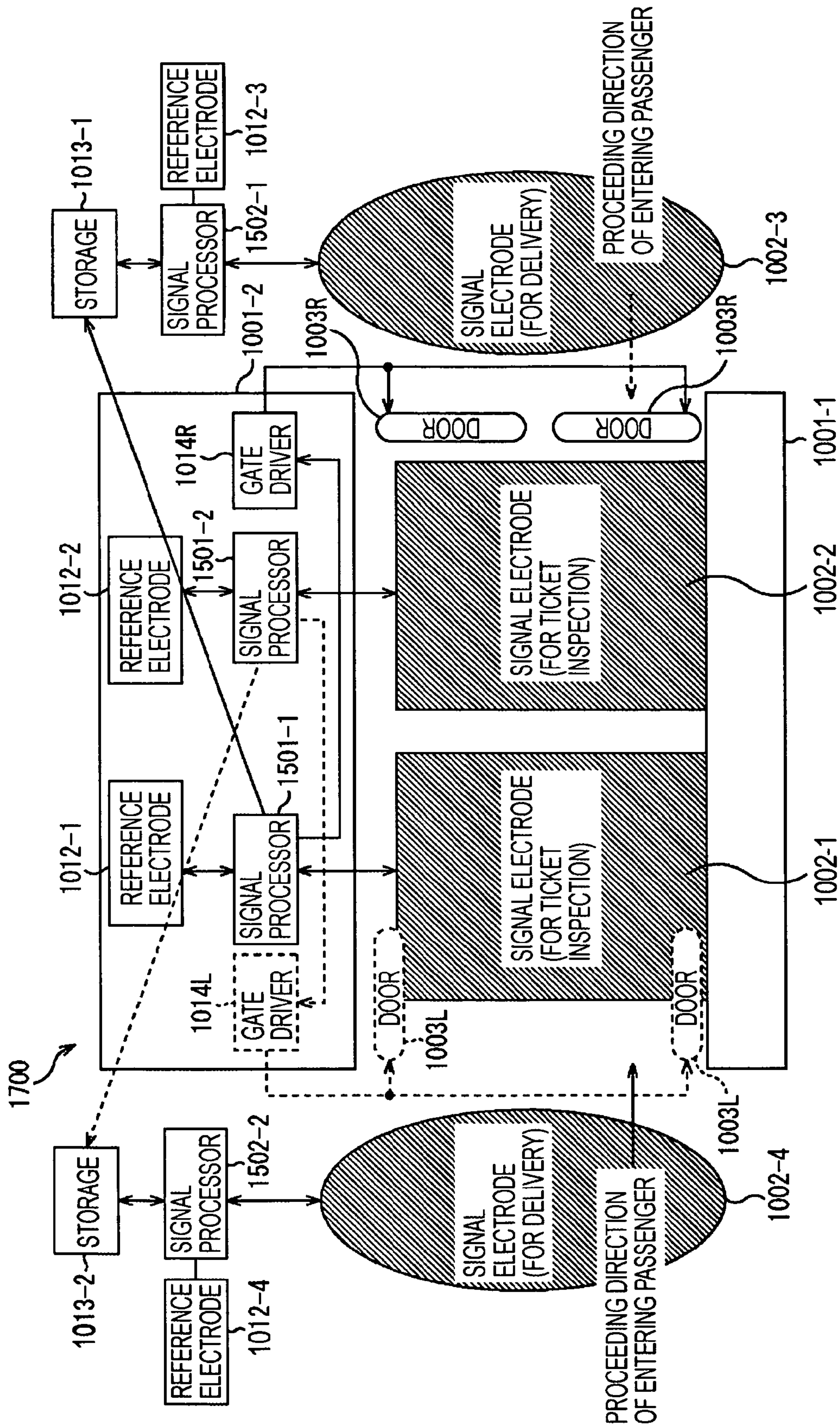
FIG. 54 illustrates yet another ticket inspection system in accordance with one embodiment of the present invention.

FIG. 54 illustrates a ticket inspection system 1700 in accordance with one embodiment of the present invention.

The ticket inspection system 1700 of FIG. 54 is different from the ticket inspection system 1300 of FIG. 44 in the following points. The signal processors 1011-1 and 1011-2 are replaced with the signal processors 1501-1 and 1501-2 for ticket inspection of FIG. 48, the signal processors 1502-1 and 1502-2 for content delivery of FIG. 48 are added, the signal electrode 1002-1 and the signal electrode 1002-2 arranged between the ticket gates 1001 become signal electrodes for ticket inspection, the signal electrodes 1002-3 and 1002-4 for content delivery are arranged on the floor on which a passenger passes through the ticket gates 1001, the storage 1013 is divided into storages 1013-1 and 1013-2, and reference electrodes 1012-1 and 1012-2 and reference electrodes 1012-3 and 1012-4 are added. As the ticket inspection system 1300 of FIG. 44, the ticket inspection system 1700 of FIG. 54 includes the ticket gates 1001-1 and 1001-2, the doors 1003 L and 1003 R, and the gate drivers 1014L and 1014R.

As the ticket inspection system 1000 of FIG. 35 and the ticket inspection system 1300 of FIG. 44, the ticket inspection system 1700 is designed to allow passengers to enter into the gate in two-ways, namely, from the ticket inspection signal electrode 1002-1 (from the left side of FIG. 54) as represented by an arrow-headed solid line and from the ticket inspection signal electrode 1002-2 (from the right side of FIG. 54) as represented by an arrow-headed broken line. In other words, passengers are allowed to enter the gate and exit the gate via the ticket inspection system 1700.

The ticket inspection system 1700 includes the ticket inspection signal processor 1501-1, the ticket inspection signal processor 1501-2, the content delivery signal processor 1502-1, and the content delivery signal processor 1502-2. The ticket inspection signal processor 1501-1, connected to the reference electrode 1012-1, wireless communicates with the user device 1100 of a passenger entering from the left side of FIG. 54 via the signal electrode 1002-1. The ticket inspection signal processor 1501-2, connected to the reference electrode 1012-2, wireless communicates with the user device 1100 of a passenger entering from the right side of FIG. 54 via the signal electrode 1002-2. The content delivery signal processor 1502-1, connected to the reference electrode 1012-3, wireless communicates with the user device 1100 of a passenger entering from the left side of FIG. 54 and exiting from the right side of FIG. 54 via the signal electrode 1002-3. The content delivery signal processor 1502-2, connected to the reference electrode 1012-4, wireless communicates with the user device 1100 of a passenger entering from the right side of FIG. 54 and exiting from the left side of FIG. 54 via the signal electrode 1022-4.

Each of the signal processors 1501-1 and 1501-2 is basically identical in structure and operation to the ticket inspection signal processor 1501 of FIG. 48, and the discussion thereof is omitted herein. Each of the signal processors 1502-1 and 1502-2 is basically identical in structure and operation to the signal processor 1502 of FIG. 48, and the discussion thereof is omitted herein.

A passenger entering the ticket gates 1001 from the left side of FIG. 54 (from outside the gate) first passes over the content delivery signal electrode 1002-4 arranged in front of the ticket gates 1001. Since the device ID is not registered in the ticket inspection completion table on the storage 1013-2, the content delivery signal processor 1502-2 cannot deliver a content.

When the passenger enters through the ticket gates 1001 from the left side of FIG. 54 (from outside the gates), the sensor 1041L detects the passenger, and outputs a sensor output signal to the signal processor 1501-1. In response, the signal processor 1501-1 starts transmitting a start command. Since the passenger passes over the ticket inspection signal electrode 1002-1, the signal processor 1501-1 communicates with the user device 1100 via the ticket inspection signal electrode 1002-1, thereby acquiring the device ID.

The signal processor 1501-1 performs the ticket inspection process including the authentication step with the user device 1100 via the ticket inspection signal electrode 1002-1, thereby controlling the gate driver 1014R to open or close the door 1003R. The ticket inspection signal processor 1501-1 registers the device ID and the session key in the authentication in the ticket inspection completion table on the storage 1013-1.

Although the passenger later passes over the ticket inspection signal electrode 1002-2, the sensor 1041R on the right side of FIG. 54 does not detect the passenger. The ticket inspection signal processor 1501-2 transmits no start command, does not communicate with the user device 1100 and performs no ticket inspection process.

The passenger exits through the ticket gates 1001 and passes over the content delivery signal electrode 1002-3. The signal processor 1502-1 communicates with the user device 1100 via the content delivery signal electrode 1002-3, thereby acquiring the device ID. Since the device ID is already registered in the ticket inspection completion table on the storage 1013-1, the signal processor 1502-1 reads the session key, acquires the subscription information from the user device 1100 via the content delivery signal electrode 1002-3 using the session key, performs the content delivery process based on the subscription information, and then transmits the content data stored on the storage 1013-1 to the user device 1100.

A passenger entering from the right side of FIG. 54 (from within the gates) first passes over the content delivery signal electrode 1002-3 arranged on the floor in front of the ticket gates 1001 before entering the ticket gates 1001. Since no device ID is registered in the ticket inspection completion table on the storage 1013-1, the signal processor 1502-1 performs no content delivery process.

When a passenger next enters through the ticket gates 1001 from the right side of FIG. 54 (from outside the gates), the sensor 1041 R detects the passenger and outputs a sensor output signal to the signal processor 1501-2. In response, the signal processor 1501-2 starts transmitting a start command. The passenger passes over the ticket inspection signal electrode 1002-2. The signal processor 1501-2 communicates with the user device 1100 via the ticket inspection signal electrode 1002-2, thereby acquiring the device ID.

The signal processor 1501-2 performs the ticket inspection process including the authentication step with the user device 1100 via the ticket inspection signal electrode 1002-2, thereby controlling the gate driver 1014L to open or close the door 1003L. The signal processor 1501-2 registers the device ID and the session key in the authentication in the ticket inspection completion table on the storage 1013-2.

Although the passenger passes over the ticket inspection signal electrode 1002-1, the sensor 1041L on the left side of FIG. 54 does not detect the passenger. The ticket inspection signal processor 1501-1 transmits no start command, does not communicate with the user device 1100 and performs no ticket inspection process.

The passenger exits through the ticket gates 1001 and passes over the content delivery signal electrode 1002-4. The signal processor 1502-2 communicates with the user device 1100 via the content delivery signal electrode 1002-4, thereby acquiring the device ID. Since the device ID is registered in the ticket inspection completion table on the storage 1013-2, the signal processor 1502-2 reads the session key, acquires the subscription information from the user device 1100 via the content delivery signal electrode 1002-4 using the session key, performs the content delivery process based on the subscription information, and then transmits the content data stored on the storage 1013-2 to the user device 1100.

With reference to FIG. 54, the area of each of the signal electrodes 1002-3 and 1002-4 for content delivery is set to be larger than the area of each of the ticket inspection signal electrodes 1002-1 and 1002-2. The present invention is not limited to this arrangement.

With reference to FIG. 54, the two signal processors are arranged. Alternatively, a single signal processor may be used. The number of signal processors is not limited to two. Three or more signal processors may be employed.

In the ticket inspection system 1700, the ticket inspection signal electrodes 1002-1 and 1002-2 are arranged between the ticket gates 1001, and the content deliver signal electrodes 1002-3 and 1002-4 are arranged on the floor each passenger are required pass over after the passage through the ticket gates 1001.

The installation location of the content delivery signal electrode 1002 is not limited between the ticket gates 1001. The expanding of an area where the content deliver signal electrode is installed prevents contents from being left undelivered when a size of data of the contents is large with respect to delivery speed.

In the above discussion, both the ticket inspection and the content delivery are possible at the entry and exit at the ticket gate. To prevent content delivery duplication, the delivery process may be disabled at the exit of each passenger, namely, when the passenger enters from the right side of FIG. 35 and FIG. 54 (from within the gates).

Before the user device 1100 delivers a registered content, the delivery of the content may be disabled. In this case, contents are searched according to similarity or content ID.

The user device 1100 may register a content reception end flag together with date, and the delivery of the content may be disabled by checking the date. In this case, a delivery time may also be registered. For example, in the case of newspapers, a morning edition and an evening edition of the papers may be identified. Delivery duplication is controlled by checking the flag and the delivery time.

Since not only the ticket inspection process but also the content delivery process is performed during the passage of the passenger through the ticket gate 1001, the passenger can easily get the data of the content by simply passing through the ticket gate 1001. The passenger is thus freed from going to a newsstand to browse captions and then buy desired newspapers.

The length of the access area of known contactless IC cards is limited to about several centimeter long. The user passes the ticket inspection gate while holding the IC card close to the access area. The time permitted to hold the IC card close to the access area is limited to a period of time as short as several seconds. Using the communications discussed with reference to FIGS. 1 through 33, the user can maintain a secure path with the signal electrode embedded in the floor surface in the ticket gate path and can communicate for a time longer than in the known art. The ticket inspection process at the entrance is performed while the content delivery process is performed at the exit. Two or more processes are thus easily sequentially performed.

The user can smoothly enjoy the content delivery service without the need for displaying user's intentions to buy.

The device ID and the session key shared in the authentication step are registered subsequent to the ticket inspection process. The content delivery process is performed using the registered session key. In the content delivery process, the secure path constructed during the ticket inspection process is used as is. No time is consumed for re-authentication.

In the content delivery process, the content data is delivered to the user device 1100. Alternatively, only a particular key for decrypting the content data may be delivered, and one of a signal electrode and a signal processor for delivering content data encrypted by the particular key may be installed in another area the passenger is going to pass (for example, on the floor of a platform or on the floor of a passage car).

In the above discussion, the contents delivered includes newspapers and magazines. The contents may further include music and video.

The process steps describing the program stored on the recording medium may be performed in the order sequence as described above. The process steps may not necessarily be performed in the described order sequence, but may be performed in parallel or individually.

In this specification, the system refers to an entire apparatus composed a plurality of devices. A configuration discussed as a single apparatus may be divided into a plurality of devices. A configuration discussed as a plurality of apparatuses may be integrated into a single apparatus. A structure other than those of the above-described apparatus may be added. If the configuration and operation of the entire system remains unchanged, a portion of one apparatus may be contained in another apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising a first information processing apparatus with a first electrode, installed at a ticket gate, for performing a ticket inspection process, and a second information processing apparatus with a second electrode settled parallel to an entering direction of passenger for performing a content delivery process subsequent to the ticket inspection process, wherein the first information processing apparatus includes:

authentication means for authenticating a communication terminal mounted on a passenger passing through the ticket gate by communicating the communication terminal, the communication terminal communicating using as a communication medium a dielectric material including the human body of the passenger;

ticket inspection means for performing the ticket inspection process on the communication terminal authenticated by the authentication means; and registration means for registering an identification of the communication terminal that has undergone the ticket inspection process, and wherein the second information processing apparatus includes:

identification determination means for determining whether the identification of the communication terminal acquired in communication with the communication terminal is registered by the first information processing apparatus;

information acquisition means for acquiring subscription information of a content stored on the communication terminal if the identification determination means determines that the identification of the communication terminal is registered by the first information processing apparatus; and delivery means for delivering the content to the communication terminal in accordance with the subscription information acquired by the information acquisition means.

2. The information processing system according to claim 1, wherein the registration means registers a session key, shared by the communication terminal as a result of the authentication, together with the identification of the communication terminal, and wherein the delivery means encrypts the content with the session key and delivers the encrypted content to the communication terminal, the session key being read if the identification determination means determines that the identification of the communication terminal is registered by the first information processing apparatus.

3. An information processing method of an information processing system including a first information processing apparatus with a first electrode, installed at a ticket gate, for performing a ticket inspection process, and a second information processing apparatus with a second electrode settled parallel to an entering direction of passenger for performing a content delivery process subsequent to the ticket inspection process, the method comprising steps of:

through the first information processing apparatus, authenticating a communication terminal mounted on a passenger passing through the ticket gate by communicating the communication terminal, the communication terminal communicating using as a communication medium a dielectric material including the human body of the passenger;

performing the ticket inspection process on the authenticated communication terminal; and registering an identification of the communication terminal that has undergone the ticket inspection process, and through the second information processing apparatus, determining whether the identification of the communication terminal acquired in communication with the communication terminal is registered by the first information processing apparatus;

acquiring subscription information of a content stored on the communication terminal if the identification of the communication terminal is determined to be registered by the first information processing apparatus; and delivering the content to the communication terminal in accordance with the acquired subscription information.

4. An information processing system including a first information processing apparatus with a first electrode installed at a ticket gate for performing a ticket inspection process, and a second information processing apparatus with a second electrode settled parallel to an entering direction of passenger for performing a content delivery process subsequent to the ticket inspection process, the information processing system comprising:

authentication means for authenticating a communication terminal mounted on a passenger passing through the ticket gate by communicating the communication terminal, the communication terminal communicating using as a communication medium a dielectric material including the human body of the passenger;

ticket inspection means for performing the ticket inspection process on the communication terminal authenticated by the authentication means;

registration means for registering an identification of the communication terminal that has undergone the ticket inspection process;

identification determination means for determining whether the identification of the communication terminal acquired in communication with the communication terminal is registered by the registration means;

information acquisition means for acquiring subscription information of a content stored on the communication terminal if the identification determination means determines that the identification of the communication terminal is registered; and delivery means for delivering the content to the communication terminal in accordance with the subscription information acquired by the information acquisition means.

5. The information processing apparatus according to claim 4, wherein the registration means registers a session key, shared by the communication terminal as a result of the authentication, together with the identification of the communication terminal, and wherein the delivery means encrypts the content with the session key and delivers the encrypted content to the communication terminal, the session key being read if the identification determination means determines that the identification of the communication terminal is registered by the registration means.

6. An information processing method of an information processing system, the system including a first information processing apparatus with a first electrode installed at a ticket gate for performing a ticket inspection process, and a second information processing apparatus with a second electrode settled parallel to an entering direction of passenger for performing a content delivery process subsequent to the ticket inspection process, the method comprising steps of:

authenticating a communication terminal mounted on a passenger passing through the ticket gate by communicating the communication terminal, the communication terminal communicating using as a communication medium a dielectric material including the human body of the passenger;

performing the ticket inspection process on the authenticated communication terminal;

registering an identification of the communication terminal that has undergone the ticket inspection process;

determining whether the identification of the communication terminal acquired in communication with the communication terminal is registered;

acquiring subscription information of a content stored on the communication terminal if the identification of the communication terminal is determined to be registered; and delivering the content to the communication terminal in accordance with the acquired subscription information.

7. A computer-readable medium including instructions, executable by a processor, for instructing an information processing system to perform an information processing method, the system including a first information processing apparatus with a first electrode installed at a ticket gate for performing a ticket inspection process, and a second information processing apparatus with a second electrode settled parallel to an entering direction of passenger for performing a content delivery process subsequent to the ticket inspection process, the method comprising:

authenticating a communication terminal mounted on a passenger passing through the ticket gate by communicating the communication terminal, the communication terminal communicating using as a communication medium a dielectric material including the human body of the passenger;

performing a ticket inspection process on the authenticated communication terminal;

registering an identification of the communication terminal that has undergone the ticket inspection process, determining whether the identification of the communication terminal acquired in communication with the communication terminal is registered;

acquiring subscription information of a content stored on the communication terminal if the identification of the communication terminal is determined to be registered; and delivering the content to the communication terminal in accordance with the acquired subscription information.

8. An information processing system comprising a first information processing apparatus with a first electrode, installed at a ticket gate, for performing a ticket inspection process, and a second information processing apparatus with a second electrode settled parallel to an entering direction of passenger for performing a content delivery process subsequent to the ticket inspection process, wherein the first information processing apparatus includes:

an authentication unit authenticating a communication terminal mounted on a passenger passing through the ticket gate by communicating the communication terminal, the communication terminal communicating using as a communication medium a dielectric material including the human body of the passenger;

a ticket inspection unit performing the ticket inspection process on the communication terminal authenticated by the authentication unit; and a registration unit registering an identification of the communication terminal that has undergone the ticket inspection process, and wherein the second information processing apparatus includes:

an identification determination unit determining whether the identification of the communication terminal acquired in communication with the communication terminal is registered by the first information processing apparatus;

an information acquisition unit acquiring subscription information of a content stored on the communication terminal if the identification determination unit determines that the identification of the communication terminal is registered by the first information processing apparatus; and a delivery unit delivering the content to the communication terminal in accordance with the subscription information acquired by the information acquisition unit.

9. An information processing system including a first information processing apparatus with a first electrode installed at a ticket gate for performing a ticket inspection process, and a second information processing apparatus with a second electrode settled parallel to an entering direction of passenger for performing a content delivery process subsequent to the ticket inspection process, the information processing system comprising:

an authentication unit authenticating a communication terminal mounted on a passenger passing through the ticket gate by communicating the communication terminal, the communication terminal communicating using as a communication medium a dielectric material including the human body of the passenger;

a ticket inspection unit performing the ticket inspection process on the communication terminal authenticated by the authentication unit;

a registration unit registering an identification of the communication terminal that has undergone the ticket inspection process, an identification determination unit determining whether the identification of the communication terminal acquired in communication with the communication terminal is registered by the registration unit;

an information acquisition unit acquiring subscription information of a content stored on the communication terminal if the identification determination unit determines that the identification of the communication terminal is registered; and a delivery unit delivering the content to the communication terminal in accordance with the subscription information acquired by the information acquisition unit.

* * * * *